United States Patent
Emura et al.

(10) Patent No.: US 10,300,986 B2
(45) Date of Patent: May 28, 2019

(54) BICYCLE TRANSMISSION APPARATUS AND BICYCLE DRIVE UNIT

(71) Applicant: SHIMANO INC., Sakai (JP)

(72) Inventors: Atsuhiro Emura, Sakai (JP); Toshinari Oishi, Sakai (JP); Yusuke Nishimoto, Sakai (JP); Sota Yamaguchi, Sakai (JP); Kohei Obuchi, Sakai (JP); Kento Mitsuyasu, Sakai (JP)

(73) Assignee: SHIMANO INC., Sakai (JP)

( * ) Notice: Subject to any disclaimer, the term of this patent is extended or adjusted under 35 U.S.C. 154(b) by 289 days.

(21) Appl. No.: 15/140,441

(22) Filed: Apr. 27, 2016

(65) Prior Publication Data

US 2017/0313385 A1     Nov. 2, 2017

(51) Int. Cl.
| | |
|---|---|
| B62M 9/04 | (2006.01) |
| B62K 25/28 | (2006.01) |
| B62M 9/12 | (2006.01) |
| B62M 9/124 | (2010.01) |
| B62M 9/134 | (2010.01) |
| B62M 25/04 | (2006.01) |
| B62M 25/00 | (2006.01) |

(52) U.S. Cl.
CPC ............. *B62M 9/04* (2013.01); *B62K 25/286* (2013.01); *B62M 9/12* (2013.01); *B62M 9/124* (2013.01); *B62M 9/134* (2013.01); *B62M 25/045* (2013.01); *B62M 2025/006* (2013.01)

(58) Field of Classification Search
CPC .......... B62M 9/04; B62M 9/12; B62M 9/124; B62M 9/134; B62M 2025/006; B62M 25/045; B62K 25/286

USPC ..................................................... 474/77, 81
See application file for complete search history.

(56) References Cited

U.S. PATENT DOCUMENTS

| | | | |
|---|---|---|---|
| 2,830,628 A * | 4/1958 | Pettigrew | B23D 55/06 |
| | | | 474/72 |
| 5,611,556 A | 3/1997 | Davidow | |
| 6,029,990 A | 2/2000 | Busby | |
| 6,079,726 A | 6/2000 | Busby | |

(Continued)

FOREIGN PATENT DOCUMENTS

| | | |
|---|---|---|
| CN | 1227134 C | 11/2005 |
| JP | 4535958 B2 | 2/2007 |
| WO | WO 2011/061048 | 5/2011 |

*Primary Examiner* — Michael R Mansen
*Assistant Examiner* — Robert T Reese
(74) *Attorney, Agent, or Firm* — Mori & Ward, LLP

(57) ABSTRACT

A bicycle transmission apparatus comprises a base member, a first transmission member, a second transmission member, a first coupling member, a first guide structure, a switching device, and a transmission controller. The switching device is configured to switch a position of the first transmission member relative to the base member in an axial direction between a first axial position and a second axial position. The transmission controller is configured to control the switching device and the first guide structure so as not to change a first engagement state of the first coupling member from one cogwheel to another adjacent cogwheel among first cogwheels when the first transmission member moves relative to the base member in association with a movement of the first guide structure relative to the base member to change a second engagement state of the first coupling member from one cogwheel to another adjacent cogwheel among second cogwheels.

29 Claims, 38 Drawing Sheets

(56) References Cited

U.S. PATENT DOCUMENTS

| | | |
|---|---|---|
| 6,155,585 A | 12/2000 | Busby |
| 7,326,137 B2 | 2/2008 | van der Linde |
| 7,361,109 B2 | 4/2008 | Kilshaw |
| 7,520,831 B2 * | 4/2009 | Kaga ........................ B62J 13/04 474/144 |
| 7,597,638 B2 | 10/2009 | Cooke |
| 7,621,834 B2 * | 11/2009 | Kaga ........................ B62M 9/04 192/64 |
| 7,736,253 B2 * | 6/2010 | Matsumoto .............. B62M 9/14 474/69 |
| 7,762,571 B2 | 7/2010 | Dodman et al. |
| 8,066,596 B1 | 11/2011 | Kilshaw |
| 8,475,306 B2 | 7/2013 | Vrielink |
| 8,556,757 B2 | 10/2013 | Kilshaw |
| 2004/0067804 A1 | 4/2004 | Dratewski |
| 2004/0192480 A1 * | 9/2004 | Matsumoto .............. B62M 9/04 474/78 |
| 2006/0046881 A1 * | 3/2006 | Matsumoto .............. B62M 9/04 474/81 |
| 2008/0261735 A1 | 10/2008 | Cappellini |
| 2011/0256971 A1 | 10/2011 | Kilshaw |
| 2016/0257373 A1 * | 9/2016 | Emura .................... B62M 6/50 |
| 2016/0257375 A1 * | 9/2016 | Emura .................... B62M 9/04 |

\* cited by examiner

| | | SECOND TRANSMISSION MEMBER | | | | | | |
|---|---|---|---|---|---|---|---|---|
| | | CW27 | CW26 | CW25 | CW24 | CW23 | CW22 | CW21 |
| | | 41 | 37 | 33 | 29 | 25 | 21 | 19 |
| FIRST TRANSMISSION MEMBER | CW11 19 | 0.46 | 0.51 | 0.58 | 0.66 | 0.76 | 0.90 | 1.00 |
| | CW12 21 | 0.51 | 0.57 | 0.64 | 0.72 | 0.84 | 1.00 | 1.11 |
| | CW13 25 | 0.61 | 0.68 | 0.76 | 0.86 | 1.00 | 1.19 | 1.32 |
| | CW14 29 | 0.71 | 0.78 | 0.88 | 1.00 | 1.16 | 1.38 | 1.53 |
| | CW15 33 | 0.80 | 0.89 | 1.00 | 1.14 | 1.32 | 1.57 | 1.74 |
| | CW16 37 | 0.90 | 1.00 | 1.12 | 1.28 | 1.48 | 1.76 | 1.95 |
| | CW17 41 | 1.00 | 1.11 | 1.24 | 1.41 | 1.64 | 1.95 | 2.16 |

| SHIFT POSITION | FIRST TRANSMISSION MEMBER | FIRST GUIDE MEMBER | FIRST COGWHEEL | SECOND COGWHEEL |
|---|---|---|---|---|
| 1 | P1 | P11 | CW11 | CW27 |
| 2 | P2 | P12 | CW11 | CW26 |
| 3 | P1 | P12 | CW12 | CW26 |
| 4 | P2 | P13 | CW12 | CW25 |
| 5 | P1 | P13 | CW13 | CW25 |
| 6 | P2 | P14 | CW13 | CW24 |
| 7 | P1 | P14 | CW14 | CW24 |
| 8 | P2 | P15 | CW14 | CW23 |
| 9 | P1 | P15 | CW15 | CW23 |
| 10 | P2 | P16 | CW15 | CW22 |
| 11 | P1 | P16 | CW16 | CW22 |
| 12 | P2 | P17 | CW16 | CW21 |
| 13 | P1 | P17 | CW17 | CW21 |

| SHIFT POSITION | SHIFTING SIGNAL | SWITCHING ACTUATOR | GUIDE ACTUATOR | MOVING SPEED | STOP TIME |
|---|---|---|---|---|---|
| 1 | DSS | - | - | - | - |
|   | USS | P1→P2 | P11→P12 | V11→V21→V31 | T1 |
| 2 | DSS | P2→P1 | P12→P11 | V12→V22→V32 | T2 |
|   | USS | P2→P1 | P12 | V42 | - |
| 3 | DSS | P1→P2 | P12 | V41 | - |
|   | USS | P1→P2 | P12→P13 | V11→V21→V31 | T1 |
| 4 | DSS | P2→P1 | P13→P12 | V12→V22→V32 | T2 |
|   | USS | P2→P1 | P13 | V42 | - |
| 5 | DSS | P1→P2 | P13 | V41 | - |
|   | USS | P1→P2 | P13→P14 | V11→V21→V31 | T1 |
| 6 | DSS | P2→P1 | P14→P13 | V12→V22→V32 | T2 |
|   | USS | P2→P1 | P14 | V42 | - |
| 7 | DSS | P1→P2 | P14 | V41 | - |
|   | USS | P1→P2 | P14→P15 | V11→V21→V31 | T1 |
| 8 | DSS | P2→P1 | P15→P14 | V12→V22→V32 | T2 |
|   | USS | P2→P1 | P15 | V42 | - |
| 9 | DSS | P1→P2 | P15 | V41 | - |
|   | USS | P1→P2 | P15→P16 | V11→V21→V31 | T1 |
| 10 | DSS | P2→P1 | P16→P15 | V12→V22→V32 | T2 |
|    | USS | P2→P1 | P16 | V42 | - |
| 11 | DSS | P1→P2 | P16 | V41 | - |
|    | USS | P1→P2 | P16→P17 | V11→V21→V31 | T1 |
| 12 | DSS | P2→P1 | P17→P16 | V12→V22→V32 | T2 |
|    | USS | P2→P1 | P17 | V42 | - |
| 13 | DSS | P1→P2 | P17 | V41 | - |
|    | USS | - | - | - | - |

FIG. 27

BICYCLE TRANSMISSION APPARATUS AND BICYCLE DRIVE UNIT

BACKGROUND OF THE INVENTION

Field of the Invention

The present invention relates to a bicycle transmission apparatus and a bicycle drive unit.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a transmission apparatus.

SUMMARY OF THE INVENTION

In accordance with a first aspect of the present invention, a bicycle transmission apparatus comprises a base member, a first transmission member, a second transmission member, a first coupling member, a first guide structure, a switching device, and a transmission controller. The first transmission member is rotatable relative to the base member about a first rotational axis and is movable relative to the base member in an axial direction parallel to the first rotational axis. The first transmission member includes first cogwheels arranged in the axial direction. The first cogwheels have different outer diameters. The second transmission member is rotatable relative to the base member about a second rotational axis and is stationary relative to the base member in the axial direction. The second transmission member includes second cogwheels arranged in the axial direction. The second cogwheels have different outer diameters. The first coupling member is configured to couple the first transmission member to the second transmission member to transmit rotation of one of the first transmission member and the second transmission member to the other of the first transmission member and the second transmission member at a variable speed stage. The variable speed stage is variable in accordance with at least one positional relationship among the first transmission member, the second transmission member, and the first coupling member in the axial direction. The first coupling member have a first engagement state where the first coupling member is engaged with one of the first cogwheels, and a second engagement state where the first coupling member is engaged with one of the second cogwheels. The first guide structure is configured to guide the first coupling member relative to the base member in a guide direction intersecting with a plane perpendicular to the axial direction. The switching device is configured to switch a position of the first transmission member relative to the base member in the axial direction between a first axial position and a second axial position. The transmission controller is configured to control the switching device and the first guide structure so as not to change the first engagement state of the first coupling member from one cogwheel to another adjacent cogwheel among the first cogwheels when the first transmission member moves relative to the base member in association with a movement of the first guide structure relative to the base member to change the second engagement state of the first coupling member from one cogwheel to another adjacent cogwheel among the second cogwheels.

With the bicycle transmission apparatus according to the first aspect, it is possible to change the second engagement state of the first coupling member without changing the first engagement state of the first coupling member. Accordingly, it is possible to smoothly shift the first coupling member relative to the second transmission member.

In accordance with a second aspect of the present invention, the bicycle transmission apparatus according to the first aspect is configured so that the transmission controller is configured to control the switching device to change a moving speed of the first transmission member when the switching device switches the position of the first transmission member between the first axial position and the second axial position.

With the bicycle transmission apparatus according to the second aspect, it is possible to change the second engagement state of the first coupling member prior to changing the first engagement state of the first coupling member by changing the moving speed of the first transmission member. Accordingly, it is possible to change the second engagement state of the first coupling member without changing the first engagement state of the first coupling member.

In accordance with a third aspect of the present invention, the bicycle transmission apparatus according to the first or second aspect is configured so that the transmission controller is configured to move the first transmission member at a first timing and to move the first guide structure at a second timing which is different from the first timing when the switching device switches the position of the first transmission member between the first axial position and the second axial position.

With the bicycle transmission apparatus according to the third aspect, it is possible to change the second engagement state of the first coupling member prior to changing the first engagement state of the first coupling member by differing the timings of moving the first transmission member and the first guide structure. Accordingly, it is possible to change the second engagement state without changing the first engagement state.

In accordance with a fourth aspect of the present invention, the bicycle transmission apparatus according to any one of the first to third aspects is configured so that the first transmission member moves relative to the second transmission member in the axial direction by a travel distance defined between the first axial position and the second axial position to change the first engagement state of the first coupling member from one cogwheel to another adjacent cogwheel among the first cogwheels.

With the bicycle transmission apparatus according to the fourth aspect, it is possible to shift the first coupling member relative to the first transmission member.

In accordance with a fifth aspect of the present invention, the bicycle transmission apparatus according to any one of the first to fourth aspects is configured so that the first guide structure is provided in a releasing area defined between the first transmission member and the second transmission member. The first coupling member is released in the releasing area from the first transmission member to the second transmission member.

With the bicycle transmission apparatus according to the fifth aspect, it is possible to assist changing of the second engagement state of the first coupling member using the first guide structure.

In accordance with a sixth aspect of the present invention, the bicycle transmission apparatus according to any one of the first to fifth aspects further comprises a second guide structure to guide the first coupling member between the first transmission member and the second transmission member. The second guide structure is provided in a pulling area defined between the first transmission member and the second transmission member. The first coupling member is pulled in the pulling area by the first transmission member to transmit a pedaling force from the first transmission member to the second transmission member.

With the bicycle transmission apparatus according to the sixth aspect, it is possible to assist changing of the first engagement state of the first coupling member using the second guide structure.

In accordance with a seventh aspect of the present invention, the bicycle transmission apparatus according to the sixth aspect is configured so that the second guide structure includes a second guide member contactable with the first coupling member, and a guide support to slidably support the second guide member to apply a sliding resistance to the second guide member. The second guide member moves relative to the guide support in response to a pushing force applied from the first coupling member to the second guide member beyond the sliding resistance.

With the bicycle transmission apparatus according to the seventh aspect, it is possible to apply a resistance to the first coupling member via the second guide member. Thus, it is possible to change the first engagement state of the first coupling member using the second guide structure having a simple construction.

In accordance with an eighth aspect of the present invention, the bicycle transmission apparatus according to any one of the second to seventh aspects is configured so that the transmission controller is configured to control the switching device to move the first transmission member from one of the first axial position and the second axial position relative to the base member at a first speed when the switching device switches the position of the first transmission member between the first axial position and the second axial position.

With the bicycle transmission apparatus according to the eighth aspect, it is possible to change the second engagement state of the first coupling member without changing the first engagement state of the first coupling member by adjusting the first speed to a suitable speed.

In accordance with a ninth aspect of the present invention, the bicycle transmission apparatus according to the eighth aspect is configured so that the transmission controller is configured to control the switching device to temporarily change the moving speed of the first transmission member from the first speed to a second speed when the switching device switches the position of the first transmission member between the first axial position and the second axial position. The second speed is lower than the first speed.

With the bicycle transmission apparatus according to the ninth aspect, it is possible to certainly change the second engagement state of the first coupling member without changing the first engagement state of the first coupling member by decreasing the moving speed from the first speed to the second speed.

In accordance with a tenth aspect of the present invention, the bicycle transmission apparatus according to the ninth aspect is configured so that the second speed is zero.

With the bicycle transmission apparatus according to the tenth aspect, it is possible to temporarily stop the first transmission member. This allows the second engagement state of the first coupling member to be certainly changed without changing the first engagement state of the first coupling member.

In accordance with an eleventh aspect of the present invention, the bicycle transmission apparatus according to the tenth aspect is configured so that the switching device changes the moving speed from the first speed to zero to temporarily stop the first transmission member at a third axial position defined between the first axial position and the second axial position for a stop time when the switching device switches the position of the first transmission member between the first axial position and the second axial position.

With the bicycle transmission apparatus according to the eleventh aspect, it is possible to more certainly change the second engagement state of the first coupling member without changing the first engagement state of the first coupling member.

In accordance with a twelfth aspect of the present invention, the bicycle transmission apparatus according to the eleventh aspect further comprises a rotational position sensor configured to sense one of a rotational position of the first transmission member relative to the base member, a rotational position of the second transmission member relative to the base member, and a rotational position of a bicycle crank relative to the base member. The transmission controller is configured to calculate the stop time based on the rotational position sensed by the rotational position sensor.

With the bicycle transmission apparatus according to the twelfth aspect, it is possible to set the stop time in accordance with the rotational position sensed by the rotational position sensor. Thus, it is possible to more certainly change the second engagement state of the first coupling member without changing the first engagement state of the first coupling member.

In accordance with a thirteenth aspect of the present invention, the bicycle transmission apparatus according to the eleventh or twelfth aspect further comprises a rotational speed sensor configured to sense one of a rotational speed of the first transmission member relative to the base member, a rotational speed of the second transmission member relative to the base member, and a rotational speed of a bicycle crank relative to the base member. The transmission controller is configured to calculate the stop time based on the rotational speed sensed by the rotational speed sensor.

With the bicycle transmission apparatus according to the thirteenth aspect, it is possible to set the stop time in accordance with the rotational speed sensed by the rotational speed sensor. Thus, it is possible to more certainly change the second engagement state of the first coupling member without changing the first engagement state of the first coupling member.

In accordance with a fourteenth aspect of the present invention, the bicycle transmission apparatus according to any one of the ninth to thirteenth aspects is configured so that the transmission controller is configured to control the switching device to change the moving speed of the first transmission member from the second speed to a third speed when the switching device switches the position of the first transmission member between the first axial position and the second axial position. The third speed is higher than the second speed.

With the bicycle transmission apparatus according to the fourteenth aspect, it is possible to shorten a travelling time of the first transmission member with smoothly changing the second engagement state of the first coupling member.

In accordance with a fifteenth aspect of the present invention, the bicycle transmission apparatus according to the fourteenth aspect is configured so that the third speed is equal to the first speed.

With the bicycle transmission apparatus according to the fifteenth aspect, it is possible to further shorten a travelling time of the first transmission member with smoothly changing the second engagement state of the first coupling member.

In accordance with a sixteenth aspect of the present invention, a bicycle transmission apparatus comprises a base member, a first transmission member, a second transmission member, and a first coupling member. The base member includes an attachment guide. The first transmission member is rotatable relative to the base member about a first rotational axis. The first transmission member is detachably attached to the base member. The attachment guide is configured to guide the first transmission member to a predetermined position when the first transmission member is mounted on the base member. The second transmission member is rotatable relative to the base member about a second rotational axis. The first coupling member is configured to couple the first transmission member to the second transmission member to transmit rotation of one of the first transmission member and the second transmission member to the other of the first transmission member and the second transmission member at a variable speed stage. The variable speed stage being variable in accordance with at least one positional relationship among the first transmission member, the second transmission member, and the first coupling member in an axial direction parallel to the first rotational axis.

With the bicycle transmission apparatus according to the sixteenth aspect, it is possible to easily mount the first transmission member to the base member.

In accordance with a seventeenth aspect of the present invention, the bicycle transmission apparatus according to the sixteenth aspect is configured so that the first transmission member is detachable from the base member in a mounting direction perpendicular to the first rotational axis. The first transmission member is attachable to the base member in the mounting direction.

With the bicycle transmission apparatus according to the seventeenth aspect, it is possible to easily clean up the first transmission member and replace the first transmission member with another transmission member to set suitable gear ratios.

In accordance with an eighteenth aspect of the present invention, the bicycle transmission apparatus according to the seventeenth aspect is configured so that the attachment guide includes one of an attachment opening and a protruding part. The first transmission member includes the other of the attachment opening and the protruding part. The protruding part is detachably provided in the attachment opening.

With the bicycle transmission apparatus according to the eighteenth aspect, it is possible to simplify the structure of at least one of the attachment guide and the first transmission member.

In accordance with a nineteenth aspect of the present invention, the bicycle transmission apparatus according to the eighteenth aspect is configured so that the attachment opening includes an attachment groove extending in the mounting direction.

With the bicycle transmission apparatus according to the nineteenth aspect, it is possible to guide the first transmission member relative to the base member using the attachment groove of the attachment opening.

In accordance with a twentieth aspect of the present invention, the bicycle transmission apparatus according to the nineteenth aspect further comprises a securing member to secure the first transmission member to the base member.

With the bicycle transmission apparatus according to the twentieth aspect, it is possible to secure the first transmission member to the base member with a simple structure such as the securing member.

In accordance with a twenty-first aspect of the present invention, the bicycle transmission apparatus according to the twentieth aspect is configured so that the attachment opening includes an attachment through-hole provided in the attachment groove. The securing member extends through the attachment through-hole to secure the first transmission member to the base member.

With the bicycle transmission apparatus according to the twenty-first aspect, it is possible to secure the first transmission member to the base member with a simple structure such as the securing member and the attachment through-hole.

In accordance with a twenty-second aspect of the present invention, the bicycle transmission apparatus according to any one of the nineteenth to twenty-first aspects is configured so that the attachment groove includes a closed end and an open end opposite to the closed end in the mounting direction. The first transmission member receives a holding force from the first coupling member to maintain the first transmission member at the closed end in the attachment groove. The open end is provided within a circumferential area defined about the first rotational axis when viewed from the axial direction. The second rotational axis is not provided in the circumferential area when viewed from the axial direction.

With the bicycle transmission apparatus according to the twenty-second aspect, it is possible to utilize the holding force to maintain the first transmission member at the closed end in the attachment groove.

In accordance with a twenty-third aspect of the present invention, the bicycle transmission apparatus according to any one of the sixteenth to twenty-second aspects is configured so that the first transmission member is movable relative to the base member in the axial direction.

With the bicycle transmission apparatus according to the twenty-third aspect, it is possible to change a relative position between the first transmission member and the second transmission member to shift the first coupling member relative to at least one of the first transmission member and the second transmission member.

In accordance with a twenty-fourth aspect of the present invention, a bicycle transmission apparatus comprises a base member, a first transmission member, a second transmission member, a first coupling member, and a switching device. The first transmission member is rotatable relative to the base member about a first rotational axis and is movable relative to the base member in an axial direction parallel to the first rotational axis. The second transmission member is rotatable relative to the base member about a second rotational axis and is stationary relative to the base member in the axial direction. The first coupling member is configured to couple the first transmission member to the second transmission member to transmit rotation of one of the first transmission member and the second transmission member to the other of the first transmission member and the second transmission member at a variable speed stage. The variable speed stage is variable in accordance with at least one positional relationship among the first transmission member, the second transmission member, and the first coupling member in the axial direction. The switching device is configured to switch a position of the first transmission member relative to the base member in the axial direction between a first axial position and a second axial position. The switching device includes a rotor and an axially-movable member. The rotor is rotatable about a rotational center axis which is non-parallel to the axial direction. The axially-movable member is coupled to the rotor to convert a rotation of the rotor to an axial movement of the first transmission member in the axial direction.

With the bicycle transmission apparatus according to the twenty-fourth aspect, it is possible to improve the flexibility of design of at least one of the first transmission member and the switching device.

In accordance with a twenty-fifth aspect of the present invention, the bicycle transmission apparatus according to the twenty-fourth aspect is configured so that the rotor includes an offset part offset from the rotational center axis to move around the rotational center axis. The axially-movable member includes a coupling groove. The offset part is provided in the coupling groove to convert the rotation of the rotor into the axial movement of the first transmission member in the axial direction.

With the bicycle transmission apparatus according to the twenty-fifth aspect, it is possible to convert the rotation of the rotor into the axial movement of the first transmission member with a simple structure such as the offset part and the coupling groove.

In accordance with a twenty-sixth aspect of the present invention, the bicycle transmission apparatus according to the twenty-fifth aspect is configured so that the coupling groove extends in an extending direction which is non-parallel to the axial direction.

With the bicycle transmission apparatus according to the twenty-sixth aspect, it is possible to convert the rotation of the rotor into the axial movement of the first transmission member with avoiding unnecessary interference between the axially-movable member and the offset part.

In accordance with a twenty-seventh aspect of the present invention, the bicycle transmission apparatus according to the twenty-fifth or twenty-sixth aspect is configured so that the rotor is detachably provided in the coupling groove.

With the bicycle transmission apparatus according to the twenty-seventh aspect, it is possible to easily clean up the first transmission member and the switching device and/or replace the first transmission member and the switching device with another transmission member and/or another switching device to set suitable gear ratios.

In accordance with a twenty-eighth aspect of the present invention, the bicycle transmission apparatus according to the twenty-seventh aspect is configured so that the coupling groove includes a closed end and an open end opposite to the closed end in the extending direction. The rotor is detachable from the open end of the coupling groove in the extending direction.

With the bicycle transmission apparatus according to the twenty-eighth aspect, it is possible to easily assemble the first transmission member and the switching device with a simple structure.

In accordance with a twenty-ninth aspect of the present invention, the bicycle transmission apparatus according to any one of the twenty-fifth to twenty-eighth aspects is configured so that the axially-movable member includes a coupling part coupled to the offset part. The coupling part has a substantially U-shape when viewed from a direction parallel to the rotational center axis.

With the bicycle transmission apparatus according to the twenty-ninth aspect, it is possible to easily assemble the first transmission member and the switching device with a simple structure.

In accordance with a thirtieth aspect of the present invention, a bicycle drive unit comprises a base member configured to be attached to a bicycle frame as a separate member from the bicycle frame. The base member comprises a bottom bracket adapter mounting portion configured to detachably fix a bottom bracket adapter to the base member.

With the bicycle drive unit according to the thirtieth aspect, it is possible to detachably fix the bottom bracket adapter to the bottom bracket adapter mounting portion of the base member. Thus, it is possible to rotatably mount a bicycle crank to the bicycle drive unit.

In accordance with a thirty-first aspect of the present invention, the bicycle drive unit according to the thirtieth aspect further comprises the bottom bracket adapter.

With the bicycle drive unit according to the thirty-first aspect, it is possible to treat the base member and the bottom bracket adapter as a single unit.

In accordance with a thirty-second aspect of the present invention, the bicycle drive unit according to the thirty-first aspect is configured so that the bottom bracket adapter and the base member are configured to hold a part of the bicycle frame between the bottom bracket adapter and the base member in a mounting state where the bicycle drive unit is mounted to the bicycle frame.

With the bicycle drive unit according to the thirty-second aspect, it is possible to firmly mount the bicycle drive unit to the bicycle frame.

In accordance with a thirty-third aspect of the present invention, the bicycle drive unit according to any one of the thirtieth to thirty-second aspects further comprises a first transmission member, a second transmission member, and a first coupling member. The first transmission member is rotatable relative to the base member about a first rotational axis. The second transmission member is rotatable relative to the base member about a second rotational axis. The first coupling member is configured to couple the first transmission member to the second transmission member to transmit rotation of one of the first transmission member and the second transmission member to the other of the first transmission member and the second transmission member at a variable speed stage. The variable speed stage is variable in accordance with at least one positional relationship among the first transmission member, the second transmission member, and the first coupling member in the axial direction.

With the bicycle drive unit according to the thirty-third aspect, it is possible to transmit the rotation between the first transmission member and the second transmission member at the variable speed stage.

In accordance with a thirty-fourth aspect of the present invention, the bicycle drive unit according to any one of the thirty-first to thirty-third aspects is configured so that the bottom bracket adapter extends through a mounting through-hole of the bicycle frame in the mounting state.

With the bicycle drive unit according to the thirty-fourth aspect, it is possible to easily mount the bottom bracket adapter to the bicycle frame.

In accordance with a thirty-fifth aspect of the present invention, the bicycle drive unit according to any one of the thirty-first to thirty-fourth aspects is configured so that the bottom bracket adapter mounting portion includes a threaded hole. The bottom bracket adapter includes external threads threadedly engaged with the threaded hole in the mounting state.

With the bicycle drive unit according to the thirty-fifth aspect, it is possible to firmly mount the bottom bracket adapter to the bicycle frame.

In accordance with a thirty-sixth aspect of the present invention, the bicycle drive unit according to any one of the thirty-second to thirty-fifth aspects is configured so that the bottom bracket adapter is partly received in a recess of the bicycle frame in the mounting state.

With the bicycle drive unit according to the thirty-sixth aspect, it is possible to easily mount the bottom bracket adapter to the bicycle frame with a simple structure.

In accordance with a thirty-seventh aspect of the present invention, the bicycle drive unit according to any one of the thirtieth to thirty-sixth aspects further comprises a bicycle crank and an input cogwheel. The bicycle crank includes a crank shaft rotatably supported by the bottom bracket adapter about a crank rotational axis. The input cogwheel is mounted to the crank shaft. The crank shaft includes a first serration. The input cogwheel includes a second serration engaged with the first serration.

With the bicycle drive unit according to the thirty-seventh aspect, it is possible to easily bring the crank shaft into engagement with the input cogwheel via the first serration and the second serration.

In accordance with a thirty-eighth aspect of the present invention, a bicycle drive unit comprises a base member, a first shaft element, a first cogwheel element, a second cogwheel element, a second shaft element, a third cogwheel element, a fourth cogwheel element, a first coupling element, and a second coupling element. The first shaft element is rotatably mounted to the base member about a first axis. The first cogwheel element is configured to be coupled to the first shaft element to rotate together with the first shaft element relative to the base member about the first axis. The first cogwheel element includes first cogs circumferentially arranged at a first pitch. The second cogwheel element is configured to be coupled to the first shaft element to rotate together with the first shaft element and the first cogwheel element relative to the base member about the first axis. The second cogwheel element includes second cogs circumferentially arranged at the first pitch. A total number of the second cogs is equal to a total number of the first cogs. A circumferential phase of the second cogs of the second cogwheel element is offset from a circumferential phase of the first cogs of the first cogwheel element by a half of the first pitch. The second shaft element is rotatably mounted to the base member about a second axis. The third cogwheel element is configured to be coupled to the second shaft element to rotate together with the second shaft element relative to the base member about the second axis. The third cogwheel element includes third cogs circumferentially arranged at a second pitch. The fourth cogwheel element is configured to be coupled to the second shaft element to rotate together with the second shaft element and the third cogwheel element relative to the base member about the second axis. The fourth cogwheel element includes fourth cogs circumferentially arranged at the second pitch. A total number of the fourth cogs is equal to a total number of the third cogs. A circumferential phase of the fourth cogs of the fourth cogwheel element is offset from a circumferential phase of the third cogs of the third cogwheel element by a half of the second pitch. The first coupling element is engaged with the first cogwheel element and the third cogwheel element to transmit rotation of the first shaft element to the second shaft element. The second coupling element is engaged with the second cogwheel element and the fourth cogwheel element to transmit rotation of the first shaft element to the second shaft element.

With the bicycle drive unit according to the thirty-eighth aspect, it is possible to reduce rotational fluctuation transmitted from the first shaft element to the second shaft element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 24 shows an example of gear ratios defined by the first transmission member and the second transmission member of the bicycle transmission apparatus illustrated in FIG.

FIG. 25 shows an example of combinations of a speed stage, a position of the first transmission member, and a position of a first guide member in the bicycle transmission apparatus illustrated in FIG. 1.

FIG. 27 shows an example of corresponding relationship among a shifting signal, an operation of a switching actuator, an operation of a guide actuator, a moving speed, and a stop time.

DESCRIPTION OF THE EMBODIMENTS

Figure 1:
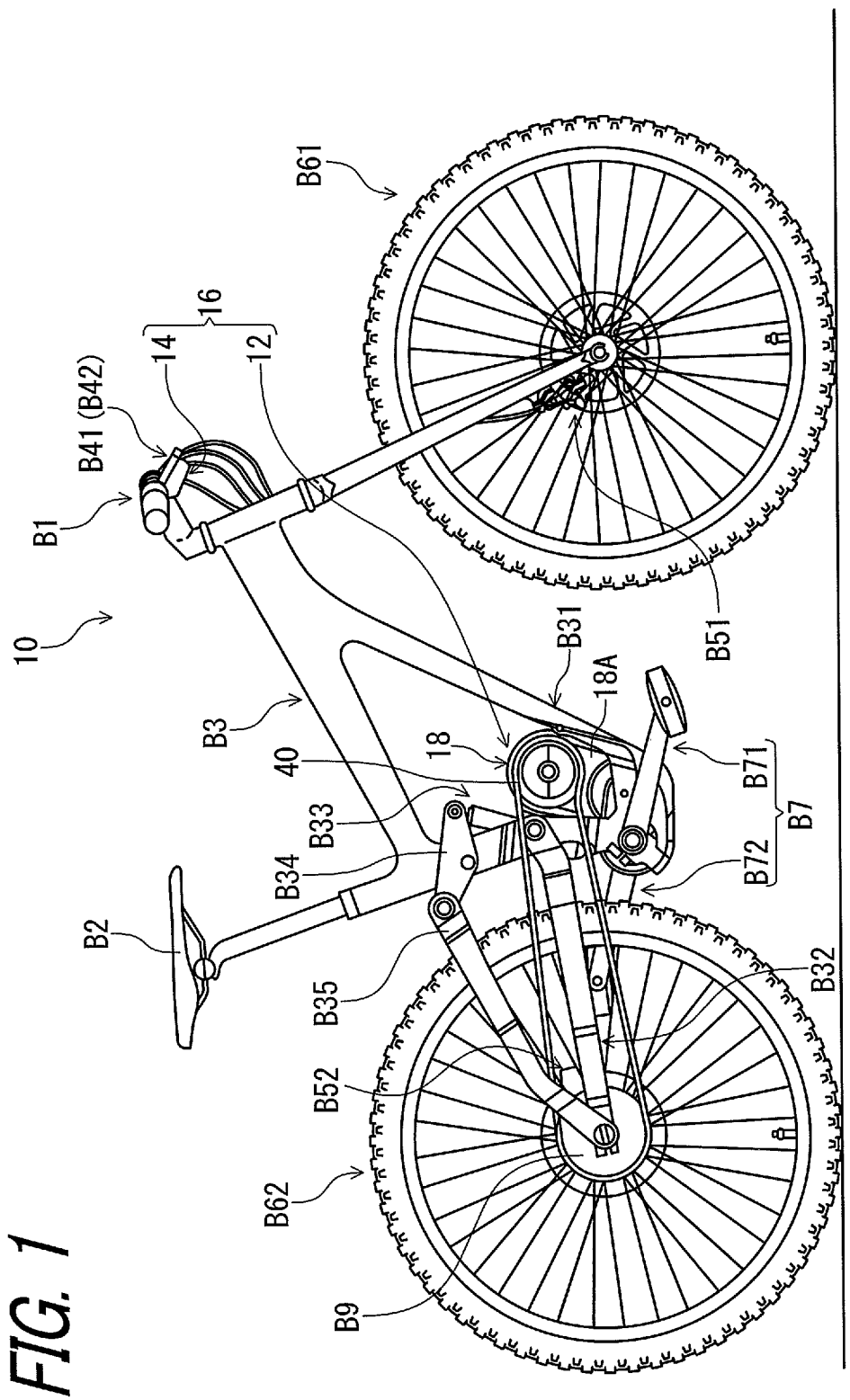
FIG. 1 is a side elevational view of a bicycle provided with a bicycle transmission apparatus in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle transmission apparatus 12 in accordance with a first embodiment. While the bicycle 10 is illustrated as a mountain bike, the bicycle transmission apparatus 12 can be applied to road bikes or any type of bicycle.

As seen in FIG. 1, the bicycle 10 comprises a handlebar B1, a saddle B2, a bicycle frame B3, a front brake operating device B41, a rear brake operating device B42, a front braking device B51, a rear braking device B52, a front wheel B61, a rear wheel B62, and a bicycle crank B7. The front brake operating device B41 is operatively coupled to the front braking device B51 via an operation cable. The rear brake operating device B42 is operatively coupled to the rear braking device B52 via an operation cable. The bicycle crank B7 includes crank arms B71 and B72 each coupled to the bicycle transmission apparatus 12 to input a pedaling force into the bicycle transmission apparatus 12.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle B2 of the bicycle 10 with facing the handlebar B1. Accordingly, these terms, as utilized to describe the bicycle transmission apparatus 12, should be interpreted relative to the bicycle 10 equipped with the bicycle transmission apparatus 12 as used in an upright riding position on a horizontal surface.

The bicycle 10 includes a shifter 14 via which the bicycle transmission apparatus 12 is operated by the user (e.g., the rider) for changing a speed stage of the bicycle transmission apparatus 12. The shifter 14 is mounted to the handlebar B1 and is adjacent to the front brake operating device B41, for example. The shifter 14 can be integrated in at least one of the front brake operating device B41 and the rear brake operating device B42 if needed and/or desired.

The bicycle transmission apparatus 12 and the shifter 14 constitute a bicycle transmission system 16. The shifter 14 is operatively coupled to the bicycle transmission apparatus 12. In this embodiment, the shifter 14 is electrically connected to the bicycle transmission apparatus 12 via an electrical control cable. While the bicycle transmission apparatus 12 is electrically actuated in response to a shift operation of the shifter 14 in this embodiment, the shifter 14 can be mechanically coupled to the bicycle transmission apparatus 12 if needed and/or desired. Furthermore, the bicycle transmission apparatus 12 and the shifter 14 can use a wireless technology if needed and/or desired.

As seen in FIG. 1, the bicycle transmission apparatus 12 is mounted to the bicycle frame B3. The bicycle transmission apparatus 12 is configured to transmit the pedaling force to the rear wheel B62 at a variable speed stage. The variable speed stage includes speed stages different from each other. While the bicycle transmission apparatus 12 has thirteen speed stages in this embodiment, the bicycle transmission apparatus 12 can have at least two speed stages. Furthermore, the bicycle transmission apparatus 12 can have a continuously variable speed stage if needed and/or desired. The bicycle transmission apparatus 12 can also be referred to as a bicycle drive unit 12. Namely, the bicycle 10 comprises the bicycle drive unit 12. The bicycle drive unit 12 can include a power-assisted device.

As seen in FIG. 1, the bicycle transmission apparatus 12 (the bicycle drive unit 12) comprises a base member 18. The base member 18 is configured to be attached to the bicycle frame B3 as a separate member from the bicycle frame B3. However, at least part of the base member 18 can be integrally provided with the bicycle frame B3 as a one-piece unitary member if needed and/or desired. The base member 18 includes a housing 18A. The base member 18 is attached to the bicycle frame B3 via bolts.

In this embodiment, the bicycle frame B3 includes a first frame B31 and a second frame B32. The base member 18 is mounted to the first frame B31 as a separate member from the first frame B31. The second frame B32 is pivotably coupled to the first frame B31 about a pivot axis PA1.

As seen in FIG. 1, the second frame B32 is coupled to a hub shaft of a hub assembly of the rear wheel B62. The bicycle frame B3 further includes a suspension device B33, a first link B34, and a second link B35. The first link B34 is pivotably coupled to the first frame B31. The second link B35 is rotatably coupled to the rear wheel B62 and one end of the first link B34. The second link B35 is rigidly coupled to the second frame B32. The second link B35 and the second frame B32 may be integrally provided as a one-piece unitary member. The suspension device B33 is pivotably coupled to the first frame B31 and the other end of the first link B34 for absorbing shock applied to the bicycle frame B3.

Figure 2:
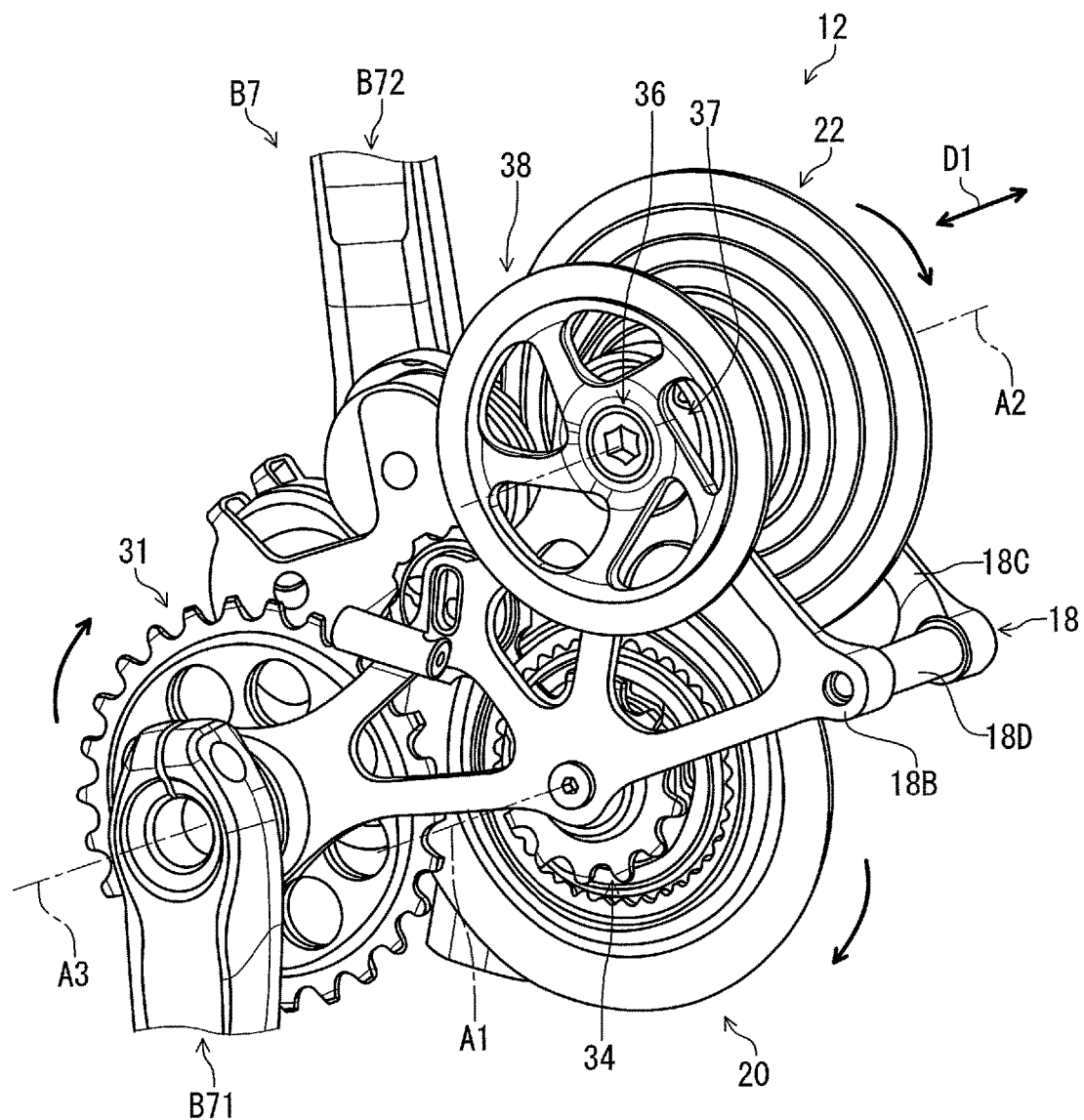
FIG. 2 is a perspective view of the bicycle transmission apparatus illustrated in FIG. 1.
Figure 3:
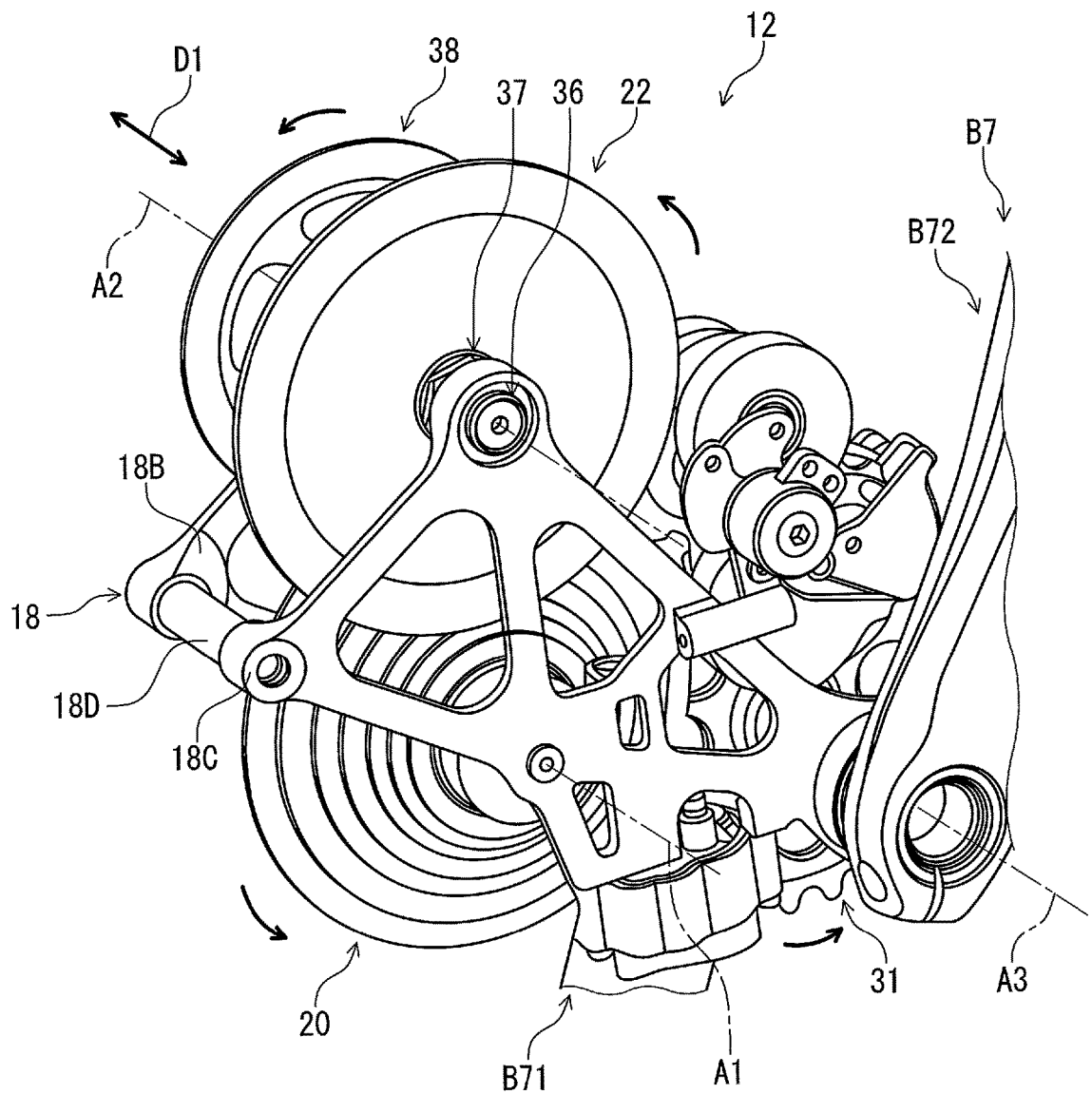
FIG. 3 is a perspective view of the bicycle transmission apparatus illustrated in FIG. 1.

In FIGS. 2 and 3, the housing 18A is omitted from the base member 18. As seen in FIGS. 2 and 3, the base member 18 includes a first base frame 18B, a second base frame 18C, and a coupling rod 18D. The first base frame 18B is a separate member from the second base frame 18C. The coupling rod 18D couples the first base frame 18B to the second base frame 18C. The first base frame 18B is spaced apart from the second base frame 18C. The first base frame 18B, the second base frame 18C, and the coupling rod 18D are provided in the housing 18A. The housing 18A (FIG. 1) is attached to the first base frame 18B and the second base frame 18C. The first base frame 18B, the second base frame 18C, and the coupling rod 18D can be integrally provided with a one-piece unitary member if needed and/or desired.

The bicycle transmission apparatus 12 comprises a first transmission member 20 and a second transmission member 22. The first transmission member 20 is rotatably coupled to the base member 18. The second transmission member 22 is rotatably coupled to the base member 18. The first transmission member 20 is provided between the first base frame 18B and the second base frame 18C. The second transmission member 22 is provided between the first base frame 18B and the second base frame 18C. The first transmission member 20 is rotatably coupled to the first base frame 18B and the second base frame 18C. The second transmission member 22 is rotatably coupled to the first base frame 18B and the second base frame 18C.

The first transmission member 20 is rotatable relative to the base member 18 about a first rotational axis A1. The second transmission member 22 is rotatable relative to the base member 18 about a second rotational axis A2. The second rotational axis A2 is parallel to the first rotational axis A1 in this embodiment. However, the second rotational axis A2 can be non-parallel to the first rotational axis A1 if needed and/or desired.

Figure 4:
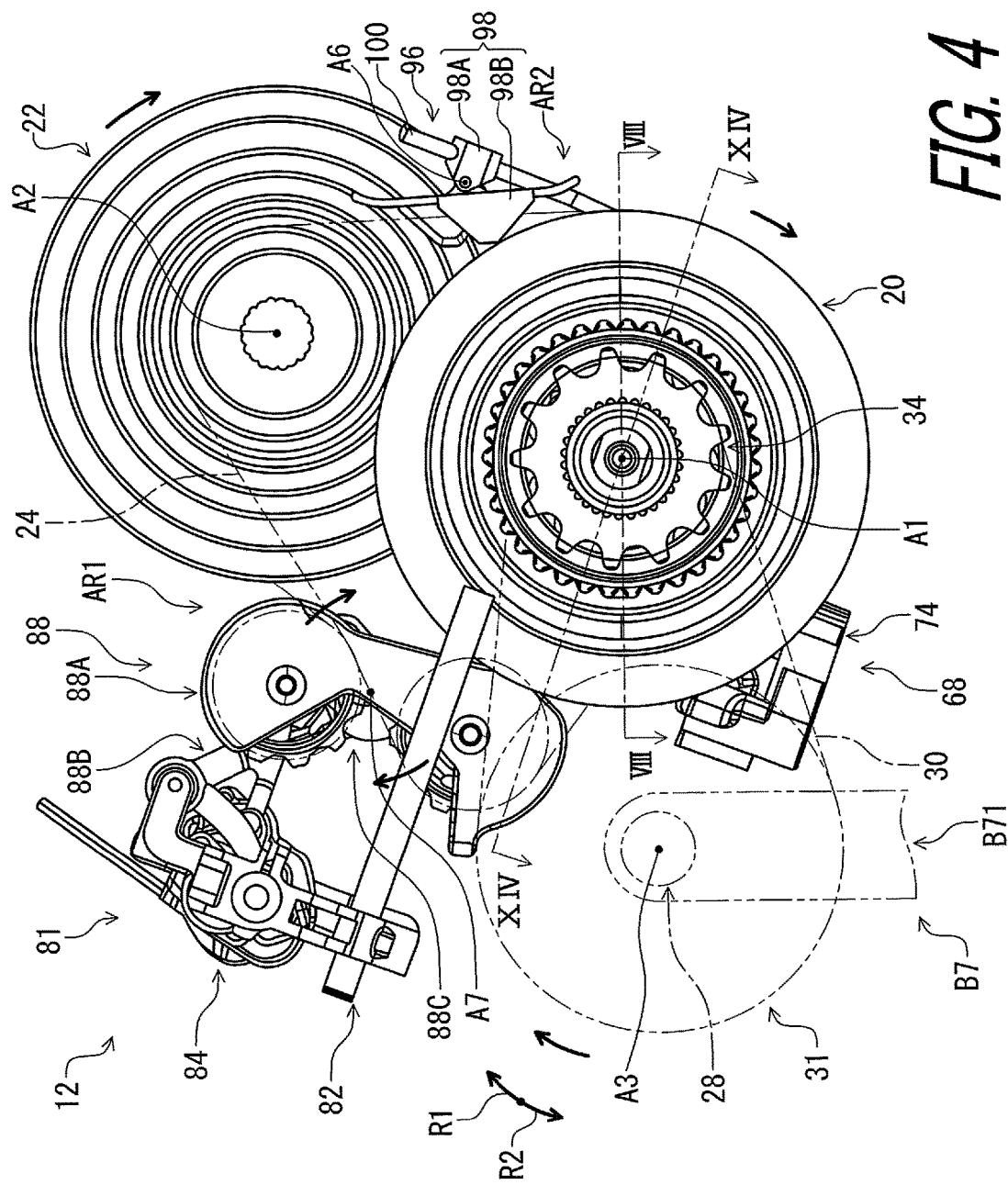
FIG. 4 is a side elevational view of the bicycle transmission apparatus illustrated in FIG. 1.
Figure 5:
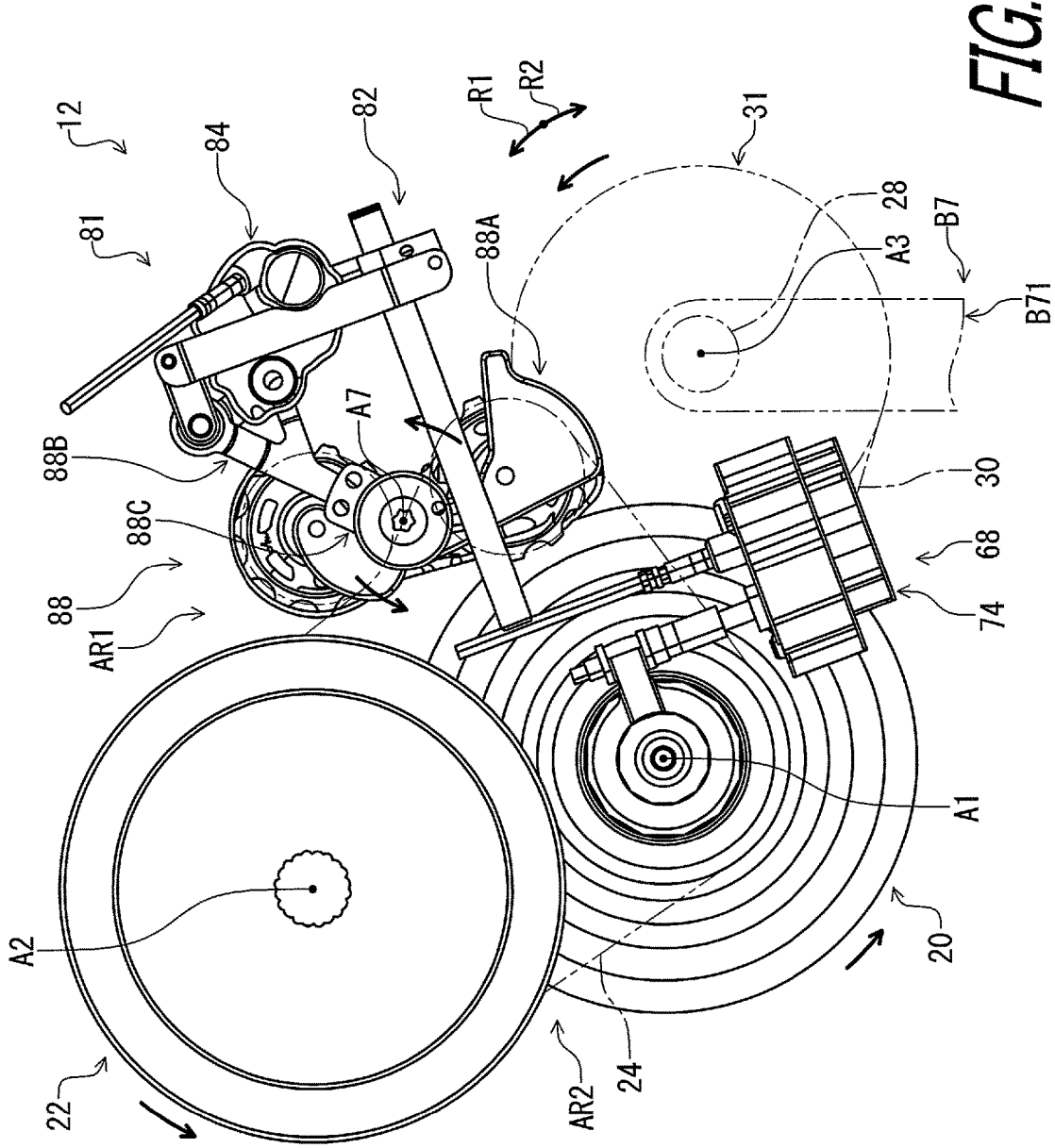
FIG. 5 is a side elevational view of the bicycle transmission apparatus illustrated in FIG. 1.

As seen in FIGS. 4 and 5, the bicycle transmission apparatus 12 comprises a first coupling member 24. The first coupling member 24 is configured to couple the first transmission member 20 to the second transmission member 22 to transmit rotation of one of the first transmission member 20 and the second transmission member 22 to the other of the first transmission member 20 and the second transmission member 22 at a variable speed stage.

In this embodiment, the first coupling member 24 is configured to couple the first transmission member 20 to the second transmission member 22 to transmit rotation of the first transmission member 20 to the second transmission member 22 at the variable speed stage. However, the first coupling member 24 can be configured to couple the first transmission member 20 to the second transmission member 22 to transmit rotation of the second transmission member 22 to the first transmission member 20 at the variable speed stage.

The first coupling member 24 has an annular shape (a closed-loop shape) to surround the first rotational axis A1 and the second rotational axis A2 when viewed from an axial direction D1 (FIGS. 2 and 3) parallel to the first rotational axis A1. In this embodiment, the first coupling member 24 comprises a bicycle chain configured to engage with the first transmission member 20 and the second transmission member 22. The first coupling member 24 has a chain pitch equal to or smaller than 12 mm, for example. The chain pitch is more preferably equal to or smaller than 10 mm. The chain pitch is further more preferably equal to or smaller than 8.4 mm. The first coupling member 24 can comprise a coupling member such as a coupling belt. The first transmission member 20 and the second transmission member 22 partially overlap with each other when viewed from the axial direction D1.

Figure 6:
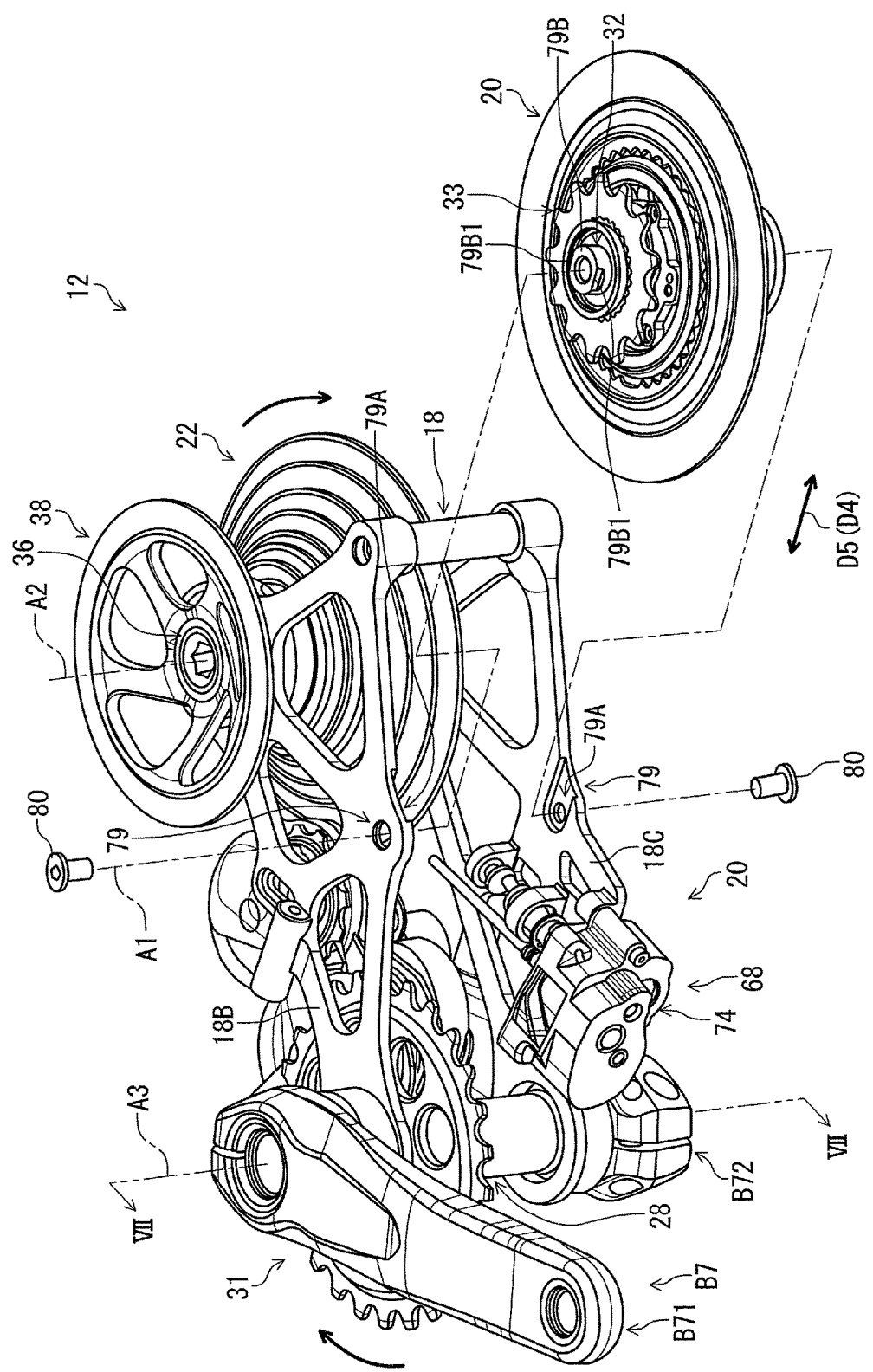
FIG. 6 is an exploded perspective view of the bicycle transmission apparatus illustrated in FIG. 1.

As seen in FIG. 6, the bicycle transmission apparatus 12 further comprises an input shaft 28. The input shaft 28 is rotatably mounted to the base member 18 to receive an input torque. The input shaft 28 is rotatable relative to the base member 18 about an input rotational axis A3 in response to the input torque. The input shaft 28 is configured to be coupled to a crank arm of the bicycle crank B7 as a crank shaft of the bicycle crank B7. In this embodiment, the input shaft 28 is configured to be coupled to the crank arms B71 and B72 of the bicycle crank B7 as the crank shaft of the bicycle crank B7. The input shaft 28 can also be referred to as a crank shaft 28.

As seen in FIGS. 4 and 5, the bicycle transmission apparatus 12 further comprises an input coupling member 30. The input coupling member 30 is configured to couple the input shaft 28 to the first transmission member 20 to transmit rotation of the input shaft 28 to the first transmission member 20. The first transmission member 20 is configured to be coupled to the input shaft 28 via the input coupling member 30 to rotate with the input shaft 28 relative to the base member 18. In the present application, the input coupling member 30 can also be referred to as a first coupling element 30.

The input coupling member 30 has an annular shape (a closed-loop shape) to surround the input rotational axis A3 and the first rotational axis A1 when viewed from the axial direction D1. The input coupling member 30 is provided in the housing 18A (FIG. 1). In this embodiment, the input coupling member 30 comprises a bicycle chain configured to couple the input shaft 28 to the first transmission member 20. The input coupling member 30 has a chain pitch equal to or smaller than 12 mm, for example. The input coupling member 30 can comprise a coupling member such as a coupling belt.

As seen in FIG. 6, the bicycle transmission apparatus 12 further comprises an input cogwheel 31. The input cogwheel 31 is configured to be coupled to the input shaft 28 to rotate together with the input shaft 28 relative to the base member 18 about the input rotational axis A3. The input rotational axis A3 can also be referred to as a crank rotational axis A3. In the present application, the input shaft 28 can also be referred to as a first shaft element 28, and the input cogwheel 31 can also be referred to as a first cogwheel element 31. The input rotational axis A3 can also be referred to as a first axis A3.

Figure 7:
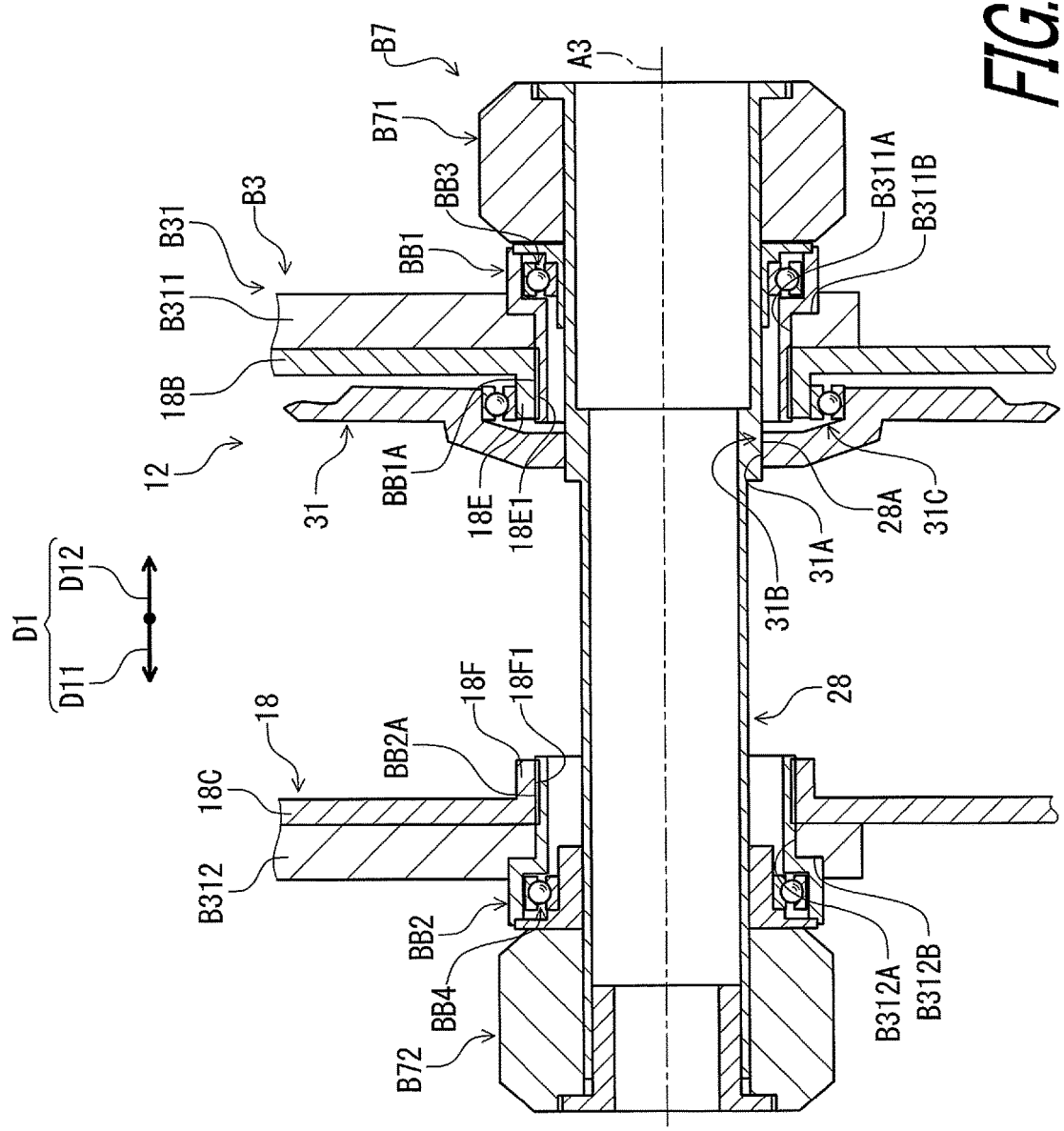
FIG. 7 is a cross-sectional view of the bicycle transmission apparatus taken along line VII-VII of FIG. 6.

As seen in FIG. 7, the base member 18 comprises a bottom bracket adapter mounting portion. In this embodiment, the base member 18 comprises bottom bracket adapter mounting portions 18E and 18F. Each of the bottom bracket adapter mounting portions 18E and 18F has a tubular shape and is coaxial with the input rotational axis A3. The bicycle drive unit 12 further comprises a bottom bracket adapter. In this embodiment, the bicycle drive unit 12 further comprises bottom bracket adapters BB1 and BB2. Each of the bottom bracket adapters BB1 and BB2 has a tubular shape and is coaxial with the input rotational axis A3. The bottom bracket adapter mounting portion 18E is configured to detachably fix the bottom bracket adapter BB1 to the base member 18. The bottom bracket adapter mounting portion 18F is configured to detachably fix the bottom bracket adapter BB2 to the base member 18.

The bottom bracket adapter BB1 and the base member 18 are configured to hold a part of the bicycle frame B3 between the bottom bracket adapter BB1 and the base member 18 in a mounting state where the bicycle drive unit 12 is mounted to the bicycle frame B3. The bottom bracket adapter BB2 and the base member 18 are configured to hold a part of the bicycle frame B3 between the bottom bracket adapter BB2 and the base member 18 in the mounting state where the bicycle drive unit 12 is mounted to the bicycle frame B3. In this embodiment, the bottom bracket adapter BB1 and the base member 18 are configured to hold a first sub frame B311 of the first frame B31 of the bicycle frame B3 between the bottom bracket adapter BB1 and the bottom bracket adapter mounting portion 18E in the mounting state. The bottom bracket adapter BB2 and the base member 18 are configured to hold a second sub frame B312 of the first frame B31 of the bicycle frame B3 between the bottom bracket adapter BB2 and the bottom bracket adapter mounting portion 18F in the mounting state. The base member 18 is provided between the first and second sub frames B311 and B312 in the axial direction D1.

The bottom bracket adapter BB1 extends through a mounting through-hole B311A of the bicycle frame B3 in the mounting state. The bottom bracket adapter BB2 extends through a mounting through-hole B312A of the bicycle frame B3 in the mounting state. The first sub frame B311 includes the mounting through-hole B311A. The second sub frame B312 includes the mounting through-hole B312A.

The bottom bracket adapter mounting portion 18E includes a threaded hole 18E1. The bottom bracket adapter BB1 includes external threads BB1A threadedly engaged with the threaded hole 18E1 in the mounting state. The bottom bracket adapter mounting portion 18F includes a threaded hole 18F1. The bottom bracket adapter BB2 includes external threads BB2A threadedly engaged with the threaded hole 18F1 in the mounting state.

The bottom bracket adapter BB1 is partly received in a recess B311B of the bicycle frame B3 in the mounting state. The bottom bracket adapter BB2 is partly received in a recess B312B of the bicycle frame B3 in the mounting state. The first sub frame B311 includes the recess B311B. The second sub frame B312 includes the recess B312B. The mounting through-hole B311A is provided in the recess B311B. The mounting through-hole B312A is provided in the recess B312B.

The bicycle drive unit 12 further comprises the bicycle crank B7 and the input cogwheel 31. The bicycle crank B7 includes the crank shaft 28 rotatably supported by the bottom bracket adapter BB1 about the crank rotational axis A3. The input cogwheel 31 is mounted to the crank shaft 28. The crank shaft 28 includes a first serration 28A. The input cogwheel 31 includes a second serration 31A engaged with the first serration 28A. The first serration 28A is provided on an outer peripheral surface of the crank shaft 28. The input cogwheel 31 includes a center opening 31B. The second serration 31A is provided on an inner peripheral surface of the center opening 31B of the input cogwheel 31. The input cogwheel 31 is rotatable integrally with the crank shaft 28 about the crank rotational axis A3. The first serration 28A and the second serration 31A allow the crank shaft 28 to be inserted into or removed from the center opening 31B of the input cogwheel 31.

The bicycle drive unit 12 further comprises crank bearing assemblies BB3 and BB4. The crank bearing assembly BB3 is provided between the crank shaft 28 and the bottom bracket adapter BB1 to rotatably support the crank shaft 28 relative to the base member 18. The crank bearing assembly BB4 is provided between the crank shaft 28 and the bottom bracket adapter BB2 to rotatably support the crank shaft 28 relative to the base member 18. The bicycle drive unit 12 further comprises an input bearing assembly 31C. The input bearing assembly 31C is provided between the input cogwheel 31 and the bottom bracket adapter mounting portion 18E to rotatably support the input cogwheel 31 relative to the base member 18.

Figure 8:
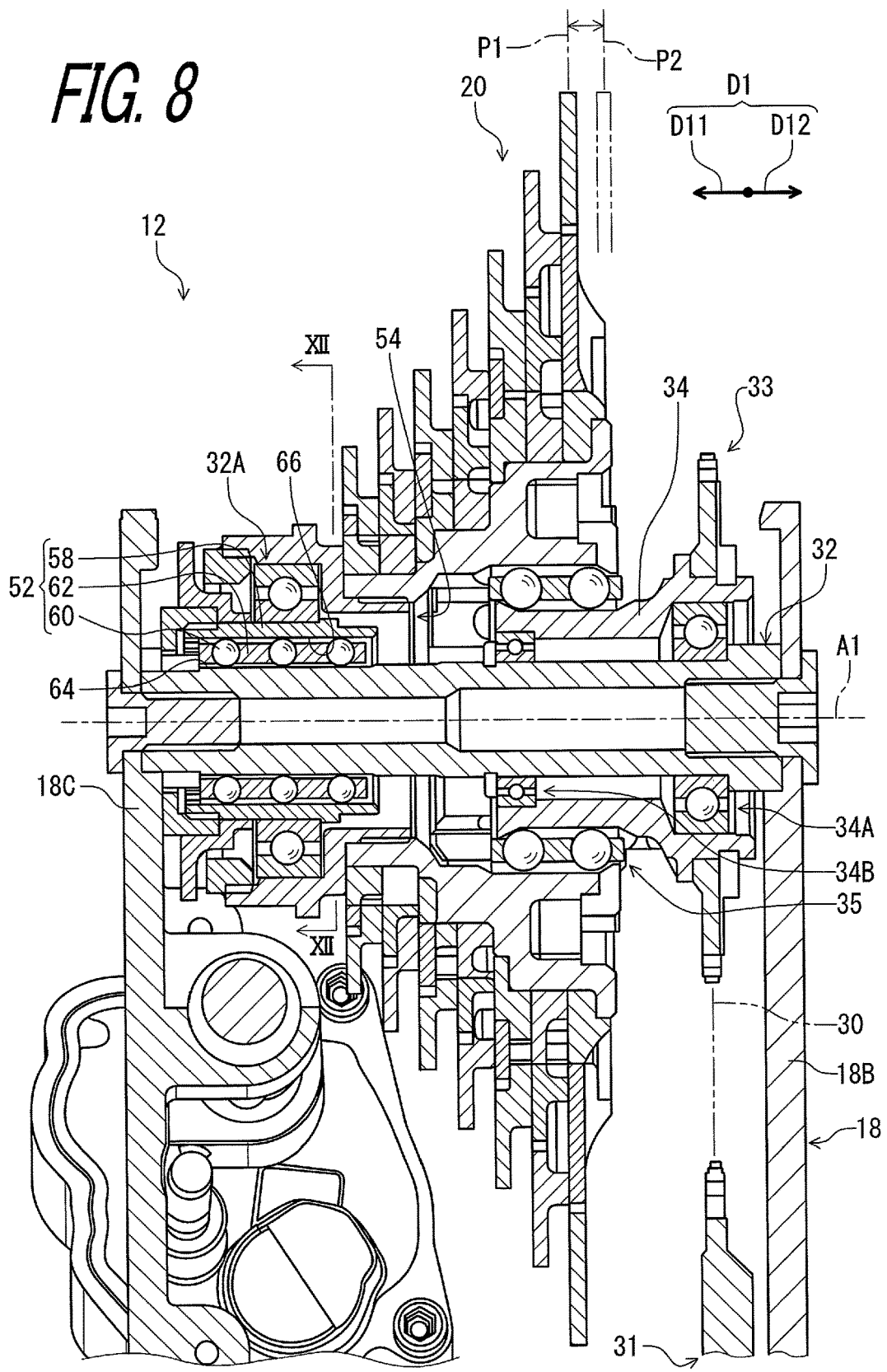
FIG. 8 is a cross-sectional view of the bicycle transmission apparatus taken along line VIII-VIII of FIG. 4.

As seen in FIG. 8, the bicycle transmission apparatus 12 further comprises a first shaft 32, a first bearing assembly 32A, an intermediate cogwheel 33, an intermediate support body 34, and intermediate bearing assemblies 34A and 34B. The first shaft 32 defines the first rotational axis A1. The first transmission member 20 is rotatable relative to the first shaft 32 about the first rotational axis A1. The first bearing assembly 32A is provided between the first transmission member 20 and the first shaft 32 to rotatably support the first transmission member 20 relative to the first shaft 32. The intermediate cogwheel 33 is rotatable relative to the first shaft 32 about the first rotational axis A1. The intermediate cogwheel 33 is secured to the intermediate support body 34. The intermediate support body 34 is rotatably mounted on the first shaft 32. The intermediate bearing assemblies 34A and 34B are provided between the intermediate support body 34 and the first shaft 32 to rotatably support the intermediate support body 34 relative to the first shaft 32. Both axial ends of the first shaft 32 is respectively coupled to the first base frame 18B and the second base frame 18C. In the present application, the first shaft 32 can also be referred to as a second shaft element 32, and the intermediate cogwheel 33 can also be referred to as a third cogwheel element 33. The first rotational axis A1 can also be referred to as a second axis A1.

As seen in FIGS. 4 and 5, the intermediate cogwheel 33 is coupled to the input cogwheel 31 via the input coupling member 30. The input coupling member 30 is configured to couple the input cogwheel 31 to the intermediate cogwheel 33 to transmit rotation of the input shaft 28 to the first transmission member 20.

The input cogwheel 31 comprises a sprocket including teeth. The intermediate cogwheel 33 comprises a sprocket including teeth. The input shaft 28 is configured to be coupled to the first transmission member 20 via the input cogwheel 31, the input coupling member 30, and the intermediate cogwheel 33 to rotate with the input shaft 28 relative to the base member 18.

As seen in FIG. 8, the intermediate cogwheel 33 is coupled to the first transmission member 20 to rotate together with the first transmission member 20 relative to the base member 18 about the first rotational axis A1. In this embodiment, the bicycle transmission apparatus 12 further comprises a side bearing 35. The side bearing 35 is configured to transmit a first rotation R1 (FIG. 4) of the input shaft 28 to the first transmission member 20 and is configured to transmit a second rotation R2 (FIG. 4) of the input shaft 28. As seen in FIG. 4, the second rotation R2 is opposite to the first rotation R1 about the input rotational axis A3.

The side bearing 35 is configured to couple the input cogwheel 31 to the first transmission member 20 and is provided between the input cogwheel 31 and the first transmission member 20. Specifically, the side bearing 35 is provided between the first transmission member 20 and the intermediate cogwheel 33. The side bearing 35 is provided between the first transmission member 20 and the intermediate support body 34 to movably support the first transmission member 20 in the axial direction D1 relative to the first shaft 32. The side bearing 35 permits the relative movement between the side bearing and the intermediate cogwheel 33 in the axial direction D1. The side bearing 35 can have a function of a one way clutch which is configured to transmit a first rotation R1 (FIG. 4) of the input shaft 28 to the first transmission member 20 and is configured to prevent a second rotation R2 (FIG. 4) of the input shaft 28 from being transmitted from the input shaft 28 to the first transmission member 20. The one-way clutch can be provided at other positions or can be omitted from the bicycle transmission apparatus 12 if needed and/or desired.

As seen in FIGS. 2 and 3, the bicycle transmission apparatus 12 further comprises an output shaft 36. The output shaft 36 is rotatable relative to the base member 18 about the second rotational axis A2. The second transmission member 22 is coupled to the output shaft 36 to rotate together with the output shaft 36 relative to the base member 18 about the second rotational axis A2. The bicycle transmission apparatus 12 further comprises output bearing assemblies 37. The output shaft 36 is rotatably mounted to the base member 18 via the output bearing assemblies 37.

The bicycle transmission apparatus 12 further comprises an output cogwheel 38. The output cogwheel 38 is configured to be coupled to the output shaft 36 to rotate together with the output shaft 36 relative to the base member 18 about the second rotational axis A2. Namely, the second transmission member 22, the output shaft 36, and the output cogwheel 38 are rotatable integrally with each other relative to the base member 18 about the second rotational axis A2. The output cogwheel 38 comprises a sprocket including teeth. The pedaling force is transmitted from the input shaft 28 to the output cogwheel 38 via the input cogwheel 31, the input coupling member 30, the intermediate cogwheel 33, the first transmission member 20, the first coupling member 24, the second transmission member 22, and the output shaft 36.

As seen in FIG. 1, an output coupling member 40 such as a bicycle chain is engaged with the output cogwheel 38 and a rear sprocket B9 (FIG. 1) of the bicycle 10. The rear sprocket B9 is coupled to the rear wheel B62 via a free wheel (not shown) to be rotatable integrally with the rear wheel B62 in a rotational driving direction. Rotation of the output cogwheel 38 is transmitted to the rear wheel B62 via the output coupling member 40 and the rear sprocket B9.

As seen in FIGS. 2 and 3, the first rotational axis A1 is different from the input rotational axis A3. The second rotational axis A2 is different from each of the input rotational axis A3 and the first rotational axis A1. The input rotational axis A3 and the second rotational axis A2 are spaced apart from each other. The first rotational axis A1 and the second rotational axis A2 are parallel to the input rotational axis A3. However, the first rotational axis A1 can coincide with the input rotational axis A3 if needed and/or desired. In such an embodiment, the input shaft 28 is coaxial with the first transmission member 20 and is coupled to the first transmission member 20 to rotate together with the first transmission member 20 relative to the base member 18 about the first rotational axis A1.

Figure 9:
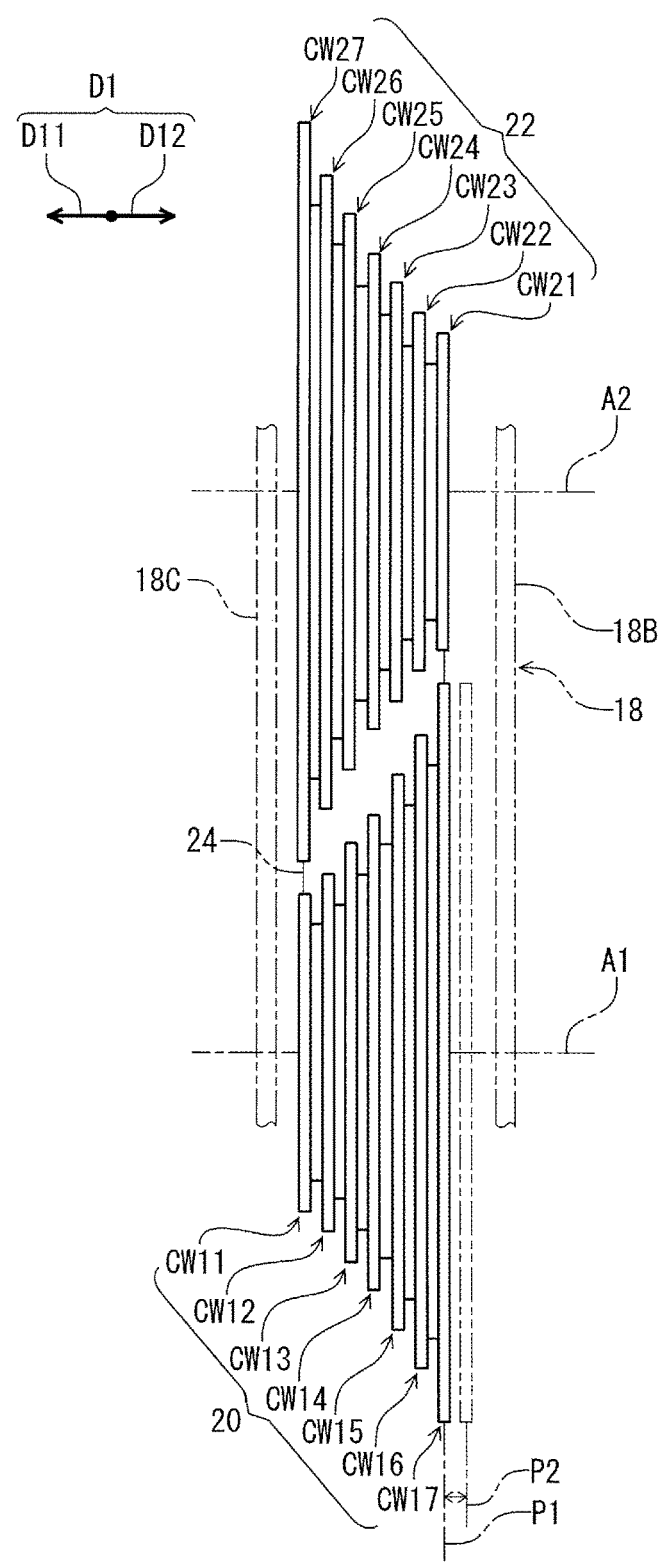
FIG. 9 is a plan view of a first transmission member and a second transmission member of the bicycle transmission apparatus illustrated in FIG. 1.

As seen in FIG. 9, the first transmission member 20 is movable relative to the base member 18 in the axial direction D1 parallel to the first rotational axis A1. The second transmission member 22 is stationary relative to the base member 18 in the axial direction D1. In this embodiment, the first transmission member 20 is movable relative to the base member 18 and the second transmission member 22 between a first axial position P1 and a second axial position P2 in the axial direction D1.

The variable speed stage of the bicycle transmission apparatus 12 is variable in accordance with at least one positional relationship among the first transmission member 20, the second transmission member 22, and the first coupling member 24 in the axial direction D1. The axial direction D1 includes a first axial direction D11 and a second axial direction D12 opposite to the first axial direction D11.

The first transmission member 20 includes the first cogwheels CW11 to CW17 arranged in the axial direction D1. Each of the first cogwheels CW11 to CW17 comprises a sprocket wheel. Each of the first cogwheels CW11 to CW17 is engageable with the first coupling member 24. The second transmission member 22 includes second cogwheels CW21 to CW27 arranged in the axial direction D1. Each of the second cogwheels CW21 to CW27 comprises a sprocket wheel. Each of the second cogwheels CW21 to CW27 is engageable with the first coupling member 24. The first cogwheels CW11 to CW17 respectively define the speed stages together with the second cogwheels CW21 to CW27. The second cogwheels CW21 to CW27 respectively define the speed stages together with the first cogwheels CW11 to CW17.

A total number of the first cogwheels CW11 to CW17 is equal to a total number of the second cogwheels CW21 to CW27. In this embodiment, the first transmission member 20 includes seven first cogwheels CW11 to CW17 arranged in the axial direction D1. The second transmission member 22 includes seven second cogwheels CW21 to CW27 arranged in the axial direction D1. A total number of the first cogwheels CW11 to CW17 can be different from a total number of the second cogwheels CW21 to CW27 if needed and/or desired.

In this embodiment, the first cogwheels CW11 to CW17 are arranged in the axial direction D1 at a regular interval. The second cogwheels CW21 to CW27 are arranged in the axial direction D1 at a regular interval equal to the regular interval of the first cogwheels CW11 to CW17.

The first cogwheel CW17 is disposed at an axial position substantially equal to an axial position of the second cogwheel CW21 in a first state where the first transmission member 20 is positioned at the first axial position P1. The first cogwheel CW16 is disposed at an axial position substantially equal to the axial position of the second cogwheel CW21 in a second state where the first transmission member 20 is positioned at the second axial position P2. The first cogwheels CW11 to CW17 are respectively disposed at axial positions equal to axial positions of the second cogwheels CW27 to CW21 in the first state of the first transmission member 20. The first cogwheels CW11 to CW 16 are respectively disposed at axial positions equal to axial positions of the second cogwheels CW26 to CW21 in the second state of the first transmission member 20.

Figure 10:
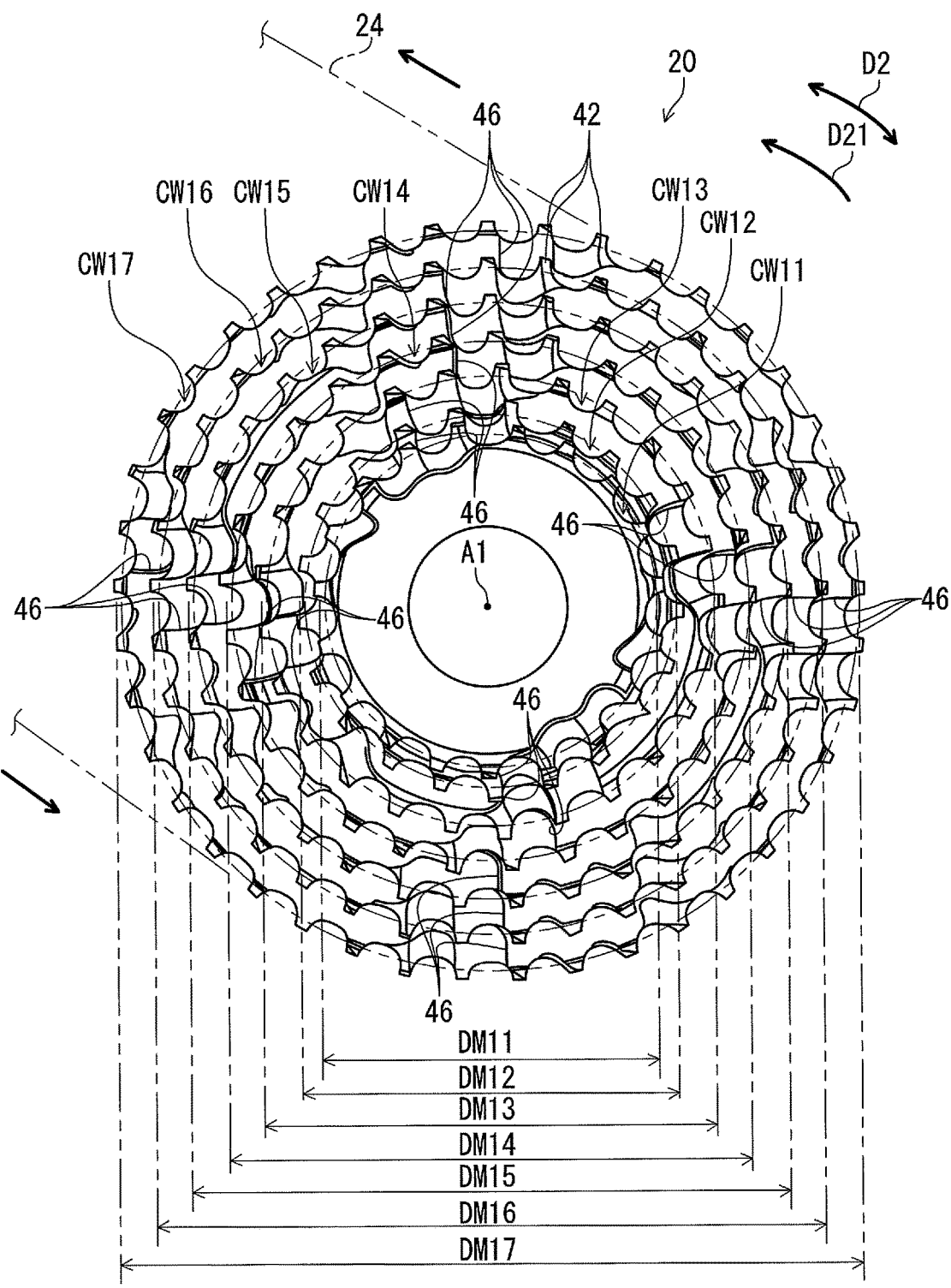
FIG. 10 is a side elevational view of a first transmission member of the bicycle transmission apparatus illustrated in FIG. 1.

As seen in FIG. 10, the first cogwheels CW11 to CW17 has different outer diameters and include a first largest cogwheel CW17 and a first smallest cogwheel CW11. The first smallest cogwheel CW11 has an outer diameter smaller than an outer diameter of the first largest cogwheel CW17. The first largest cogwheel CW17 has a largest outer diameter among the first cogwheels CW11 to CW17. The first smallest cogwheel CW11 has a smallest outer diameter among the first cogwheels CW11 to CW17. As seen in FIG. 9, the first smallest cogwheel CW11 is spaced apart from the first largest cogwheel CW17 in the first axial direction D11.

Figure 11:
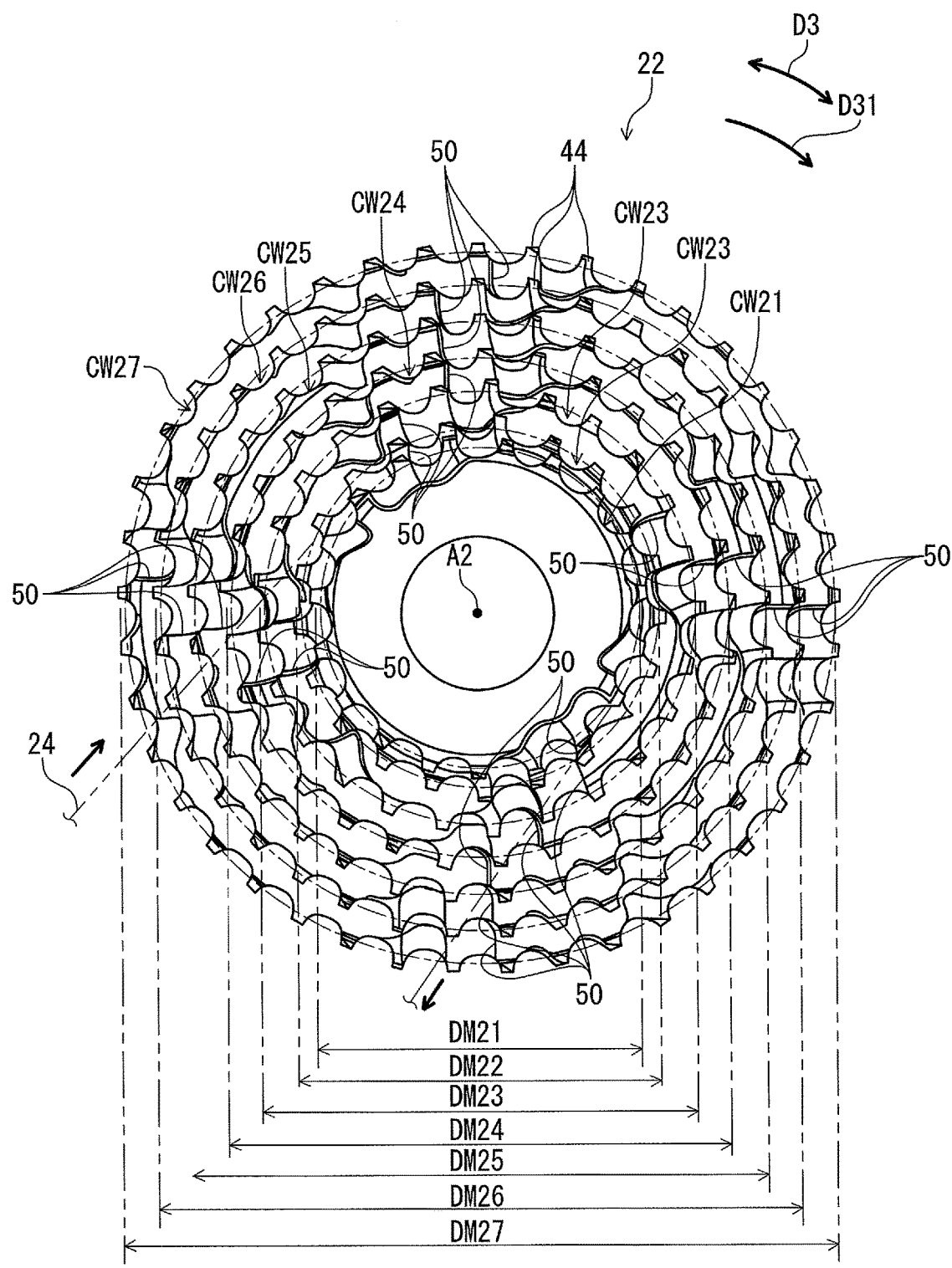
FIG. 11 is a side elevational view of a second transmission member of the bicycle transmission apparatus illustrated in FIG. 1.

As seen in FIG. 11, the second cogwheels CW21 to CW27 has different outer diameters and include a second largest cogwheel CW27 and a second smallest cogwheel CW21. The second smallest cogwheel CW21 has an outer diameter smaller than an outer diameter of the second largest cogwheel CW27. The second largest cogwheel CW27 has a largest outer diameter among the second cogwheels CW21 to CW27. The second smallest cogwheel CW21 has a smallest outer diameter among the second cogwheels CW21 to CW27. As seen in FIG. 9, the second smallest cogwheel CW21 is spaced apart from the second largest cogwheel CW27 in the second axial direction D12. In this embodiment, a total number of the first cogwheels CW11 to CW17 is equal to a total number of the second cogwheels CW21 to CW27. However, the total number of the first cogwheels CW11 to CW17 can be different from the total number of the second cogwheels CW21 to CW27.

As seen in FIG. 10, each of the first cogwheels CW11 to CW17 includes first teeth 42 arranged in a circumferential direction D2 of the first transmission member 20. The first cogwheels CW11 to CW17 respectively have first pitch circles each defined by the first teeth 42. The first transmission member 20 rotates about the first rotational axis A1 in a driving rotational direction D21 during pedaling.

As seen in FIG. 11, each of the second cogwheels CW21 to CW27 includes second teeth 44 arranged in a circumferential direction D3 of the second transmission member 22. The second cogwheels CW21 to CW27 respectively have second pitch circles each defined by the second teeth 44. The second transmission member 22 rotates about the second rotational axis A2 in a driving rotational direction D31 during pedaling.

As seen in FIGS. 10 and 11, first diameters DM11 to DM17 of the first pitch circles respectively are equal to second diameters DM21 to DM27 of the second pitch circles. Namely, the second cogwheels CW21 to CW27 respectively have substantially the same constructions as constructions of the first cogwheels CW11 to CW17. However, the second cogwheels CW21 to CW27 can respectively have different constructions from the constructions of the first cogwheels CW11 to CW17 if needed and/or desired.

As seen in FIG. 10, the first transmission member 20 includes a first shifting facilitation part configured to facilitate shifting the first coupling member 24 relative to the first transmission member 20 in the axial direction D1. In this embodiment, at least one of the first cogwheels CW11 to CW17 of the first transmission member 20 includes a first shifting facilitation part 46 configured to facilitate shifting the first coupling member 24 relative to the first transmission member 20 in the axial direction D1. Each of the first cogwheels CW12 to CW17 includes the first shifting facilitation parts 46. The first shifting facilitation parts 46 are recessed in the axial direction D1 to guide the first coupling member 24 from a currently engaged cogwheel to an adjacent larger cogwheel in the first cogwheels CW12 to CW17 when changing a speed stage.

As seen in FIG. 11, the second transmission member 22 includes a second shifting facilitation part configured to facilitate shifting the first coupling member 24 relative to the second transmission member 22 in the axial direction D1. In this embodiment, at least one of the second cogwheels CW21 to CW27 of the second transmission member 22 includes a second shifting facilitation part 50 configured to facilitate shifting the first coupling member 24 relative to the second transmission member 22 in the axial direction D1. Each of the second cogwheels CW22 to CW27 includes the second shifting facilitation parts 50. The second shifting facilitation parts 50 are recessed in the axial direction D1 to guide the first coupling member 24 from a currently engaged cogwheel to an adjacent larger cogwheel in the second cogwheels CW22 to CW27 when changing a speed stage.

As seen in FIG. 8, the bicycle transmission apparatus 12 further comprises a sliding structure 52. The sliding structure 52 is configured to movably couple the first transmission member 20 to the first shaft 32 in the axial direction D1 The first transmission member 20 has a first opening 54. The first shaft 32 extends through the first opening 54. At least a part of the sliding structure 52 is provided in the first opening 54.

The sliding structure 52 includes a tubular part 58, rolling elements 60, and a retainer 62. The tubular part 58 is provided between the first transmission member 20 and the first shaft 32. The first bearing assembly 32A is provided between the first transmission member 20 and the tubular part 58 to rotatably support the first transmission member 20 relative to the tubular part 58. The rolling elements 60 are provided between the tubular part 58 and the first shaft 32 to movably support the tubular part 58 relative to the first shaft 32 in the axial direction D1.

Figure 12:
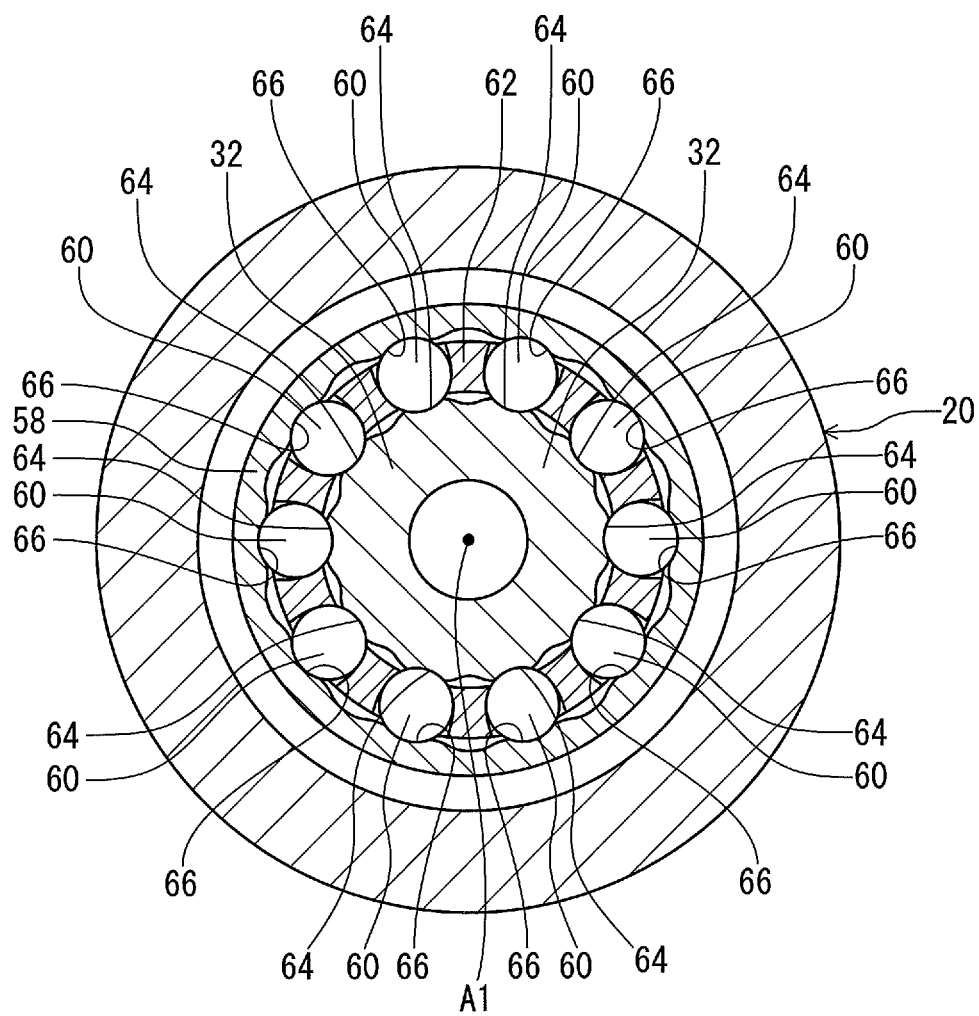
FIG. 12 is a cross-sectional view of the bicycle transmission apparatus taken along line XII-XII of FIG. 8.

As seen in FIG. 12, the first shaft 32 includes first guide grooves 64. The first guide grooves 64 are provided on an outer peripheral surface of the first shaft 32. The first guide grooves 64 are circumferentially arranged about the first rotational axis A1. The tubular part 58 includes second guide grooves 66. The second guide grooves 66 are circumferentially arranged about the first rotational axis A1. The second guide grooves 66 are provided on an inner peripheral surface of the tubular part 58. The second guide grooves 66 are provided at circumferential positions which respectively correspond to circumferential positions of the first guide grooves 64. As seen in FIG. 8, the first guide grooves 64 extend in the axial direction D1. The second guide grooves 66 extend in the axial direction D1.

As seen in FIGS. 8 and 12, the rolling elements 60 are provided in the first guide grooves 64 and the second guide grooves 66. The retainer 62 is provided between the tubular part 58 and the first shaft 32 to rotatably retain the rolling elements 60. The first guide grooves 64, the second guide grooves 66, and the rolling elements 60 allows the tubular part 58 to move relative to the first shaft 32 in the axial direction D1 with restricting the tubular part 58 from rotating relative to the first shaft 32. Namely, the first transmission member 20 is movable relative to the first shaft 32 in the axial direction D1 with rotating relative to the first shaft 32. The rolling elements 60 have a spherical shape.

Figure 13:
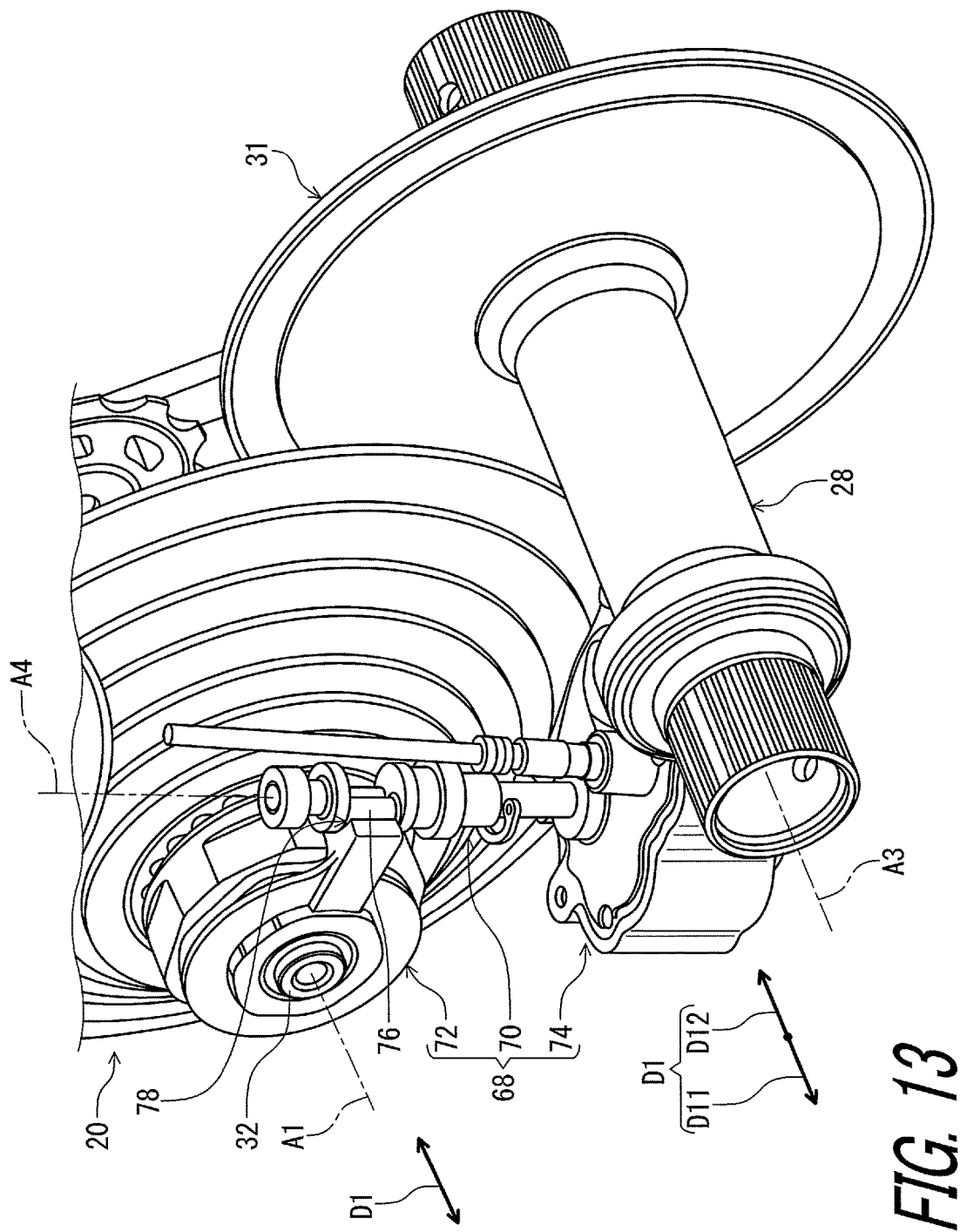
FIG. 13 is a perspective view of the bicycle transmission apparatus illustrated in FIG. 1.
Figure 14:
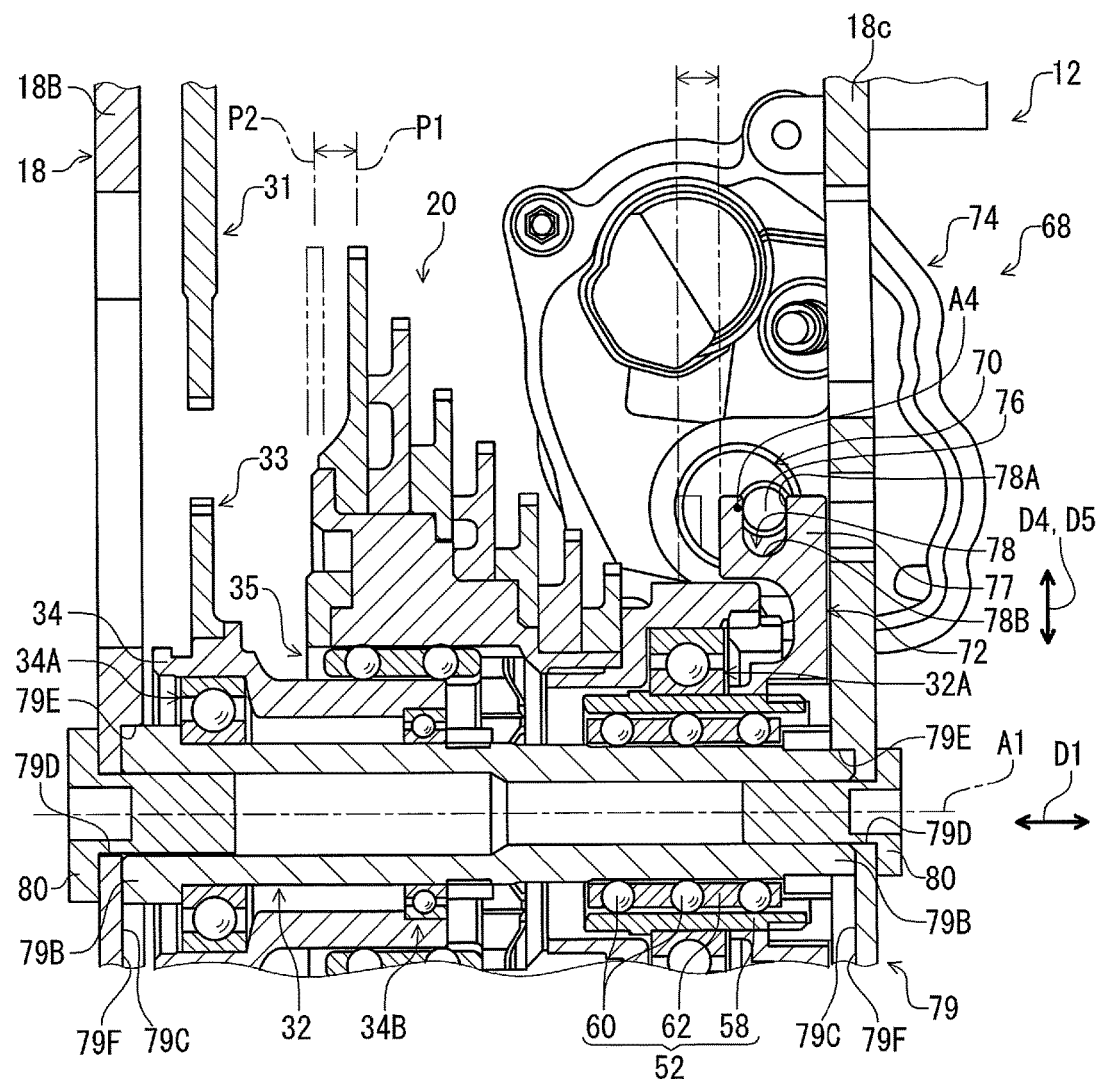
FIG. 14 is a cross-sectional view of the bicycle transmission apparatus taken along line XIV-XIV of FIG. 4.

As seen in FIGS. 13 and 14, the bicycle transmission apparatus 12 further comprises a switching device 68 configured to switch a position of the first transmission member 20 relative to the base member 18 in the axial direction D1 between the first axial position P1 and the second axial position P2. The switching device 68 includes a rotor 70 and an axially-movable member 72. The rotor 70 is rotatable about a rotational center axis A4 which is non-parallel to the axial direction D1. The axially-movable member 72 is coupled to the rotor 70 to convert a rotation of the rotor 70 to an axial movement of the first transmission member 20 in the axial direction D1. The rotor 70 is rotatably supported by the base member 18 (FIG. 14). The axially-movable member 72 is attached to the first transmission member 20.

In this embodiment, the switching device 68 includes a switching actuator 74. The switching actuator 74 is configured to generate an actuating force to move the first transmission member 20 relative to the base member 18 in the axial direction D1. The switching actuator 74 rotates the rotor 70 about the rotational center axis A4 to apply the actuating force to the axially-movable member 72. In this embodiment, the switching actuator 74 includes a motor and a speed reducer. While the motor is a stepper motor in this embodiment, the switching actuator 74 can include a direct-current (DC) motor or other type of actuators if needed and/or desired. The motor is coupled to the rotor 70 via the speed reducer in the switching actuator 74. The speed reducer can include a reduction gear.

As seen in FIG. 14, the rotor 70 includes an offset part 76 offset from the rotational center axis A4 to move around the rotational center axis A4. The offset part 76 has a circular cross-section taken along a plane perpendicular to the rotational center axis A4. The center of the round cross-section is offset from the rotational center axis A4. The axially-movable member 72 includes a coupling part 77 coupled to the offset part 76. The coupling part 77 has a substantially U-shape when viewed from a direction parallel to the rotational center axis A4. The axially-movable member 72 includes a coupling groove 78. The coupling part 77 defines the coupling groove 78. The offset part 76 is provided in the coupling groove 78 to convert the rotation of the rotor 70 into the axial movement of the first transmission member 20 in the axial direction D1. The coupling groove 78 extends in an extending direction D4 which is non-parallel to the axial direction D1. In this embodiment, the extending direction D4 is perpendicular to the axial direction D1.

The rotor 70 is detachably provided in the coupling groove 78. The coupling groove 78 includes a closed end 78B and an open end 78A opposite to the closed end 78B in the extending direction D4. The rotor 70 is detachable from the open end 78A of the coupling groove 78 in the extending direction D4. The coupling groove 78 extends between the closed end 78B and the open end 78A.

Other structures can be applied to the switching device 68. For example, it is possible to directly move the first transmission member 20 relative to the base member 18 using structures such as gears, worm gear, ruck gear and/or cams if needed and/or desired.

As seen in FIG. 6, the base member 18 includes an attachment guide 79. In this embodiment, the base member 18 includes attachment guides 79. Each of the first base frame 18B and the second base frame 18C includes the attachment guide 79. The first transmission member 20 is detachably attached to the base member 18. The attachment guide 79 is configured to guide the first transmission member 20 to a predetermined position when the first transmission member 20 is mounted on the base member 18. The first transmission member 20 is detachable from the base member 18 in a mounting direction D5 perpendicular to the first rotational axis A1. The first transmission member 20 is attachable to the base member 18 in the mounting direction D5. In this embodiment, the mounting direction D5 is parallel to the extending direction D4 of the coupling groove 78 (FIG. 14). The predetermined position of the first transmission member 20 is a position at which the first transmission member 20 is secured to the base member 18.

As seen in FIGS. 6 and 14, the attachment guide 79 includes one of an attachment opening 79A and a protruding part 79B. The first transmission member 20 includes the other of the attachment opening 79A and the protruding part 79B. In this embodiment, the attachment guide 79 includes the attachment opening 79A. The first transmission member 20 includes the protruding parts 79B. The protruding parts 79B are provided at both ends of the first shaft 32. The protruding part 79B is detachably provided in the attachment opening 79A. The attachment opening 79A includes an attachment groove 79C extending in the mounting direction D5. As seen in FIG. 6, the protruding part 79B includes chamfers 79B1. The chamfers 79B1 are fitted to the attachment groove 79C.

The bicycle transmission apparatus 12 further comprises a securing member 80 to secure the first transmission member 20 to the base member 18. In this embodiment, the bicycle transmission apparatus 12 further comprises securing members 80. Examples of the securing member 80 includes a screw. The attachment opening 79A includes an attachment through-hole 79D provided in the attachment groove 79C. The securing member 80 extends through the attachment through-hole 79D to secure the first transmission member 20 to the base member 18.

Figure 15:
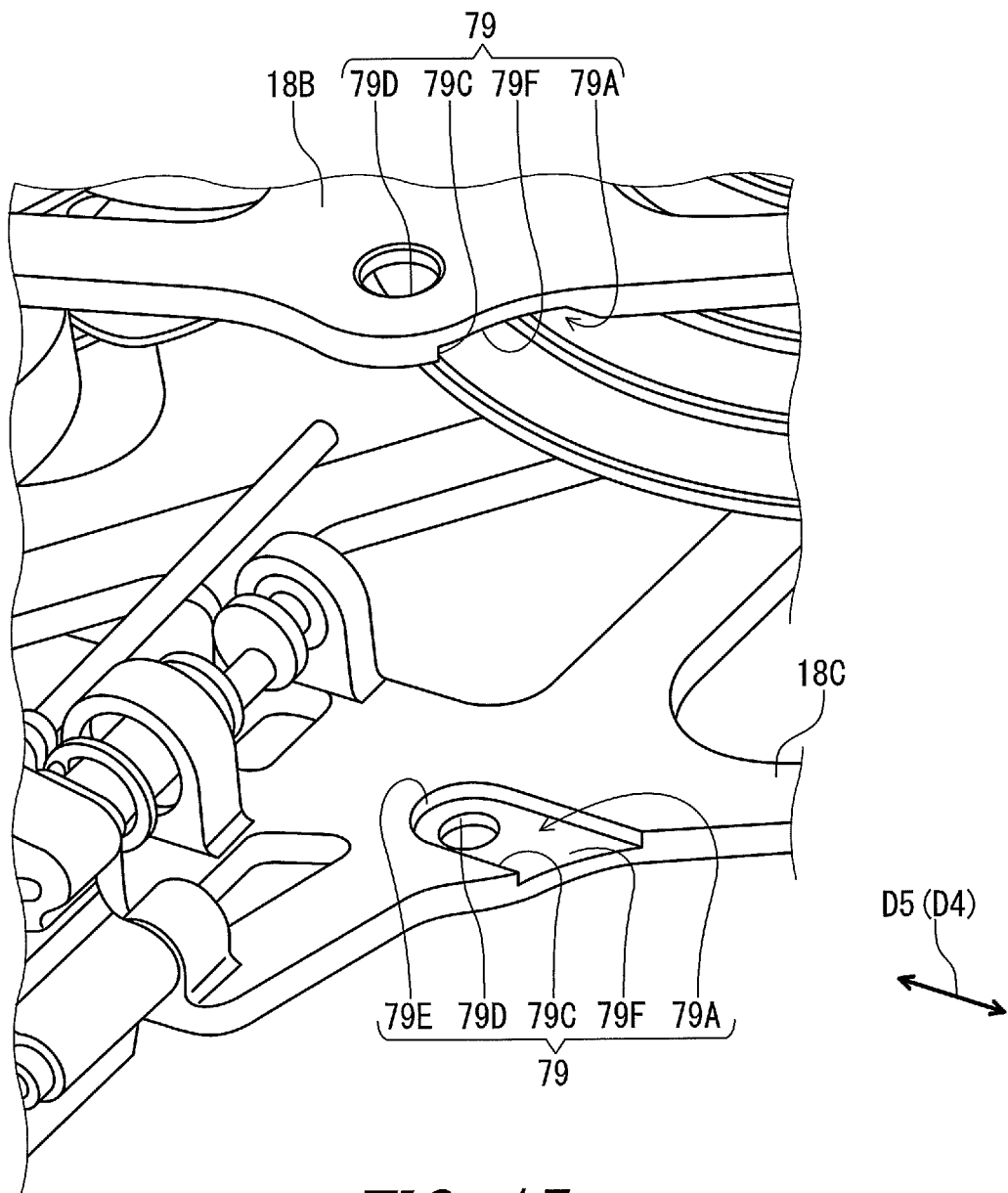
FIG. 15 is a partial perspective view of the bicycle transmission apparatus illustrated in FIG. 1.

As seen in FIGS. 14 and 15, the attachment groove 79C includes a closed end 79E and an open end 79F opposite to the closed end in the mounting direction D5. The first transmission member 20 receives a holding force from the first coupling member 24 to maintain the first transmission member 20 at the closed end 79E in the attachment groove 79C. The tension of the first coupling member 24 at least partly creates the holding force. The attachment groove 79C extends between the closed end 79E and the open end 79F. One of the attachment grooves 79C is provided at the first base frame 18B. The other of the attachment grooves 79C is provided at the second base frame 18C. The attachment grooves 79C are provided to face each other in the axial direction D1.

Figure 16:
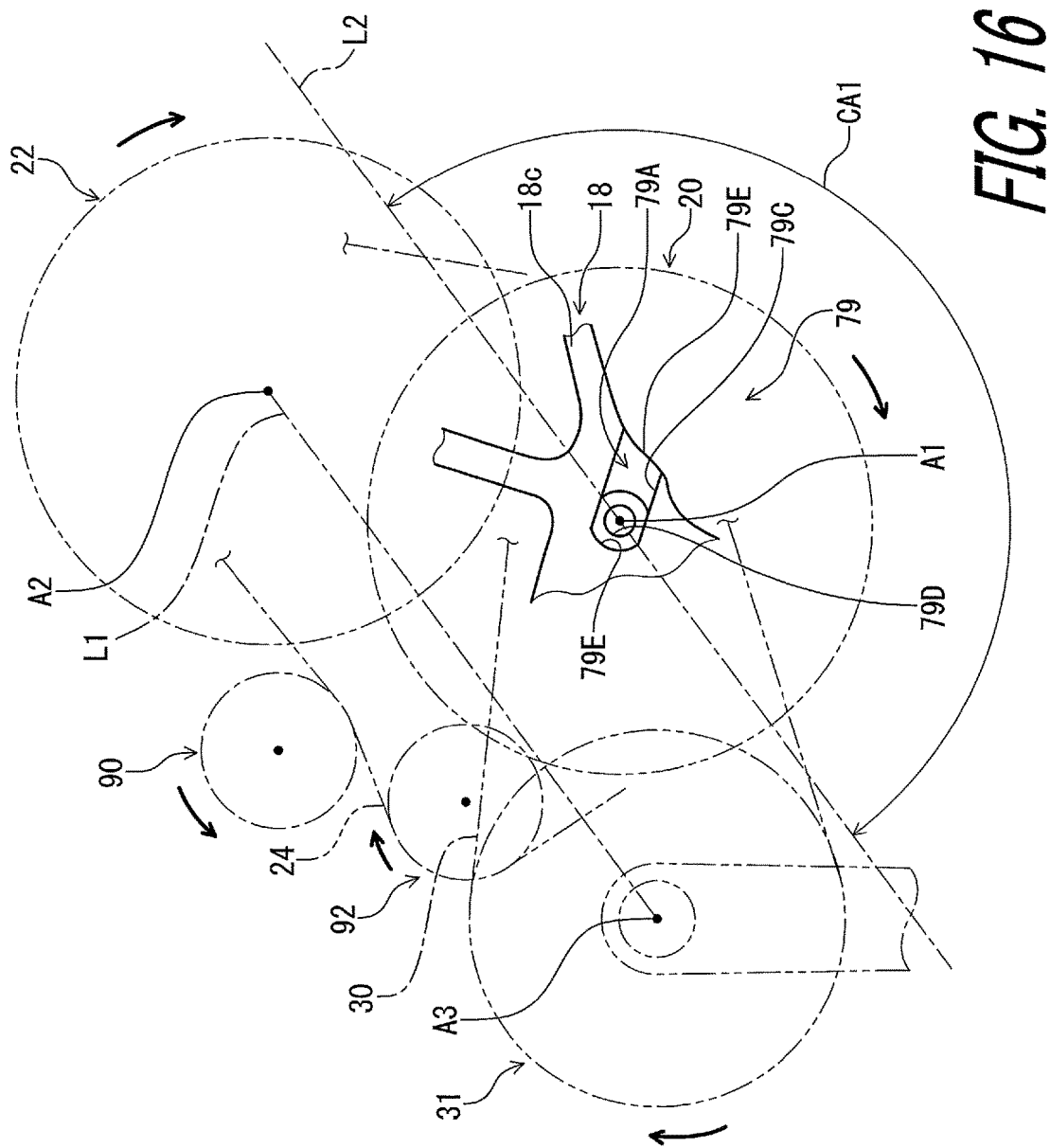
FIG. 16 is a schematic diagram of the bicycle transmission apparatus illustrated in FIG. 1.

As seen in FIG. 16, the open end 79F is provided within a circumferential area CA1 defined about the first rotational axis A1 when viewed from the axial direction D1. The second rotational axis A2 is not provided in the circumferential area CA1 when viewed from the axial direction D1. The input rotational axis A3 is not provided in the circumferential area CA1 when viewed from the axial direction D1. A line segment L1 is defined to connect the second rotational axis A2 to the input rotational axis A3 when viewed from the axial direction D1. A reference line L2 is defined to be parallel to the line segment L1 and to intersect with the first rotational axis A1 when viewed from the axial direction D1. The circumferential area CA1 is defined on one side of the reference line L2 when viewed from the axial direction D1. However, the circumferential area CA1 is not limited to this embodiment.

Figure 17:
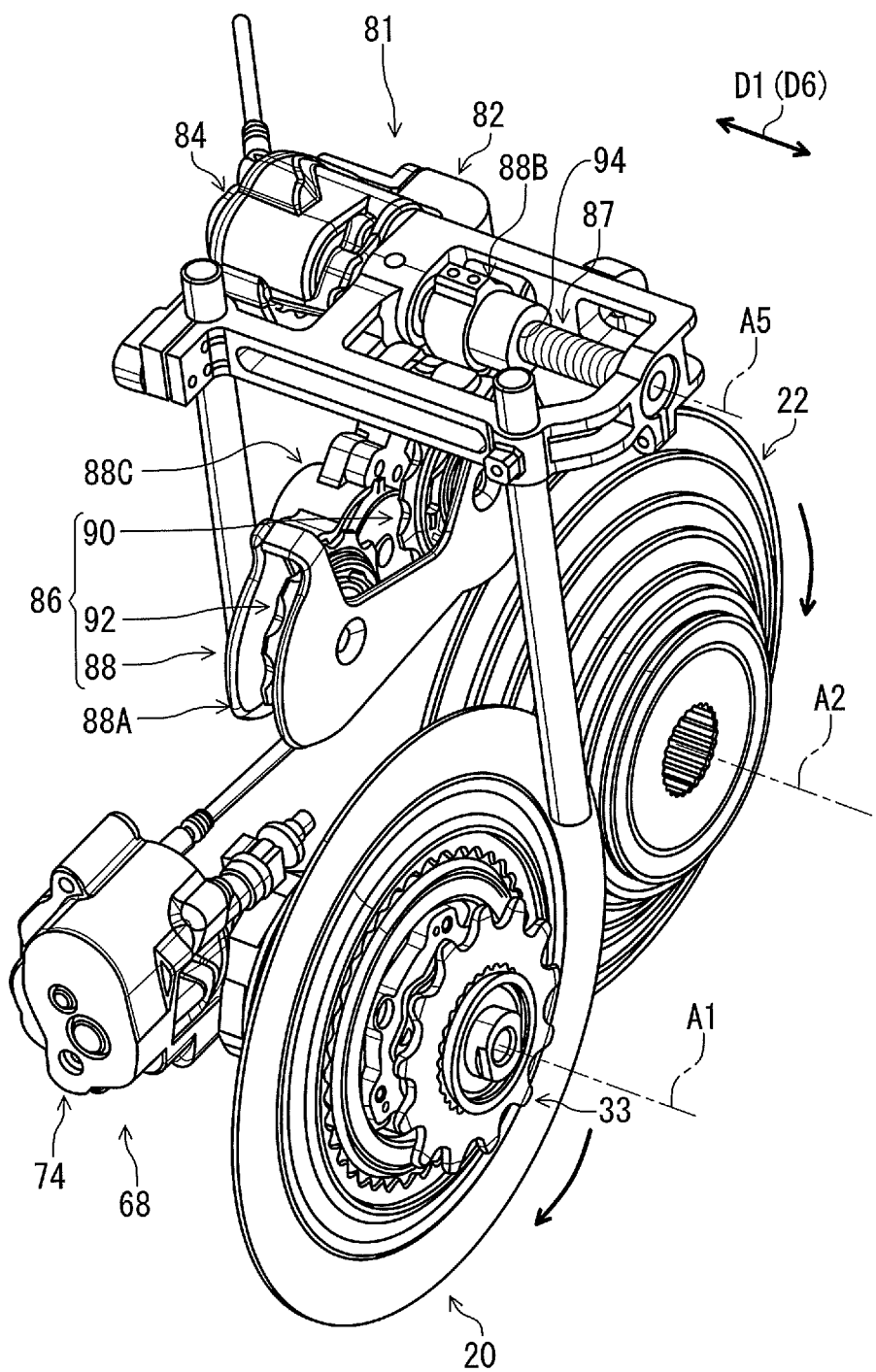
FIG. 17 is a perspective view of the bicycle transmission apparatus illustrated in FIG. 1.
Figure 18:
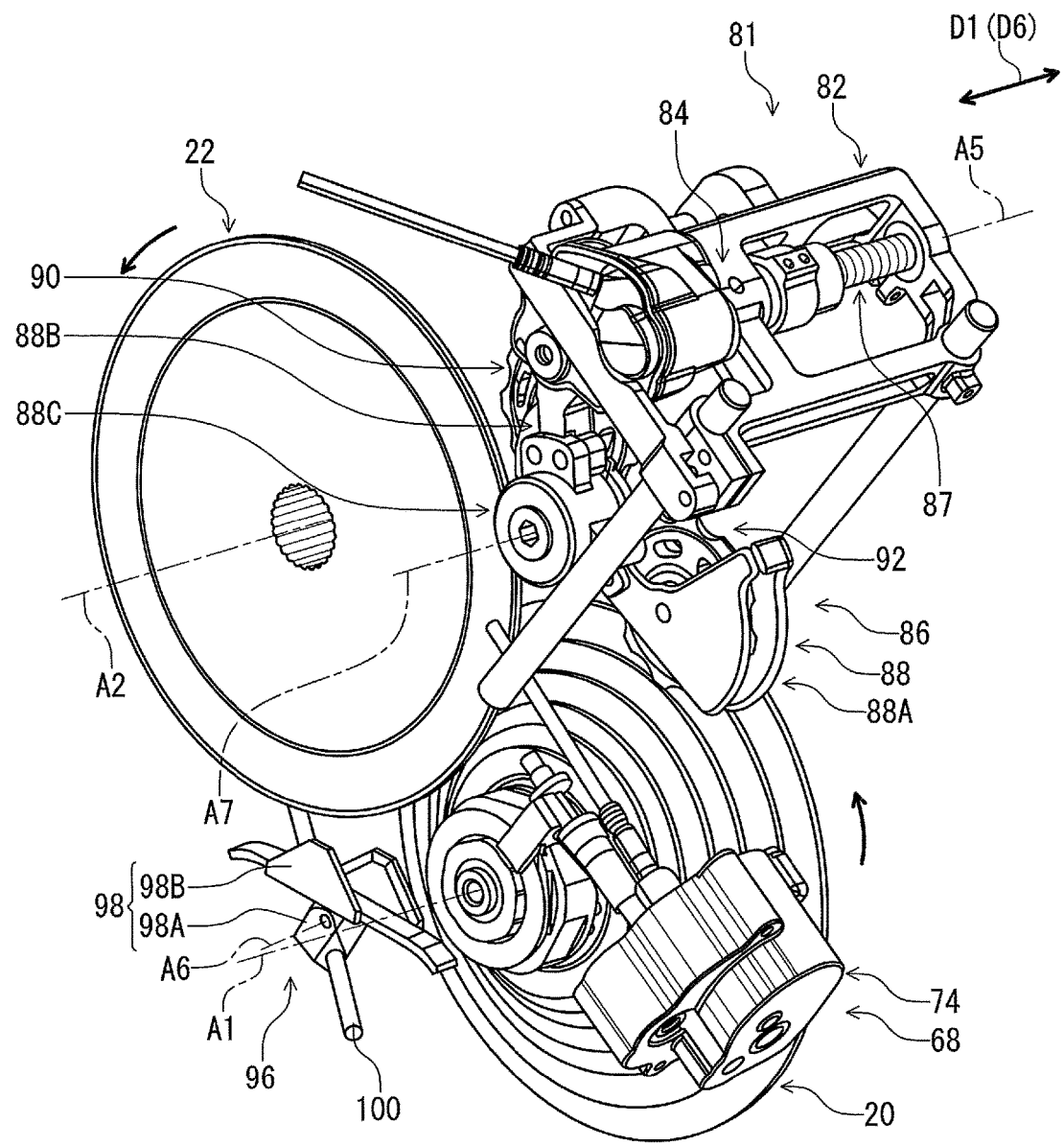
FIG. 18 is a perspective view of the bicycle transmission apparatus illustrated in FIG. 1.

As seen in FIGS. 17 and 18, the bicycle transmission apparatus 12 further comprises a first guide structure 81. The first guide structure 81 is configured to guide the first coupling member 24 relative to the base member 18 in a guide direction D6 intersecting with a plane perpendicular to the axial direction D1. In this embodiment, the guide direction D6 is parallel to the axial direction D1. The first guide structure 81 includes a guide frame 82, a guide actuator 84, and a first guide member 86. The guide frame 82 is secured to the base member 18 (FIGS. 2 and 3). The guide actuator 84 is mounted to the guide frame 82. The guide actuator 84 moves the first guide member 86 relative to the base member 18 (FIGS. 2 and 3) in the guide direction D6. The first guide member 86 is engaged with the first coupling member 24. The guide actuator 84 shifts the first coupling member 24 relative to the base member 18 (FIGS. 2 and 3) in the axial direction D1. The first guide structure 81 includes a threaded rod 87 rotatably mounted to the guide frame 82 about a rotational axis A5. The guide actuator 84 rotates the threaded rod 87 relative to the guide frame 82 about the rotational axis A5.

The first guide member 86 includes a coupling support 88, a first pulley 90, and a second pulley 92. The coupling support 88 includes a threaded hole 94 engaged with the threaded rod 87. The threaded rod 87 and the coupling support 88 constitute a ball screw. This converts a rotation of the threaded rod 87 into a movement of the first pulley 90 and the second pulley 92. The first pulley 90 is rotatably attached to the coupling support 88. The second pulley 92 is rotatably attached to the coupling support 88. The first pulley 90 and the second pulley 92 are engaged with the first coupling member 24 to adjust tension of the first coupling member 24. The first pulley 90 and the second pulley 92 hold the first coupling member 24 relative to the coupling support 88 in the guide direction D6 (the axial direction D1).

As seen in FIGS. 5 and 18, the coupling support 88 includes a guide plate 88A, a guide arm 88B, and a biasing unit 88C. The first pulley 90 and the second pulley 92 are rotatably coupled to the guide plate 88A. The guide arm 88B includes the threaded hole 94 and are coupled to the threaded rod 87. The biasing unit 88C couples the guide plate 88A to the guide arm 88B and applies a rotational force to the guide plate 88A about a rotational axis A7 to increase tension of the first coupling member 24. The biasing unit 88C includes a biasing member such as a coiled spring. The construction of the first guide structure 81 is not limited to this embodiment. Mechanical structures such as a linkage can be applied to the first guide structure 81 instead of or in addition to the above ball screw. For example, the first guide structure 81 can include a four-bar linkage as with a bicycle derailleur. In such an embodiment, the guide actuator 84 moves the first guide member 86 relative to the base member 18 via the four-bar linkage.

As seen in FIG. 4, the first guide structure 81 is provided in a releasing area AR1 defined between the first transmission member 20 and the second transmission member 22. The first coupling member 24 is released in the releasing area AR1 from the first transmission member 20 to the second transmission member 22.

Figure 19:
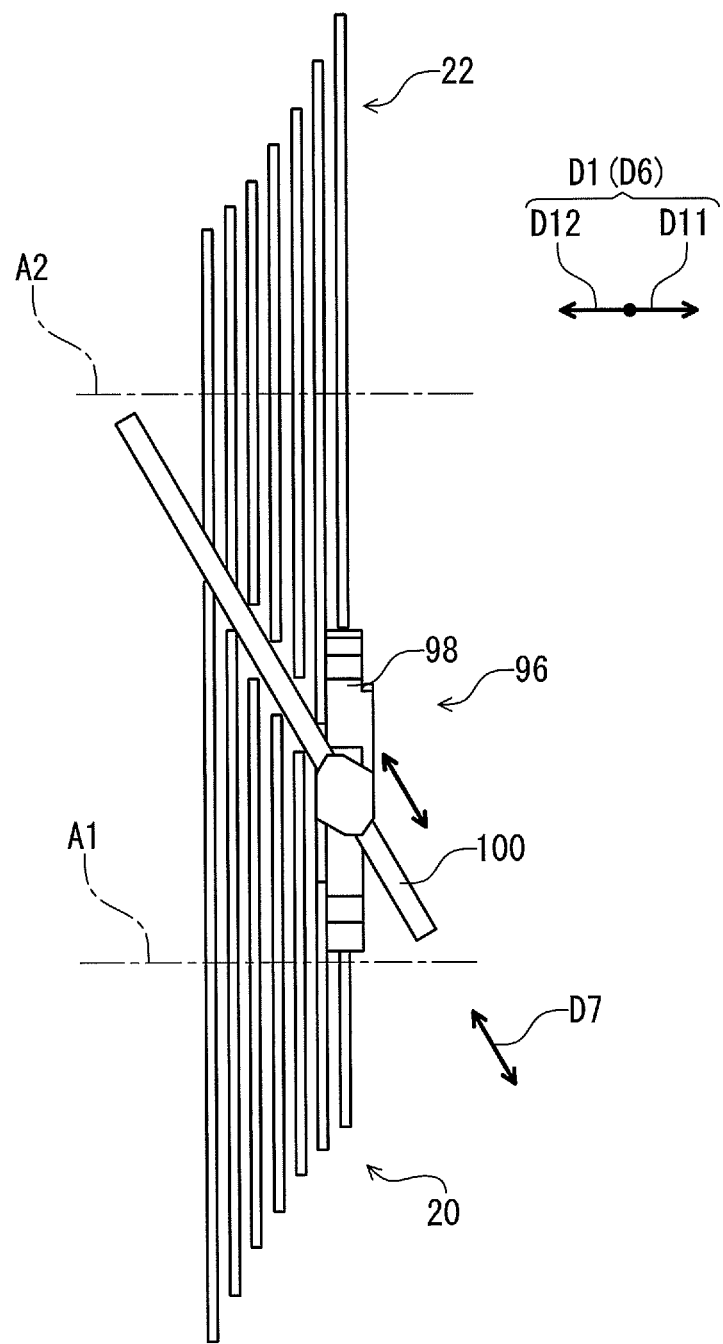
FIG. 19 is a bottom view of the first transmission member, the second transmission member, and a second guide structure of the bicycle transmission apparatus illustrated in FIG. 1.

As seen in FIGS. 4, 18 and 19, the bicycle transmission apparatus 12 further comprises a second guide structure 96 to guide the first coupling member 24 between the first transmission member 20 and the second transmission member 22. The second guide structure 96 includes a second guide member 98 contactable with the first coupling member 24. The second guide structure 96 includes a guide support 100 to slidably support the second guide member 98 to apply a sliding resistance to the second guide member 98. The second guide member 98 moves relative to the guide support 100 in response to a pushing force F 11 applied from the first coupling member 24 to the second guide member 98 beyond the sliding resistance. The second guide member 98 can contact the first coupling member from axial direction D1. The second guide member 98 includes a base part 98A and a guide part 98B. The guide part 98B is pivotally coupled to the base part 98A about a pivot axis A6 which is parallel to the axial direction D1. The guide part 98B pivots relative to the base part 98A about the pivot axis A6 in response to a pushing force applied from the first coupling member 24 to the second guide member 98. The base part 98A is mounted on the guide support 100.

The guide support 100 is secured to the base member 18 (FIGS. 2 and 3). The guide support 100 guides the second guide member 98 in a second guide direction D7 which is non-parallel to the axial direction D1. For example, the base part 98A includes a coupling portion and a screw attached to the coupling portion. The coupling portion is slidably coupled to the guide support 100. The coupling portion squeezes the guide support 100 by using the screw. The sliding resistance is adjusted by tightening or loosing of the screw. The guide support 100 can include an outer peripheral surface on which a frictional material such as a rubber or a paint having a high frictional resistance. The outer peripheral surface of the guide support 100 can be rough to produce the sliding resistance instead of or in addition to the frictional material.

As seen in FIG. 4, the second guide structure 96 is provided in a pulling area AR2 defined between the first transmission member 20 and the second transmission member 22. The first coupling member 24 is pulled in the pulling area AR2 by the first transmission member 20 to transmit a pedaling force from the first transmission member 20 to the second transmission member 22.

Figure 20:
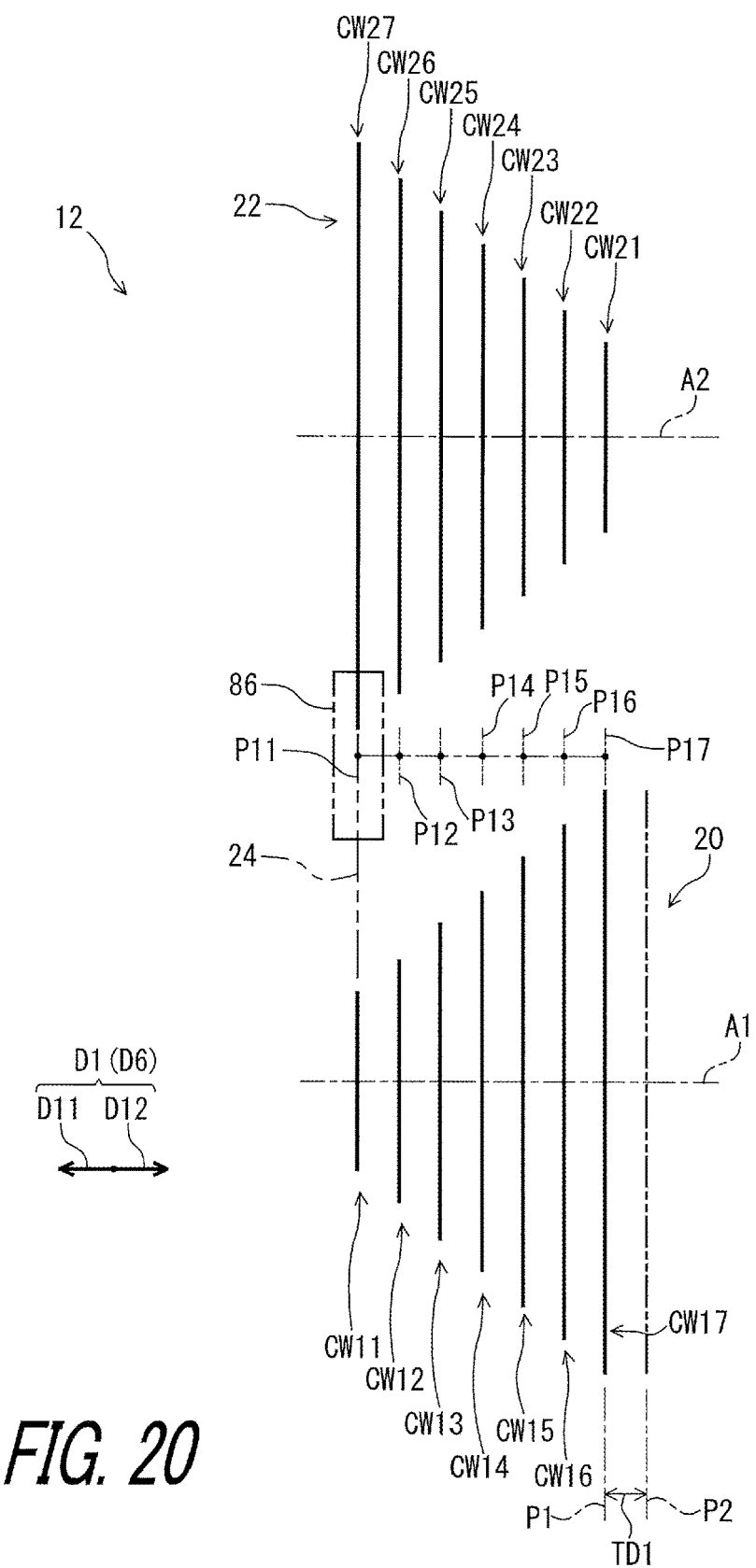
FIG. 20 is a schematic diagram showing an arrangement of the first transmission member, the second transmission member, and a first guide structure of the bicycle transmission apparatus illustrated in FIG. 1.

As seen in FIG. 20, the first guide structure 81 is configured to move and position the first guide member 86 between first to seventh guide positions P11 to P17 in the guide direction D6. The first to seventh guide positions P11 to P17 respectively correspond to axial positions of the second cogwheels CW27 to CW21.

The first largest cogwheel CW17 is provided at an end of the first cogwheels CW11 to CW17 in the first axial direction D11. The second largest cogwheel CW27 is provided at an end of the second cogwheels CW21 to CW27 in the second axial direction D12. The first smallest cogwheel CW11 is provided at an end of the first cogwheels CW11 to CW17 in the second axial direction D12. The second smallest cogwheel CW21 is provided at an end of the second cogwheels CW21 to CW27 in the first axial direction D11. The first axial direction D11 is a direction in which the first largest cogwheel CW17 moves toward the second largest cogwheel CW27. The second axial direction D12 is a direction in which the first largest cogwheel CW17 moves away from the second largest cogwheel CW27.

Figure 21:
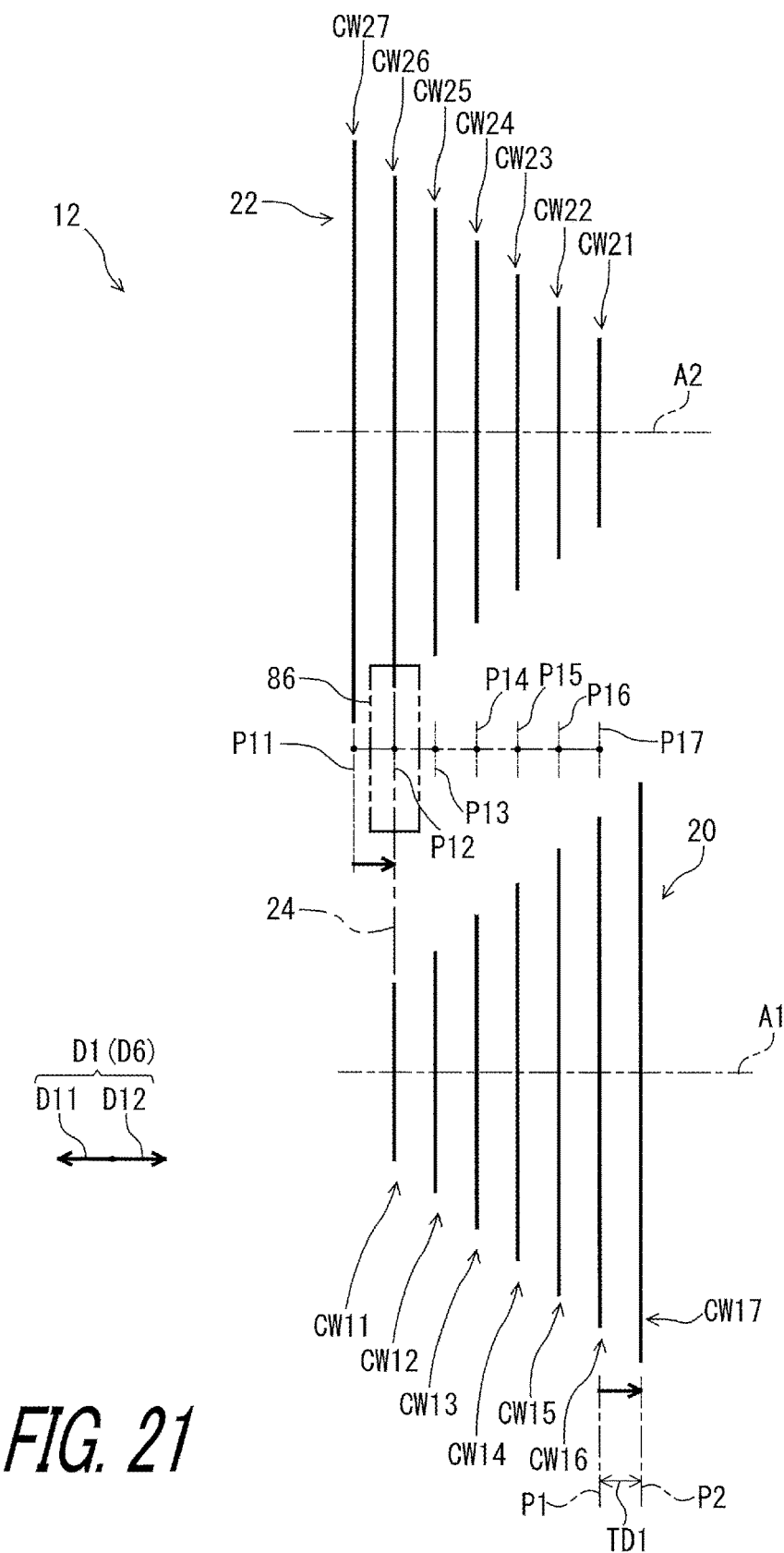
FIG. 21 is a schematic diagram showing an arrangement of the first transmission member, the second transmission member, and a first guide structure of the bicycle transmission apparatus illustrated in FIG. 1.
Figure 22:
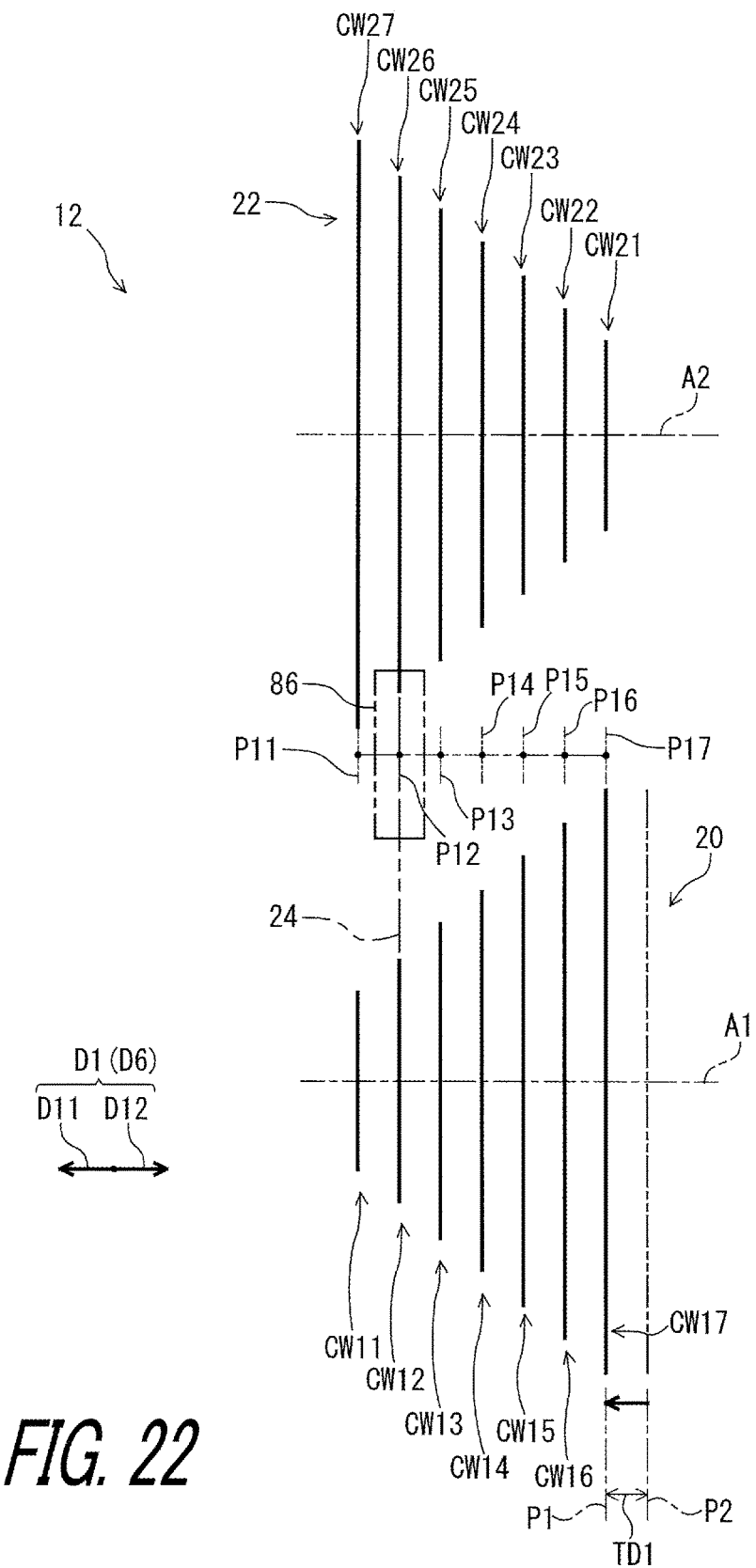
FIG. 22 is a schematic diagram showing an arrangement of the first transmission member, the second transmission member, and a first guide member of the bicycle transmission apparatus illustrated in FIG. 1.

As seen in FIGS. 20 to 22, the first coupling member 24 has a first engagement state where the first coupling member 24 is engaged with one of the first cogwheels CW11 to CW17 and a second engagement state where the first coupling member 24 is engaged with one of the second cogwheels CW21 to CW27. The first engagement state changes when the first coupling member 24 moves from one of the first cogwheels CW11 to CW17 to another of the first cogwheels CW11 to CW17. The second engagement state changes when the first coupling member 24 moves from one of the second cogwheels CW21 to CW27 to another of the second cogwheels CW21 to CW27. The first transmission member 20 moves relative to the second transmission member 22 in the axial direction D1 by a travel distance TD1 defined between the first axial position P1 and the second axial position P2 to change the first engagement state of the first coupling member 24 from one cogwheel to another adjacent cogwheel among the first cogwheels CW11 to CW17. The travel distance TD1 is equal to the regular interval of the first cogwheels CW11 to CW17.

As seen in FIGS. 20 and 21, the first transmission member 20 is movable together with the first coupling member 24 relative to the base member 18 in the second axial direction D12 so as to change the axial relative position between the first coupling member 24 and the second transmission member 22 during the one of up shifting and down shifting. The first transmission member 20 is movable together with the first coupling member 24 relative to the base member 18 in the second axial direction D12 without changing the axial relative position between the first coupling member 24 and the first transmission member 20 during the one of up shifting and down shifting.

In this embodiment, the first transmission member 20 is movable together with the first coupling member 24 relative to the base member 18 in the second axial direction D12 so as to change the axial relative position between the first coupling member 24 and the second transmission member 22 during up shifting (from FIG. 20 to FIG. 21). The first transmission member 20 is movable together with the first coupling member 24 relative to the base member 18 in the second axial direction D12 without changing the axial relative position between the first coupling member 24 and the first transmission member 20 during up shifting (from FIG. 20 to FIG. 21).

As seen in FIGS. 21 and 22, the first transmission member 20 is movable relative to the base member 18 and the first coupling member 24 in the first axial direction D11 without changing an axial relative position between the first coupling member 24 and the second transmission member 22 during one of up shifting and down shifting. The first transmission member 20 is movable relative to the base member 18 and the first coupling member 24 in the first axial direction D11 so as to change an axial relative position between the first coupling member 24 and the first transmission member 20 during the one of up shifting and down shifting.

In this embodiment, the first transmission member 20 is movable relative to the base member 18 and the first coupling member 24 in the first axial direction D11 without changing an axial relative position between the first coupling member 24 and the second transmission member 22 during up shifting (from FIG. 21 to FIG. 22). The first transmission member 20 is movable relative to the base member 18 and the first coupling member 24 in the first axial direction D11 so as to change an axial relative position between the first coupling member 24 and the first transmission member 20 during up shifting (from FIG. 21 to FIG. 22).

Furthermore, as seen in FIGS. 21 and 22, the first transmission member 20 is movable relative to the base member 18 and the first coupling member 24 in the second axial direction D12 without changing the axial relative position between the first coupling member 24 and the second transmission member 22 during another of up shifting and down shifting. The first transmission member 20 is movable relative to the base member 18 and the first coupling member 24 in the second axial direction D12 so as to change the axial relative position between the first coupling member 24 and the first transmission member 20 during said another of up shifting and down shifting.

In this embodiment, the first transmission member 20 is movable relative to the base member 18 and the first coupling member 24 in the second axial direction D12 without changing the axial relative position between the first coupling member 24 and the second transmission member 22 during down shifting (from FIG. 22 to FIG. 21). The first transmission member 20 is movable relative to the base member 18 and the first coupling member 24 in the second axial direction D12 so as to change the axial relative position between the first coupling member 24 and the first transmission member 20 during down shifting (from FIG. 22 to FIG. 21).

Furthermore, as seen in FIGS. 20 and 21, the first transmission member 20 is movable together with the first coupling member 24 relative to the base member 18 in the first axial direction D11 so as to change the axial relative position between the first coupling member 24 and the second transmission member 22 during said another of up shifting and down shifting. The first transmission member 20 is movable together with the first coupling member 24 relative to the base member 18 in the first axial direction D11 without changing the axial relative position between the first coupling member 24 and the first transmission member 20 during said another of up shifting and down shifting.

In this embodiment, the first transmission member 20 is movable together with the first coupling member 24 relative to the base member 18 in the first axial direction D11 so as to change the axial relative position between the first coupling member 24 and the second transmission member 22 during down shifting (from FIG. 21 to FIG. 20). The first transmission member 20 is movable together with the first coupling member 24 relative to the base member 18 in the first axial direction D11 without changing the axial relative position between the first coupling member 24 and the first transmission member 20 during down shifting (from FIG. 21 to FIG. 20).

As seen in FIGS. 20 and 21, the first transmission member 20 is movable together with the first coupling member 24 and the first guide member 86 relative to the base member 18 in the second axial direction D12 so as to change the axial relative position between the first coupling member 24 and the second transmission member 22 during the one of up shifting and down shifting. In this embodiment, the first transmission member 20 is movable together with the first coupling member 24 and the first guide member 86 relative to the base member 18 in the second axial direction D12 so as to change the axial relative position between the first coupling member 24 and the second transmission member 22 during up shifting (from FIG. 20 to FIG. 21). The guide actuator 84 moves the first guide member 86 from the first guide position P11 to the second guide position P12 in the guide direction D6 when the switching actuator 74 moves the first transmission member 20 relative to the base member 18 from the first axial position P1 to the second axial position P2 in the second axial direction D12.

As seen in FIGS. 21 and 22, the first transmission member 20 is movable relative to the base member 18, the first coupling member 24, and the first guide member 86 in the first axial direction D11 so as to change the axial relative position between the first coupling member 24 and the first transmission member 20 during the one of up shifting and down shifting. In this embodiment, the first transmission member 20 is movable relative to the base member 18, the first coupling member 24, and the first guide member 86 in the first axial direction D11 so as to change the axial relative position between the first coupling member 24 and the first transmission member 20 during up shifting (from FIG. 21 to FIG. 22). The guide actuator 84 positions the first guide member 86 at the second guide position P12 to keep the axial position of the first coupling member 24 relative to the second transmission member 22 in the axial direction D1 when the switching actuator 74 moves the first transmission member 20 relative to the base member 18 from the second axial position P2 to the first axial position P1 in the first axial direction D11.

As seen in FIGS. 21 and 22, the first transmission member 20 is movable relative to the base member 18, the first coupling member 24, and the first guide member 86 in the second axial direction D12 so as to change the axial relative position between the first coupling member 24 and the first transmission member 20 during said another of up shifting and down shifting. In this embodiment, the first transmission member 20 is movable relative to the base member 18, the first coupling member 24, and the first guide member 86 in the second axial direction D12 so as to change the axial relative position between the first coupling member 24 and the first transmission member 20 during down shifting (from FIG. 22 to FIG. 21). The guide actuator 84 positions the first guide member 86 at the second guide position P12 to keep the axial position of the first coupling member 24 relative to the second transmission member 22 in the axial direction D1 when the switching actuator 74 moves the first transmission member 20 relative to the base member 18 from the first axial position P1 to the second axial position P2 in the second axial direction D12.

As seen in FIGS. 20 and 21, the first transmission member 20 is movable together with the first coupling member 24 and the first guide member 86 relative to the base member 18 in the first axial direction Dl11 so as to change the axial relative position between the first coupling member 24 and the second transmission member 22 during said another of up shifting and down shifting. In this embodiment, the first transmission member 20 is movable together with the first coupling member 24 and the first guide member 86 relative to the base member 18 in the first axial direction D11 so as to change the axial relative position between the first coupling member 24 and the second transmission member 22 during down shifting (from FIG. 21 to FIG. 20). The guide actuator 84 moves the first guide member 86 from the second guide position P12 to the first guide position P11 in the guide direction D6 when the switching actuator 74 moves the first transmission member 20 relative to the base member 18 from the second axial position P2 to the first axial position P1 in the first axial direction D11.

The above operation of the first transmission member 20, the first coupling member 24, and the first guide member 86 is applied to a case where the first guide member 86 is positioned at each of the third to seventh guide positions P13 to P17. For example, the first guide member 86 can be positioned at the third guide position P13 in FIGS. 21 and 22 in a case where the first guide member 86 is positioned at the second guide position P12 in FIG. 20.

Figure 23:
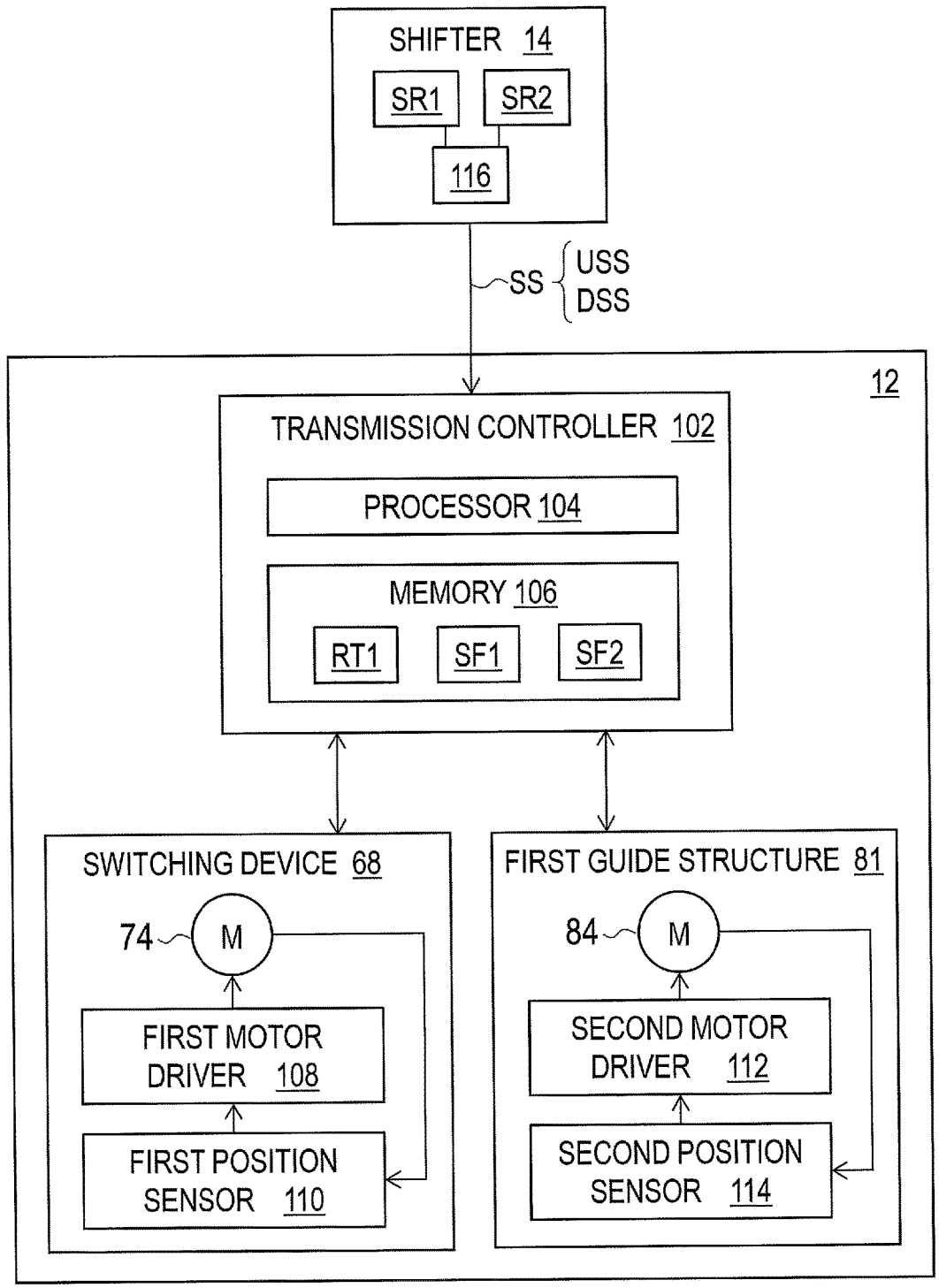
FIG. 23 is a block diagram of the bicycle transmission apparatus illustrated in FIG.

As seen in FIG. 23, the bicycle transmission apparatus 12 further comprises a transmission controller 102. The transmission controller 102 is configured to control the switching device 68 and the first guide structure 81. Specifically, the transmission controller 102 is configured to control the switching actuator 74 and the guide actuator 84. In this embodiment, the transmission controller 102 is constituted as a microcomputer and includes a processor 104 and a memory 106. The processor 104 includes a central processing unit (CPU). The memory 106 includes a read only memory (ROM) and a random access memory (RAM). For example, a program stored in the memory 106 is read into the processor 104, and thereby several functions of the transmission controller 102 are performed. The transmission controller 102, the switching device 68 and the first guide structure 81 are powered by a battery (e.g. a rechargeable battery) which is mounted on the bicycle frame B3 or the base member 18.

While the functions of the transmission controller 102 are performed by software, the functions of the transmission controller 102 can be performed by hardware or by a combination of the software and the hardware if needed and/or desired.

The transmission controller 102 is configured to store a transmission route RT1 (FIG. 24) in the memory 106. FIG. 24 shows a total number of the first teeth 42 in each of the first cogwheels CW11 to CW17, a total number of the second teeth 44 in each of the second cogwheels CW21 to CW27, and gear ratios defined the first cogwheels CW11 to CW17 and the second cogwheels CW21 to CW27. The transmission route RT1 is defined by thirteen gear ratios among the gear ratios defined by the first cogwheels CW11 to CW17 and the second cogwheels CW21 to CW27. Namely, the transmission controller 102 includes a transmission route memory configured to store the transmission route RT1 defined by at least two of the gear ratios defined by the first cogwheels CW11 to CW17 and the second cogwheels CW21 to CW27.

To control the switching device 68 and the first guide structure 81 based on the transmission route RT1 of FIG. 24, as seen in FIGS. 23 and 25, the transmission controller 102 is configured to store shift information SF1 defined based on the transmission route RT1 in the memory 106. As seen in FIG. 25, for example, the shift information SF1 includes combinations of the axial positions of the first transmission member 20 and the positions of the first guide member 86 for the speed stages of the bicycle transmission apparatus 12. The transmission controller 102 is further configured to store a current speed stage of the bicycle transmission apparatus 12 in the memory 106.

As seen in FIG. 23, the switching device 68 includes a first motor driver 108 and a first position sensor 110. The first motor driver 108 is configured to control the switching actuator 74 based on commands and/or signals from the transmission controller 102. The first position sensor 110 is configured to sense the axial position of the first transmission member 20. In this embodiment, the first position sensor 110 is configured to sense one of a rotational position of the switching actuator 74 (the rotor 70), an axial position of the axially-movable member 72, and an axial position of the first transmission member 20 to obtain the axial position of the first transmission member 20. While the first position sensor 110 is a potentiometer configured to sense the rotational position of the switching actuator 74 (the rotor 70) in this embodiment, the first position sensor 110 can be other sensors such as a rotary encoder, a magnetic sensor, and an optical sensor if needed and/or desired. The transmission controller 102 is configured to store a current axial position of the first transmission member 20 among the first axial position P1 and the second axial position P2 in the memory 106. Namely, the transmission controller 102 includes a first position memory configured to store the current axial position of the first transmission member 20.

The first guide structure 81 includes a second motor driver 112 and a second position sensor 114. The second motor driver 112 is configured to control the guide actuator 84 based on commands and/or signals from the transmission controller 102. The second position sensor 114 is configured to sense the position of the first guide member 86. In this embodiment, the second position sensor 114 is configured to sense a rotational position of the guide actuator 84 (the threaded rod 87) and an axial position of the first guide member 86 to obtain the position of the first guide member 86. While the second position sensor 114 is a potentiometer configured to sense the rotational position of the guide actuator 84 (the threaded rod 87) in this embodiment, the second position sensor 114 can be other sensors such as a rotary encoder, a magnetic sensor, and an optical sensor. The transmission controller 102 is configured to store a current position of the first guide member 86 in the memory 106. Namely, the transmission controller 102 includes a second position memory configured to store the current position of the first guide member 86.

The shifter 14 includes a first operating member SR1 and a second operating member SR2. The first operating member SR1 is configured to be operated by a user for up shifting. The second operating member SR2 is configured to be operated by the user for down shifting. The shifter 14 includes a signal controller 116 configured to generate a shifting signal SS based on input operations of the first operating member SR1 and the second operating member SR2. The signal controller 116 is configured to generate an up shifting signal USS based on an input operation of the first operating member SR1. The signal controller 116 is configured to generate a down shifting signal DSS based on an input operation of the second operating member SR2. The up shifting signal USS and the down shifting signal DSS are inputted from the shifter 14 to the transmission controller 102. The transmission controller 102 controls the switching actuator 74 and the guide actuator 84 based on the shifting signal SS and the transmission route RT1 (e.g., the shift information SF1) stored in the memory 106.

For example, when the up shifting signal USS is inputted from the shifter 14 to the transmission controller 102 in a state where the speed stage is in a low gear (e.g., FIG. 20), the transmission controller 102 controls the switching actuator 74 to move the first transmission member 20 from the first axial position P1 to the second axial position P2 in the second axial direction D12 (FIGS. 21 and 25). At this time, as seen in FIGS. 21 and 25, the transmission controller 102 controls the guide actuator 84 to move the first guide member 86 from the first guide position P11 to the second guide position P12. In this embodiment, the first transmission member 20 and the first guide member 86 are substantially simultaneously moved when the first coupling member 24 is shifted on the transmission member 22. Thus, the first transmission member 20 and the first coupling member 24 are shifted relative to the second transmission member 22 in the second axial direction D12. Accordingly, as seen in FIGS. 21, 24, and 25, the first coupling member 24 is shifted from the second cogwheel CW27 to the second cogwheel CW26, changing the speed stage of the bicycle transmission apparatus 12 from low gear to second gear.

Namely, the transmission controller 102 is configured to control the switching device 68 and the first guide structure 81 to move the first transmission member 20 and the first guide member 86 relative to the base member 18 (the second transmission member 22) in the axial direction D1. The transmission controller 102 is configured to control the switching device 68 and the first guide structure 81 so as not to change the first engagement state of the first coupling member 24 from one cogwheel to another adjacent cogwheel among the first cogwheels CW11 to CW17 when the first transmission member 20 moves relative to the base member 18 in association with a movement of the first guide structure 81 relative to the base member 18 to change the second engagement state of the first coupling member 24 from one cogwheel to another adjacent cogwheel among the second cogwheels CW21 to CW27.

When the up shifting signal USS is inputted from the shifter 14 to the transmission controller 102 in a state where the speed stage is in second gear (FIG. 21), the transmission controller 102 controls the switching actuator 74 to move the first transmission member 20 from the second axial position P2 to the first axial position P1 in the first axial direction D11 (FIGS. 22 and 25). At this time, as seen in FIGS. 22 and 25, the transmission controller 102 controls the guide actuator 84 to position the first guide member 86 at the second guide position P12. Thus, the first transmission member 20 is shifted relative to the second transmission member 22 and the first coupling member 24 in the first axial direction D11. Accordingly, as seen in FIGS. 21, 24, and 25, the first coupling member 24 is shifted from the first cogwheel CW11 to the first cogwheel CW12, changing the speed stage of the bicycle transmission apparatus 12 from second gear to third gear.

Namely, the transmission controller 102 is configured to control the switching device 68 to move the first transmission member 20 relative to the base member 18 (the second transmission member 22) in the axial direction D1 while the transmission controller 102 controls the first guide structure 81 to position the first guide member 86 at the second guide position P12. The transmission controller 102 is configured to control the switching device 68 and the first guide structure 81 so as to change the first engagement state of the first coupling member 24 from one cogwheel to another adjacent cogwheel among the first cogwheels CW11 to CW17 when the first transmission member 20 moves relative to the base member 18 in the axial direction D1.

When the down shifting signal DSS is inputted from the shifter 14 to the transmission controller 102 in a state where the speed stage is in third gear (FIG. 22), the transmission controller 102 controls the switching actuator 74 to move the first transmission member 20 from the first axial position P1 to the second axial position P2 in the second axial direction D12 (FIGS. 21 and 25). At this time, as seen in FIGS. 21 and 25, the transmission controller 102 controls the guide actuator 84 to position the first guide member 86 at the second guide position P12. Thus, the first transmission member 20 is shifted relative to the second transmission member 22 and the first coupling member 24 in the second axial direction D12. Accordingly, as seen in FIGS. 21, 24, and 25, the first coupling member 24 is shifted from the first cogwheel CW12 to the first cogwheel CW11, changing the speed stage of the bicycle transmission apparatus 12 from third gear to second gear.

When the down shifting signal DSS is inputted from the shifter 14 to the transmission controller 102 in a state where the speed stage is in second gear (FIG. 21), the transmission controller 102 controls the switching actuator 74 to move the first transmission member 20 from the second axial position P2 to the first axial position P1 in the first axial direction D11 (FIGS. 20 and 25). At this time, as seen in FIGS. 20 and 25, the transmission controller 102 controls the guide actuator 84 to move the first guide member 86 from the second guide position P12 to the first guide position P11. Thus, the first transmission member 20 and the first coupling member 24 are shifted relative to the second transmission member 22 in the first axial direction D11. Accordingly, as seen in FIGS. 20, 24, and 25, the first coupling member 24 is shifted from the second cogwheel CW26 to the second cogwheel CW27, changing the speed stage of the bicycle transmission apparatus 12 from second gear to low gear.

As described above, since the transmission controller 102 controls the switching device 68 and the first guide structure 81 between low gear and thirteenth gear based on the transmission route RT1 shown in FIG. 24 (e.g., the shift information SF1 shown in FIG. 25), they will not be described and/or illustrated in detail here for the sake of brevity. If the transmission controller 102 and the shifter 14 are communicated by wireless technology, the transmission controller 102 and the shifter 14 respectively have wireless communication devices, and the shifter 14 has another battery.

Furthermore, in this embodiment, the transmission controller 102 is configured to control the switching device 68 to change a moving speed of the first transmission member

20 when the switching device 68 switches the position of the first transmission member 20 between the first axial position P1 and the second axial position P2. The transmission controller 102 is configured to control the switching device 68 to move the first transmission member 20 from one of the first axial position P1 and the second axial position P2 relative to the base member 18 at a first speed when the switching device 68 switches the position of the first transmission member 20 between the first axial position P1 and the second axial position P2.

In this embodiment, the transmission controller 102 is configured to control the switching device 68 to move the first transmission member 20 from the first axial position P1 toward the second axial position P2 relative to the base member 18 at a first speed V11 when the switching device 68 switches the position of the first transmission member 20 between the first axial position P1 and the second axial position P2. The transmission controller 102 is configured to control the switching device 68 to move the first transmission member 20 from the second axial position P2 toward the first axial position P1 relative to the base member 18 at the first speed V12 when the switching device 68 switches the position of the first transmission member 20 between the first axial position P1 and the second axial position P2. While the first speed V11 is equal to the first speed V12 in this embodiment, the first speed V11 can be different from the first speed V12. The transmission controller 102 stores the first speeds V11 and V12 in the memory 106.

The transmission controller 102 is configured to control the switching device 68 to temporarily change the moving speed of the first transmission member 20 from the first speed V11 to a second speed V21 when the switching device 68 switches the position of the first transmission member 20 between the first axial position P1 and the second axial position P2. The transmission controller 102 is configured to control the switching device 68 to temporarily change the moving speed of the first transmission member 20 from the first speed V12 to a second speed V22 when the switching device 68 switches the position of the first transmission member 20 between the first axial position P1 and the second axial position P2.

In this embodiment, the transmission controller 102 is configured to control the switching device 68 to temporarily change the moving speed of the first transmission member 20 from the first speed V11 to a second speed V21 when the switching device 68 moves the first transmission member 20 from the first axial position P1 toward the second axial position P2. The transmission controller 102 is configured to control the switching device 68 to temporarily change the moving speed of the first transmission member 20 from the first speed V12 to a second speed V22 when the switching device 68 moves the first transmission member 20 from the second axial position P2 toward the first axial position P1. While the second speed V21 is equal to the second speed V22 in this embodiment, the second speed V21 can be different from the second speed V22. The transmission controller 102 stores the second speeds V21 and V22 in the memory 106.

The second speed V21 is lower than the first speed V11. The second speed V22 is lower than the first speed V12. In this embodiment, the second speed V21 is zero. The second speed V22 is zero. Namely, the switching device 68 changes the moving speed from the first speed V11 to zero to temporarily stop the first transmission member 20 at a third axial position P31 defined between the first axial position P1 and the second axial position P2 for a stop time T1 when the switching device 68 switches the position of the first transmission member 20 between the first axial position P1 and the second axial position P2. The switching device 68 changes the moving speed from the first speed V12 to zero to temporarily stop the first transmission member 20 at a third axial position P32 defined between the first axial position P1 and the second axial position P2 for a stop time T2 when the switching device 68 switches the position of the first transmission member 20 between the first axial position P1 and the second axial position P2. However, at least one of the second speeds V21 and V22 can be larger than zero. The transmission controller 102 stores the stop time T1 and the stop time T2 in the memory 106. While the third axial position P31 is equal to the third axial position P32 relative to the first axial position P1 and the second axial position P2 in this embodiment, the third axial position P31 can be different from the third axial position P32 relative to the first axial position P1 and the second axial position P2.

The transmission controller 102 is configured to control the switching device 68 to change the moving speed of the first transmission member 20 from the second speed V21 to a third speed V31 when the switching device 68 switches the position of the first transmission member 20 between the first axial position P1 and the second axial position P2. The transmission controller 102 is configured to control the switching device 68 to change the moving speed of the first transmission member 20 from the second speed V22 to a third speed V32 when the switching device 68 switches the position of the first transmission member 20 between the first axial position P1 and the second axial position P2.

In this embodiment, the transmission controller 102 is configured to control the switching device 68 to change the moving speed of the first transmission member 20 from the second speed V21 to the third speed V31 when the switching device 68 moves the first transmission member 20 from the first axial position P1 toward the second axial position P2. The transmission controller 102 is configured to control the switching device 68 to change the moving speed of the first transmission member 20 from the second speed V22 to the third speed V32 when the switching device 68 moves the first transmission member 20 from the second axial position P2 toward the first axial position P1. While the third speed V31 is equal to the third speed V32 in this embodiment, the third speed V31 can be different from the third speed V32. The transmission controller 102 stores the third speeds V31 and V32 in the memory 106.

In this embodiment, the third speed V31 is higher than the second speed V21. The third speed V31 is equal to the first speed V11. The third speed V32 is higher than the second speed V22. The third speed V32 is equal to the first speed V12. However, the third speed V31 can be different from the first speed V11, and the third speed V32 can be different from the first speed V12.

On the other hand, the transmission controller 102 is configured to control the first guide structure 81 to move the first guide member 86 without changing a moving speed of the first guide member 86 when the guide actuator 84 moves the first guide member 86 from one position to another adjacent position among the first guide position P11 to the seventh guide position P17. In this embodiment, the transmission controller 102 is configured to control the guide actuator 84 to move the first guide member 86 at the first speed V11 (or V12) when the switching device 68 moves the first transmission member 20 relative to the base member 18. However, the transmission controller 102 can be configured to control the guide actuator 84 to change the moving speed of the first guide member 86 as with the first transmission member 20.

The transmission controller 102 is configured to control the switching device 68 to move the first transmission member 20 at a fourth speed between the first axial position P1 and the second axial position P2 with controlling the guide actuator 84 to position the first guide member 86 at a current guide position. In this embodiment, the transmission controller 102 is configured to control the switching device 68 to move the first transmission member 20 at a fourth speed V41 from the first axial position P1 to the second axial position P2 in the second axial direction D12 with controlling the guide actuator 84 to position the first guide member 86 at a current guide position. The transmission controller 102 is configured to control the switching device 68 to move the first transmission member 20 at a fourth speed V42 from the second axial position P2 to the first axial position P1 in the first axial direction D11 with controlling the guide actuator 84 to position the first guide member 86 at a current guide position. The transmission controller 102 stores the fourth speeds V41 and V42 in the memory 106. While the fourth speed V41 is equal to the fourth speed V42 in this embodiment, the fourth speed V41 can be different from the fourth speed V42. While the fourth speeds V41 and V42 are equal to the first speeds V11 and V12 in this embodiment, the fourth speeds V41 and V42 can be different from the first speeds V11 and V12.

In this embodiment, the first transmission member 20 moves between the first axial position P1 and the second axial position P2 without temporarily changing the moving speed from the fourth speed V41 or V42. However, the transmission controller 102 can be configured to change the moving speed of the first transmission member 20 when the first transmission member 20 moves between the first axial position P1 and the second axial position P2 without moving the first guide member 86.

Figure 26:
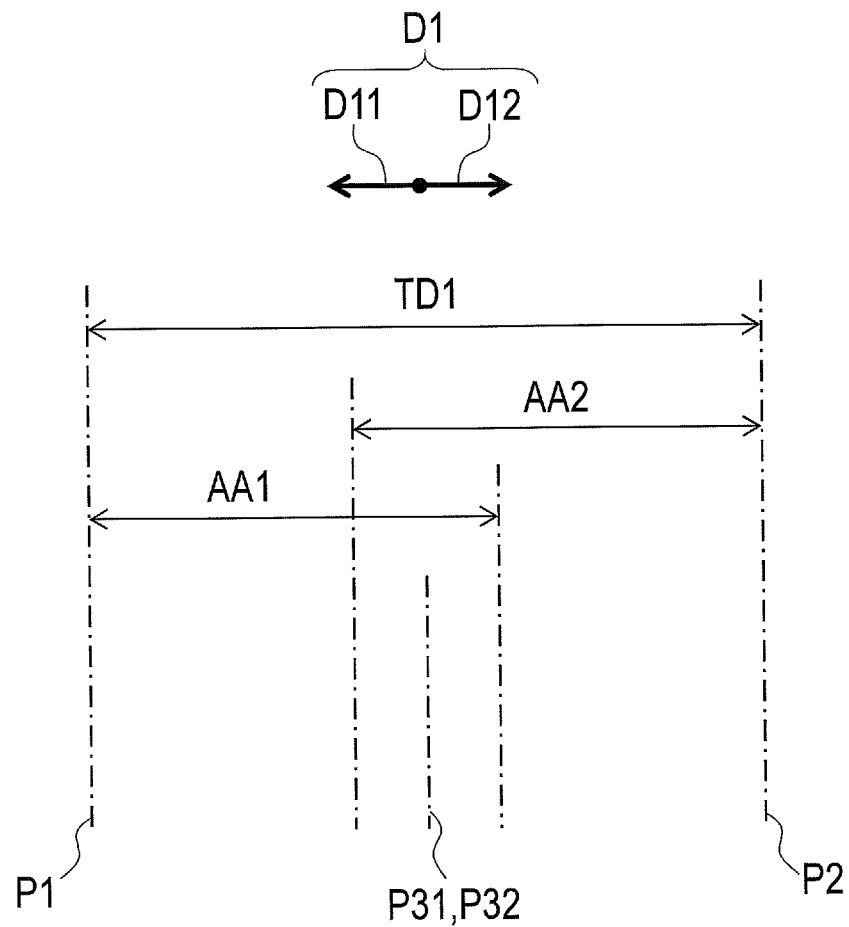
FIG. 26 shows first to third axial positions and first and second axial areas of the first transmission member of the bicycle transmission apparatus illustrated in FIG. 1.

As seen in FIG. 26, the third axial position P31 of the first transmission member 20 is set within a first axial area AA1. The first axial area AA1 is defined from the first axial position P1 in the second axial direction D12 and is shorter than the travel distance TD1 in the axial direction D1. The first engagement state defined between the first transmission member 20 and the first coupling member 24 is kept without an external force even if the first transmission member 20 moves relative to the base member 18 and the second transmission member 22 from the first axial position P1 within the first axial area AA1. The first engagement state changes from one cogwheel to another adjacent cogwheel among the first cogwheels CW11 to CW17 when the first transmission member 20 moves from the first axial position P1 beyond the first axial area AA1.

Similarly, the third axial position P32 of the first transmission member 20 is set within a second axial area AA2. The second axial area AA2 is defined from the second axial position P2 in the first axial direction D11 and is shorter than the travel distance TD1 in the axial direction D1. The first engagement state defined between the first transmission member 20 and the first coupling member 24 is kept without an external force even if the first transmission member 20 moves relative to the base member 18 and the second transmission member 22 from the second axial position P2 within the second axial area AA2. The first engagement state changes from one cogwheel to another adjacent cogwheel among the first cogwheels CW11 to CW17 when the first transmission member 20 moves from the second axial position P2 beyond the second axial area AA2.

As seen in FIG. 27, the transmission controller 102 stores additional shifting information SF2 in the memory 106. The additional shifting information SF2 includes corresponding relationship among the shifting signal, an operation of the switching actuator 74, an operation of the guide actuator 84, the moving speed, and the stop time. The transmission controller 102 controls the switching actuator 74 and the guide actuator 84 based on the shifting signal SS input from the shifter 14.

Figure 28:
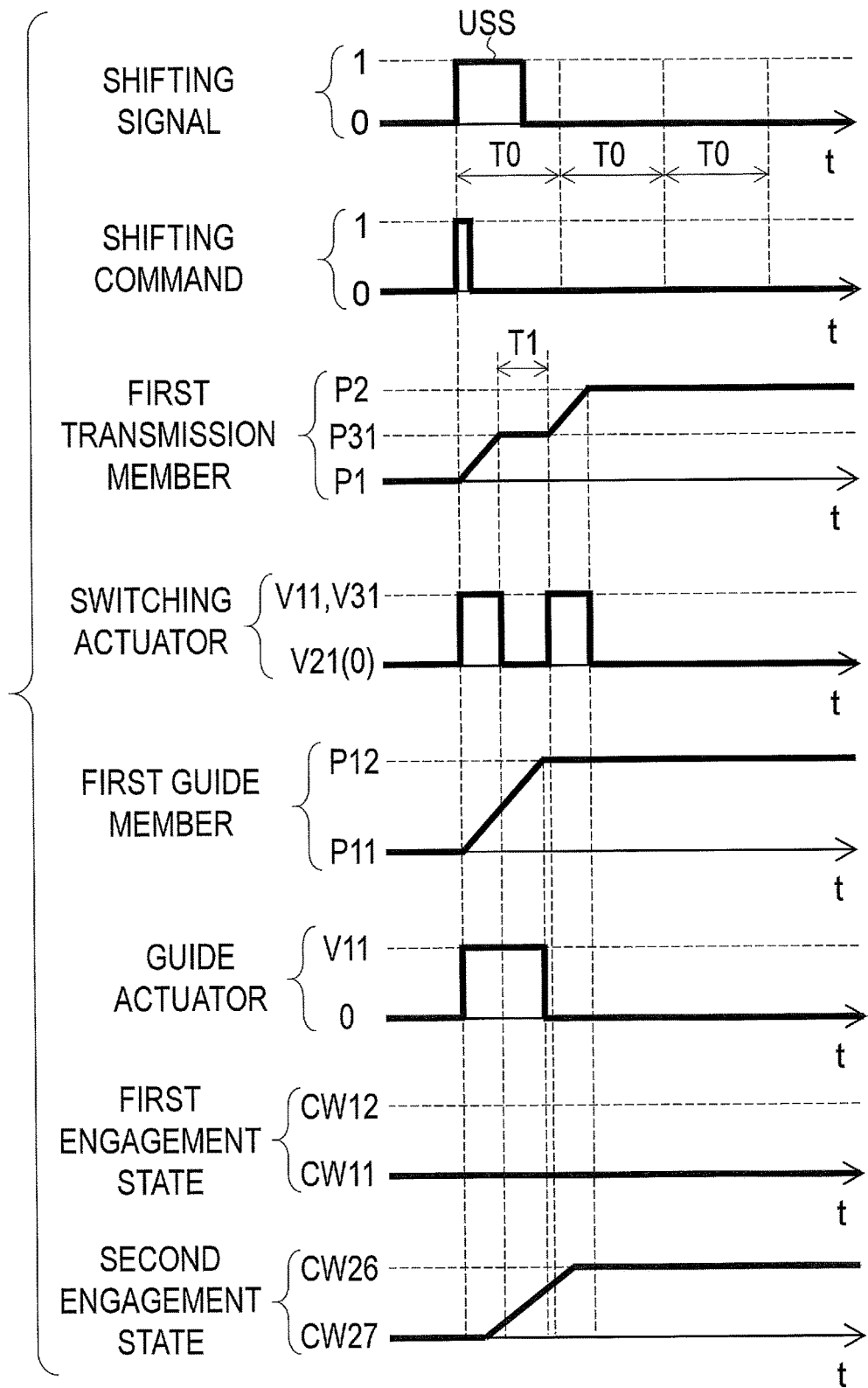
FIG. 28 is a timing chart showing an example of an up shifting operation of the bicycle transmission apparatus illustrated in FIG. 1.

As seen in FIG. 28, when the up shifting signal USS is inputted from the shifter 14 to the transmission controller 102 in a state where the speed stage is in low gear (FIG. 20), the transmission controller 102 generates an up shifting command to control the switching actuator 74 and the guide actuator 84 based on the additional shifting information SF2. The up shifting command indicates a direction of movement, the first speed V11, the second speed V21, the third speed V31, and the stop time T1.

The first motor driver 108 controls the switching actuator 74 based on the up shifting command. Specifically, the switching actuator 74 moves the first transmission member 20 from the first axial position P1 to the third axial position P31 at the first speed V11. The switching actuator 74 stops and positions the first transmission member 20 at the third axial position P31 for the stop time T1 since the second speed V21 is zero. The switching actuator 74 moves the first transmission member 20 from the third axial position P31 to the second axial position P2 at the third speed V31.

The transmission controller 102 is configured to control the guide actuator 84 to move the first guide member 86 without temporarily changing the moving speed of the first guide member 86. The transmission controller 102 controls the guide actuator 84 to move the first guide member 86 at the first speed V11 or another speed from one position to another adjacent position among the first guide position P11 to the seventh guide position P17.

The first coupling member 24 is shifted by the first guide member 86 relative to the second transmission member 22 in the second axial direction D12. Thus, the second engagement state is changed from the second cogwheel CW27 to the second cogwheel CW26 while the first guide member 86 moves from the first guide position P11 to the second guide position P12.

On the other hand, the first coupling member 24 is not shifted relative to the first transmission member 20 in the pulling area AR2 (FIG. 4) prior to changing of the second engagement state of the first coupling member 24 since the first transmission member 20 temporarily stops at the third axial position P31. Furthermore, the second guide structure 96 applies the sliding resistance to the first coupling member 24 via the second guide member 98 when the first transmission member 20 moves from the first axial position P1 to the third axial position P31. This effectively prevents the first coupling member 24 from shifting relative to the first transmission member 20 in the pulling area AR2. Accordingly, it is possible to change the second engagement state without changing the first engagement state.

Figure 29:
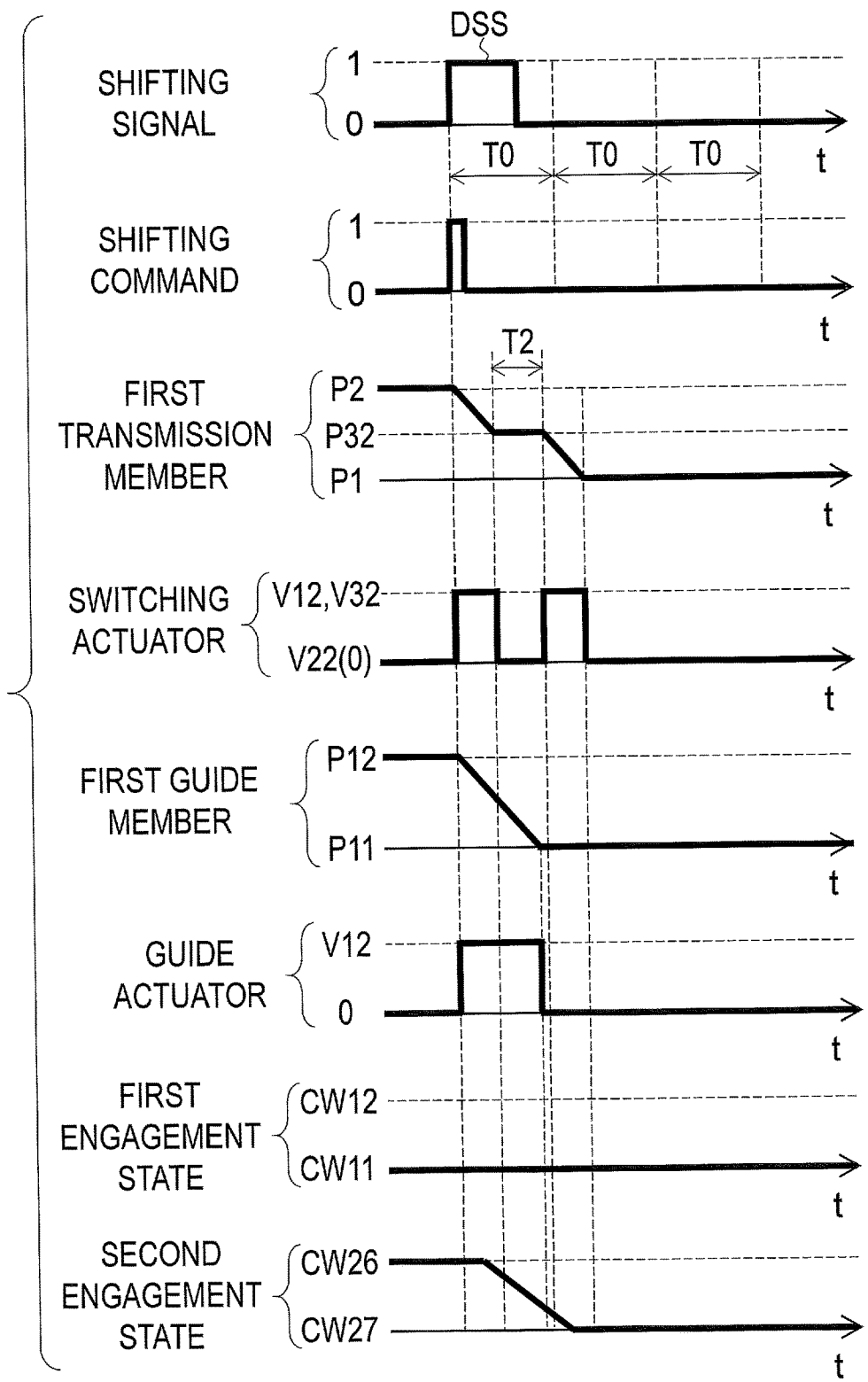
FIG. 29 is a timing chart showing an example of a down shifting operation of the bicycle transmission apparatus illustrated in FIG. 1.

As seen in FIG. 29, when the down shifting signal DSS is inputted from the shifter 14 to the transmission controller 102 in a state where the speed stage is in second gear (FIG. 21), the transmission controller 102 generates an down shifting command to control the switching actuator 74 and the guide actuator 84 based on the additional shifting information SF2. The down shifting command indicates a direction of movement, the first speed V12, the second speed V22, the third speed V32, and the stop time T2.

The first motor driver 108 controls the switching actuator 74 based on the down shifting command. Specifically, the switching actuator 74 moves the first transmission member 20 from the second axial position P2 to the third axial position P32 at the first speed V12. The switching actuator 74 stops and positions the first transmission member 20 at the third axial position P32 for the stop time T2 since the second speed V22 is zero. The switching actuator 74 moves the first transmission member 20 from the third axial position P32 to the first axial position P1 at the third speed V32.

The transmission controller 102 is configured to control the guide actuator 84 to move the first guide member 86 without temporarily changing the moving speed of the first guide member 86. The transmission controller 102 controls the guide actuator 84 to move the first guide member 86 at the first speed V11 or another speed from one position to another adjacent position among the first guide position P11 to the seventh guide position P17.

The first coupling member 24 is shifted by the first guide member 86 relative to the second transmission member 22 in the first axial direction D11. Thus, the second engagement state is changed from the second cogwheel CW26 to the second cogwheel CW27 while the first guide member 86 moves from the second guide position P12 to the first guide position P11.

On the other hand, the first coupling member 24 is not shifted relative to the first transmission member 20 in the pulling area AR2 (FIG. 4) prior to changing of the second engagement state of the first coupling member 24 since the first transmission member 20 temporarily stops at the third axial position P32. Furthermore, the second guide structure 96 applies the sliding resistance to the first coupling member 24 via the second guide member 98 when the first transmission member 20 moves from the second axial position P2 to the third axial position P32. This effectively prevents the first coupling member 24 from shifting relative to the first transmission member 20 in the pulling area AR2. Accordingly, it is possible to change the second engagement state without changing the first engagement state.

First Modification

Figure 30:
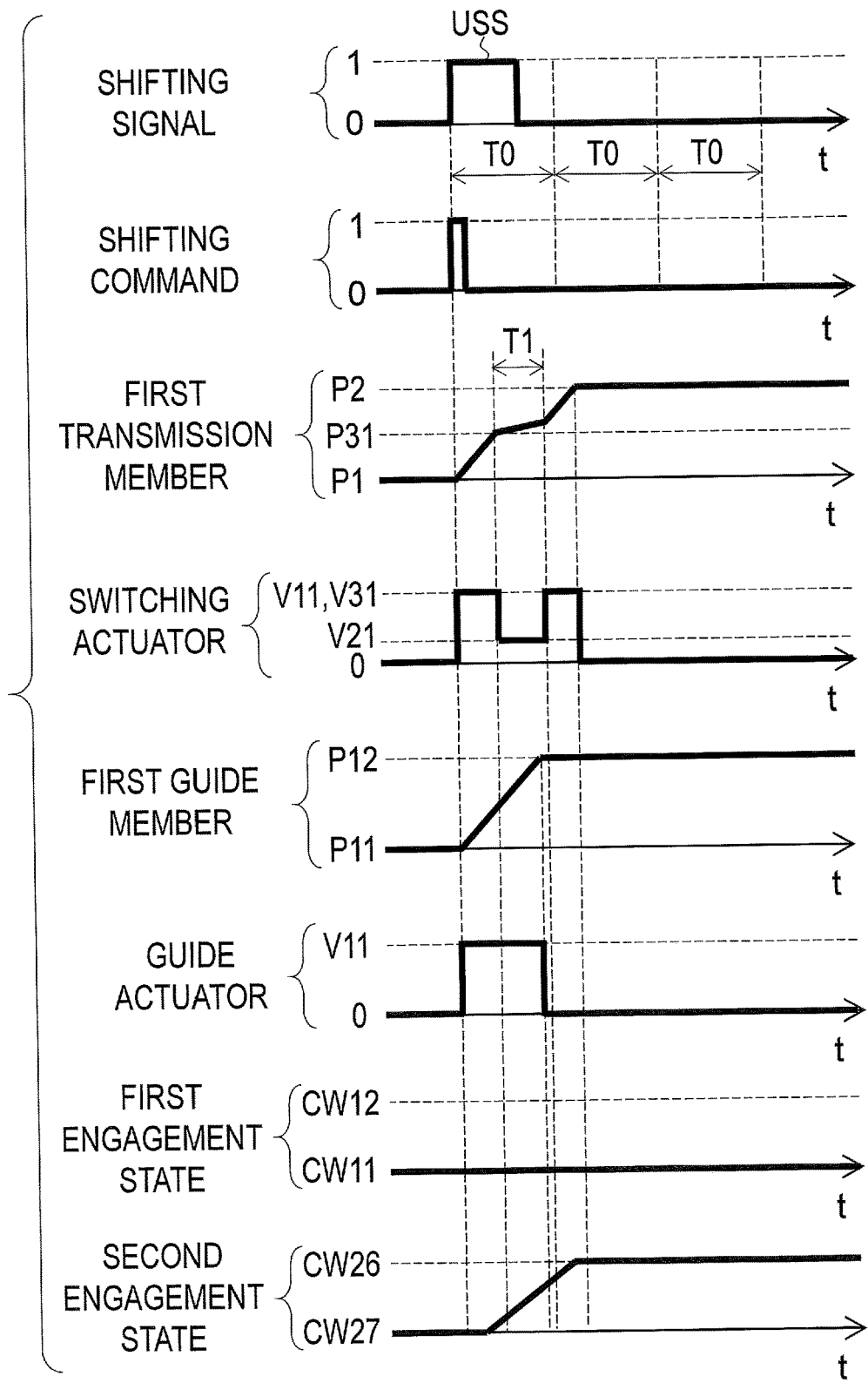
FIG. 30 is a timing chart showing an example of an up shifting operation of the bicycle transmission apparatus illustrated in FIG. 1 (first modification).

As seen in FIG. 30, at least one of the second speeds V21 and V22 can be higher than zero. With this modification, it is possible to obtain substantially the same effects as those of the bicycle transmission apparatus 12 of the first embodiment.

Second Modification

Figure 31:
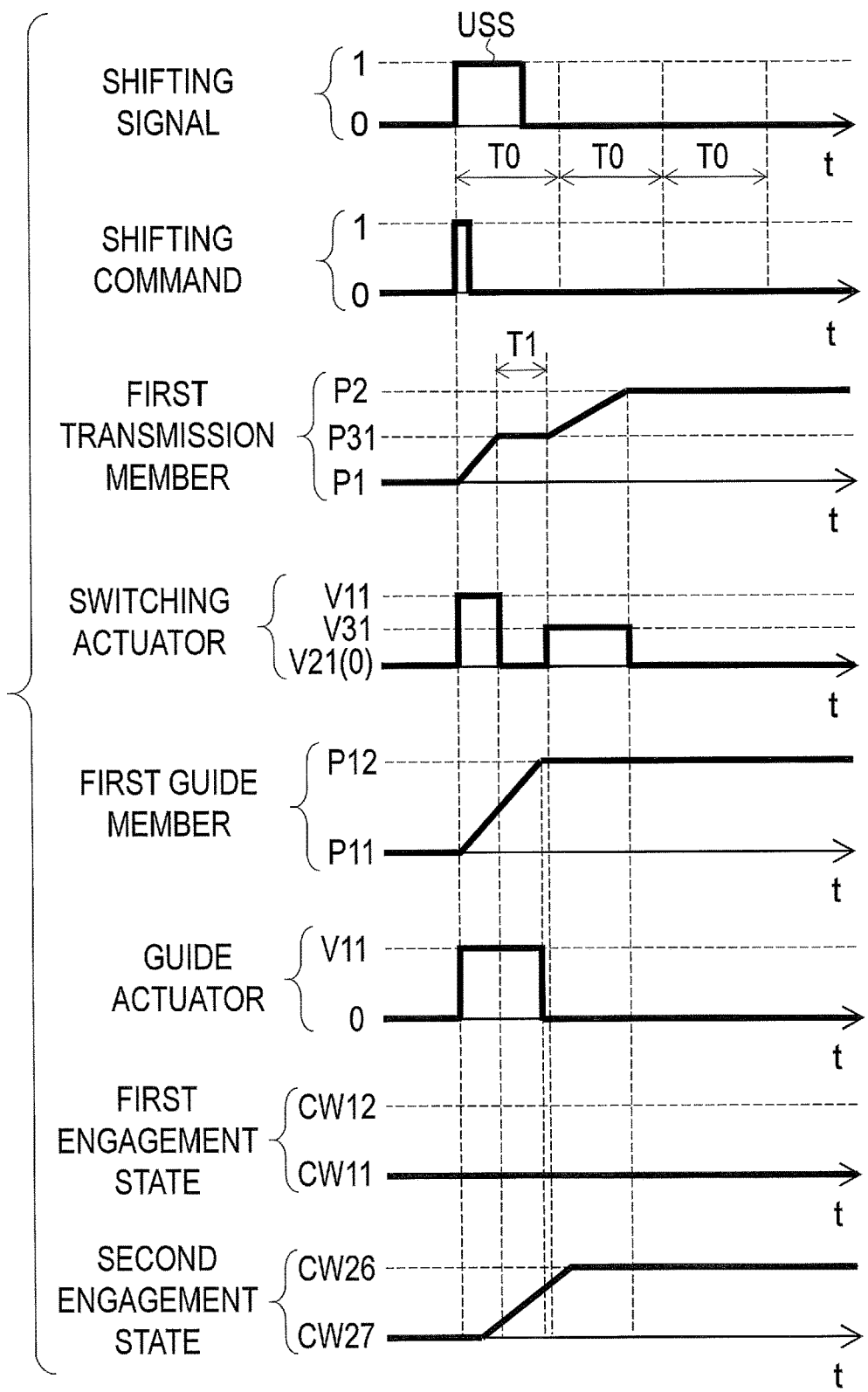
FIG. 31 is a timing chart showing an example of an up shifting operation of the bicycle transmission apparatus illustrated in FIG. 1 (second modification).

As seen in FIG. 31, at least one of the third speeds V31 and V32 can be different from at least one of the first speeds V11 and V12. While the third speed V31 is lower than the first speed V11 in this embodiment, the third speed V31 can be higher than the first speed V11. With this modification, it is possible to obtain substantially the same effects as those of the bicycle transmission apparatus 12 of the first embodiment.

Third Modification

Figure 32:
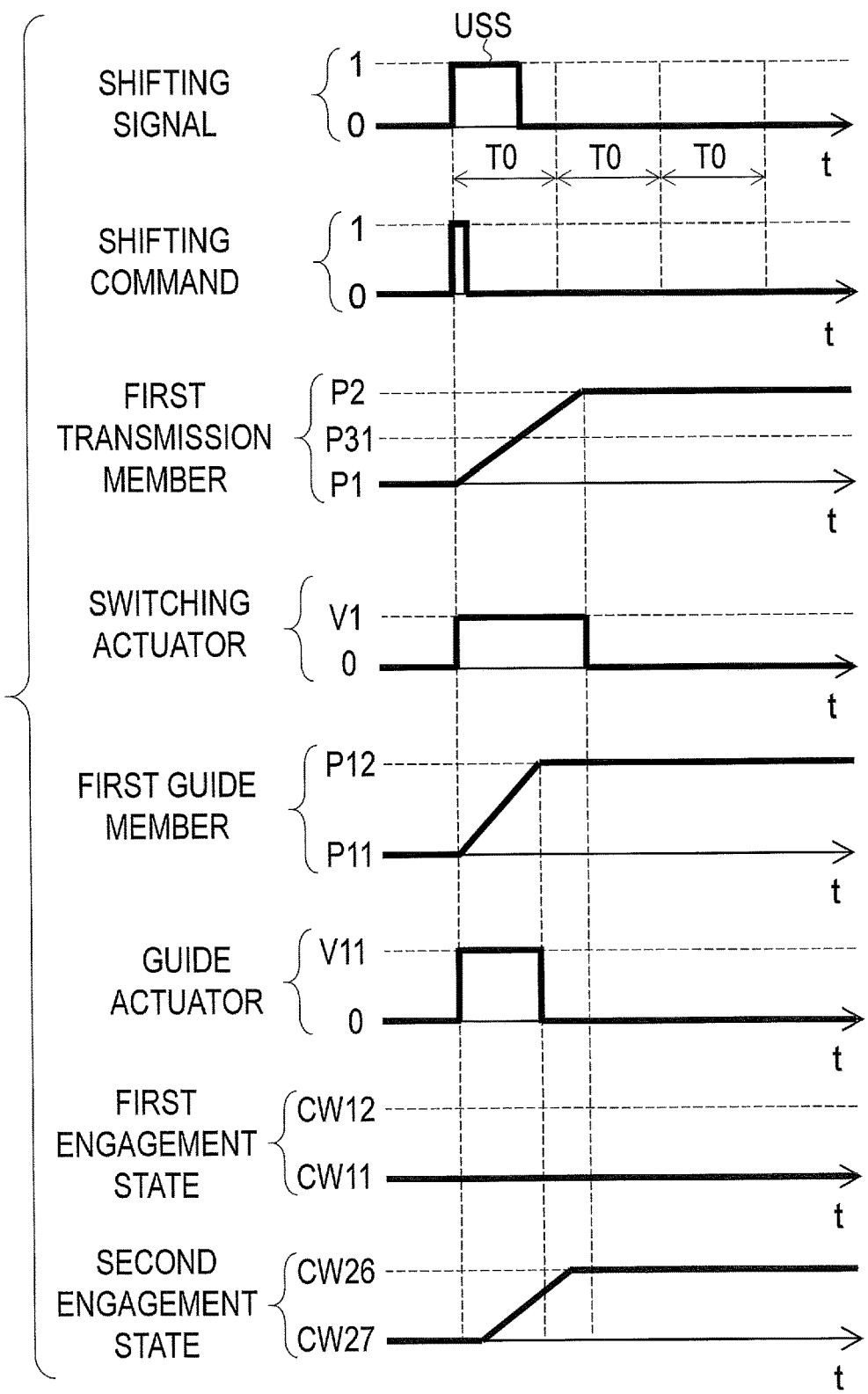
FIG. 32 is a timing chart showing an example of an up shifting operation of the bicycle transmission apparatus illustrated in FIG. 1 (third modification).

As seen in FIG. 32, a moving speed V1 of the first transmission member 20 and a moving speed V2 of the first guide member 86 can be constant. In this modification, the moving speed V1 of the first transmission member 20 can be lower than the moving speed V2 of the first guide member 86.

It will be apparent to those skilled in the bicycle field from the present disclosure that the above modifications can be at least partly combined with each other.

The bicycle transmission apparatus (the bicycle drive unit) 12 includes the following features.

(1) With the bicycle transmission apparatus 12, the transmission controller 102 is configured to control the switching device 68 and the first guide structure 81 so as not to change the first engagement state of the first coupling member 24 from one cogwheel to another adjacent cogwheel among the first cogwheels CW11 to CW17 when the first transmission member 20 moves relative to the base member 18 in association with a movement of the first guide structure 81 relative to the base member 18 to change the second engagement state of the first coupling member 24 from one cogwheel to another adjacent cogwheel among the second cogwheels CW21 to CW27. Thus, it is possible to change the second engagement state of the first coupling member 24 without changing the first engagement state of the first coupling member 24. Accordingly, it is possible to smoothly shift the first coupling member 24 relative to the second transmission member 22.

(2) The transmission controller 102 is configured to control the switching device 68 to change the moving speed of the first transmission member 20 when the switching device 68 switches the position of the first transmission member 20 between the first axial position P1 and the second axial position P2. Thus, it is possible to change the second engagement state of the first coupling member 24 prior to changing the first engagement state of the first coupling member 24 by changing the moving speed of the first transmission member 20. Accordingly, it is possible to change the second engagement state of the first coupling member 24 without changing the first engagement state of the first coupling member 24.

(3) The first transmission member 20 moves relative to the second transmission member 22 in the axial direction D1 by the travel distance TD1 defined between the first axial position P1 and the second axial position P2 to change the first engagement state of the first coupling member 24 from one cogwheel to another adjacent cogwheel among the first cogwheels CW11 to CW17. Accordingly, it is possible to shift the first coupling member 24 relative to the first transmission member 20.

(4) The first guide structure 81 is provided in the releasing area AR1 defined between the first transmission member 20 and the second transmission member 22. Accordingly, it is possible to assist changing of the second engagement state of the first coupling member 24 using the first guide structure 81.

(5) The bicycle transmission apparatus 12 further comprises the second guide structure 96 to guide the first coupling member 24 between the first transmission member 20 and the second transmission member 22. The second guide structure 96 is provided in the pulling area AR2 defined between the first transmission member 20 and the second transmission member 22. Accordingly, it is possible to assist changing of the first engagement state of the first coupling member 24 using the second guide structure 96.

(6) The second guide structure 96 includes the second guide member 98 contactable with the first coupling member 24, and the guide support 100 to slidably support the second guide member 98 to apply the sliding resistance to the second guide member 98. The second guide member 98 moves relative to the guide support 100 in response to the pushing force F 11 applied from the first coupling member 24 to the second guide member 98 beyond the sliding resistance. Accordingly, it is possible to apply a resistance to the first coupling member 24 via the second guide member 98. Thus, it is possible to change the first engagement state of the first coupling member 24 using the second guide structure 96 having a simple construction.

(7) The transmission controller 102 is configured to control the switching device 68 to move the first transmission member 20 from one of the first axial position P1 and the second axial position P2 relative to the base member 18 at the first speed V11 or V12 when the switching device 68 switches the position of the first transmission member 20 between the first axial position P1 and the second axial position P2. Accordingly, it is possible to change the second engagement state of the first coupling member 24 without changing the first engagement state of the first coupling member 24 by adjusting the first speed V11 or V12 to a suitable speed.

(8) The transmission controller 102 is configured to control the switching device 68 to temporarily change the moving speed of the first transmission member 20 from the first speed V11 or V12 to the second speed V21 or V22 when the switching device 68 switches the position of the first transmission member 20 between the first axial position P1 and the second axial position P2. The second speed V21 or V22 is lower than the first speed V11 or V12. Accordingly, it is possible to certainly change the second engagement state of the first coupling member 24 without changing the first engagement state of the first coupling member 24 by decreasing the moving speed from the first speed V11 or V12 to the second speed V21 or V22.

(9) Since the second speed V21 or V22 is zero, it is possible to temporarily stop the first transmission member 20. This allows the second engagement state of the first coupling member 24 to be certainly changed without changing the first engagement state of the first coupling member 24.

(10) The switching device 68 changes the moving speed from the first speed V11 or V12 to zero to temporarily stop the first transmission member 20 at the third axial position P31 or P32 defined between the first axial position P1 and the second axial position P2 for the stop time T1 or T2 when the switching device 68 switches the position of the first transmission member 20 between the first axial position P1 and the second axial position P2. Accordingly, it is possible to more certainly change the second engagement state of the first coupling member 24 without changing the first engagement state of the first coupling member 24.

(11) The transmission controller 102 is configured to control the switching device 68 to change the moving speed of the first transmission member 20 from the second speed V21 or V22 to the third speed V31 or V32 when the switching device 68 switches the position of the first transmission member 20 between the first axial position P1 and the second axial position P2. The third speed V31 or V32 is higher than the second speed V21 or V22. Accordingly, it is possible to shorten a travelling time of the first transmission member 20 with smoothly changing the second engagement state of the first coupling member 24.

(12) Since the third speed V31 or V32 is equal to the first speed V11 or V12, it is possible to further shorten a travelling time of the first transmission member 20 with smoothly changing the second engagement state of the first coupling member 24.

(13) The first transmission member 20 is detachably attached to the base member 18. The attachment guide 79 is configured to guide the first transmission member 20 to the predetermined position when the first transmission member 20 is mounted on the base member 18. Accordingly, it is possible to easily mount the first transmission element to the base member 18.

(14) The first transmission member 20 is detachable from the base member 18 in the mounting direction D5 perpendicular to the first rotational axis A1. The first transmission member 20 is attachable to the base member 18 in the mounting direction D5. Accordingly, it is possible to easily clean up the first transmission member 20 and replace the first transmission member 20 with another transmission member to set suitable gear ratios.

(15) The attachment guide 79 includes one of the attachment opening 79A and the protruding part 79B. The first transmission member 20 includes the other of the attachment opening 79A and the protruding part 79B. The protruding part 79B is detachably provided in the attachment opening 79A. Accordingly, it is possible to simplify the structure of at least one of the attachment guide 79 and the first transmission member 20.

(16) The attachment opening 79A includes the attachment groove 79C extending in the mounting direction D5. Accordingly, it is possible to guide the first transmission member 20 relative to the base member 18 using the attachment groove 79C of the attachment opening 79A.

(17) The bicycle transmission apparatus 12 further comprises the securing member 80 to secure the first transmission member 20 to the base member 18. Accordingly, it is possible to secure the first transmission member 20 to the base member 18 with a simple structure such as the securing member 80.

(18) The attachment opening 79A includes the attachment through-hole 79D provided in the attachment groove 79C. The securing member 80 extends through the attachment through-hole 79D to secure the first transmission member 20 to the base member 18. Accordingly, it is possible to secure the first transmission member 20 to the base member 18 with a simple structure such as the securing member 80 and the attachment through-hole 79D.

(19) The attachment groove 79C includes the closed end 79E and the open end 79F opposite to the closed end 79E in the mounting direction D5. The first transmission member 20 receives the holding force from the first coupling member 24 to maintain the first transmission member 20 at the closed end 79E in the attachment groove 79C. The open end 79F is provided within the circumferential area CA1 defined about the first rotational axis A1 when viewed from the axial direction D1. The second rotational axis A2 is not provided in the circumferential area CA1 when viewed from the axial direction D1. Accordingly, it is possible to utilize the holding force to maintain the first transmission member 20 at the closed end 79E in the attachment groove 79C.

(20) The first transmission member 20 is movable relative to the base member 18 in the axial direction D1. Accordingly, it is possible to change a relative position between the first transmission member 20 and the second transmission member 22 to shift the first coupling member 24 relative to at least one of the first transmission member 20 and the second transmission member 22.

(21) The switching device 68 includes the rotor 70 and the axially-movable member 72. The rotor 70 is rotatable about the rotational center axis A4 which is non-parallel to the axial direction D1. The axially-movable member 72 is coupled to the rotor 70 to convert the rotation of the rotor 70 to the axial movement of the first transmission member 20 in the axial direction D1. Accordingly, it is possible to improve the flexibility of design of at least one of the first transmission member 20 and the switching device 68.

(22) The rotor 70 includes the offset part 76 offset from the rotational center axis A4 to move around the rotational center axis A4. The axially-movable member 72 includes the coupling groove 78. The offset part 76 is provided in the coupling groove 78 to convert the rotation of the rotor 70 into the axial movement of the first transmission member 20 in the axial direction D1. Accordingly, it is possible to convert the rotation of the rotor 70 into the axial movement of the first transmission member 20 with a simple structure such as the offset part 76 and the coupling groove 78.

(23) The coupling groove 78 extends in the extending direction D4 which is non-parallel to the axial direction D1. Accordingly, it is possible to convert the rotation of the rotor 70 into the axial movement of the first transmission member 20 with avoiding unnecessary interference between the axially-movable member 72 and the offset part 76.

(24) Since the rotor 70 is detachably provided in the coupling groove 78, it is possible to easily clean up the first transmission member 20 and the switching device 68 and/or replace the first transmission member 20 and the switching device 68 with another transmission member and/or another switching device to set suitable gear ratios.

(25) The coupling groove 78 includes the closed end 78B and the open end 78A opposite to the closed end 78B in the extending direction D4. The rotor 70 is detachable from the open end 78A of the coupling groove 78 in the extending direction D4. Accordingly, it is possible to easily assemble the first transmission member 20 and the switching device 68 with a simple structure.

(26) The axially-movable member 72 includes the coupling part 77 coupled to the offset part 76. The coupling part 77 has a substantially U-shape when viewed from a direction parallel to the rotational center axis A4. Accordingly, it is possible to easily assemble the first transmission member 20 and the switching device 68 with a simple structure.

(27) The base member 18 is configured to be attached to the bicycle frame B3 as a separate member from the bicycle frame B3. The base member 18 comprises the bottom bracket adapter mounting portion 18E or 18F configured to detachably fix the bottom bracket adapter BB1 or BB2 to the base member 18. Accordingly, it is possible to detachably fix the bottom bracket adapter BB1 or BB2 to the bottom bracket adapter mounting portion 18E or 18F of the base member 18. Thus, it is possible to rotatably mount the bicycle crank B7 to the bicycle drive unit 12.

(28) Since the bicycle drive unit 12 further comprises the bottom bracket adapter BB1 or BB2, it is possible to treat the base member 18 and the bottom bracket adapter BB1 or BB2 as a single unit.

(29) The bottom bracket adapter BB1 or BB2 and the base member 18 are configured to hold a part of the bicycle frame B3 between the bottom bracket adapter BB1 or BB2 and the base member 18 in the mounting state where the bicycle drive unit 12 is mounted to the bicycle frame B3. Accordingly, it is possible to firmly mount the bicycle drive unit to the bicycle frame B3.

(30) The bicycle drive unit 12 further comprises the first transmission member 20, the second transmission member 22, and the first coupling member 24. Accordingly, it is possible to transmit the rotation between the first transmission member 20 and the second transmission member 22 at the variable speed stage.

(31) The bottom bracket adapter BB1 or BB2 extends through the mounting through-hole 311A or 312A of the bicycle frame B3 in the mounting state. Accordingly, it is possible to easily mount the bottom bracket adapter to the bicycle frame B3.

(32) The bottom bracket adapter mounting portion 18E or 18F includes the threaded hole 18E1 or 18F1. The bottom bracket adapter BB1 or BB2 includes external threads BB1A or BB2A threadedly engaged with the threaded hole 18E1 or 18F1 in the mounting state. Accordingly, it is possible to firmly mount the bottom bracket adapter BB1 or BB2 to the bicycle frame B3.

(33) The bottom bracket adapter BB1 or BB2 is partly received in the recess B311B or B312B of the bicycle frame B3 in the mounting state. Accordingly, it is possible to easily mount the bottom bracket adapter BB1 or BB2 to the bicycle frame B3 with a simple structure.

(34) The bicycle crank B7 includes the crank shaft 28 rotatably supported by the bottom bracket adapter BB1 or BB2 about the crank rotational axis A3. The input cogwheel 31 is mounted to the crank shaft 28. The crank shaft 28 includes the first serration 28A. The input cogwheel 31 includes the second serration 31A engaged with the first serration 28A. Accordingly, it is possible to easily bring the crank shaft 28 into engagement with the input cogwheel 31 via the first serration 28A and the second serration 31A.

Second Embodiment

A bicycle transmission apparatus (a bicycle drive unit) 212 in accordance with a second embodiment will be described below referring to FIG. 33. The bicycle transmission apparatus 212 has the same configuration as the bicycle transmission apparatus 12 except for the transmission controller 102. Thus, elements having substantially the same function as those in the first embodiment will be numbered the same here, and will not be described and/or illustrated again in detail here for the sake of brevity.

Figure 33:
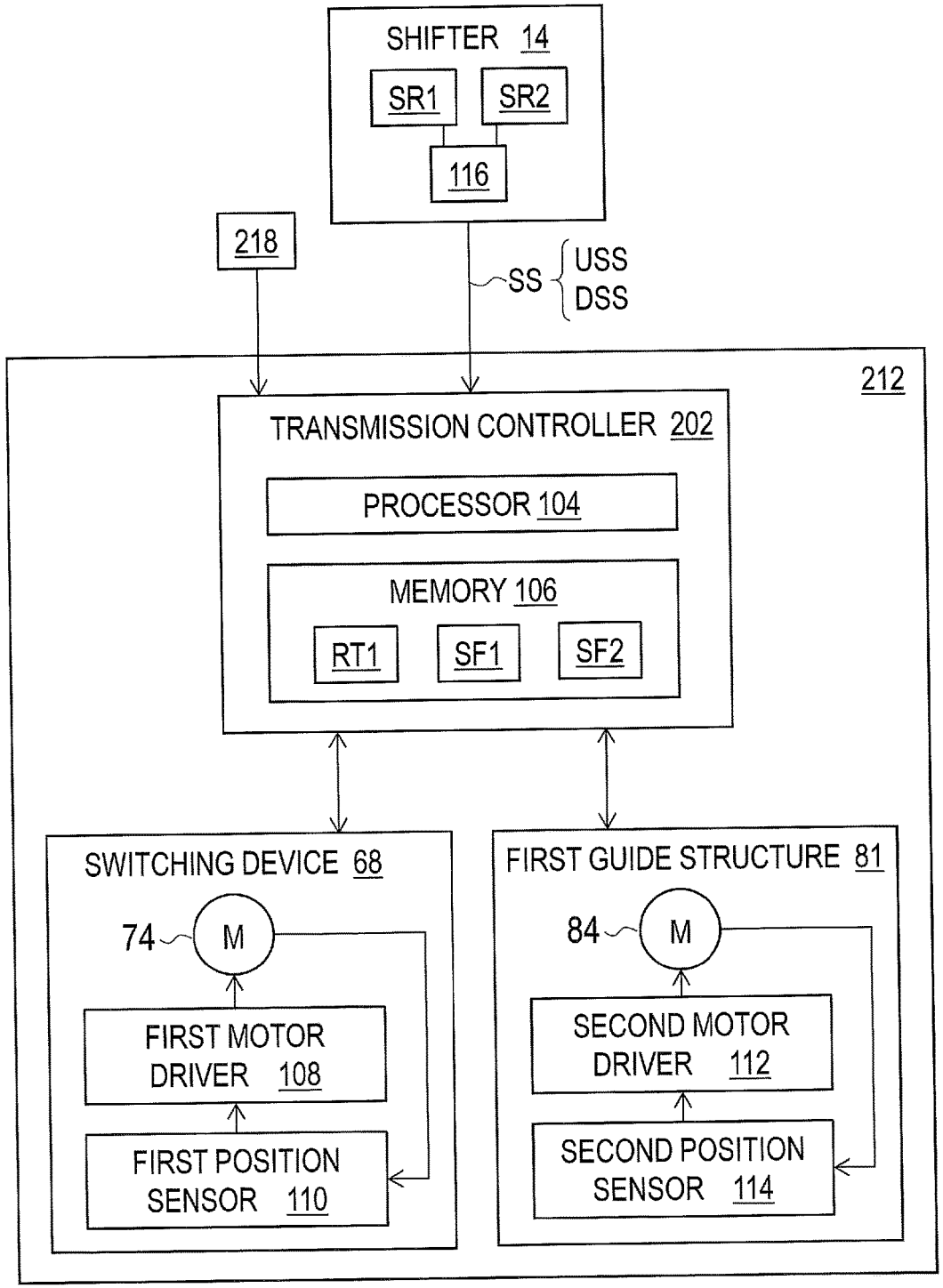
FIG. 33 is a block diagram of a bicycle transmission apparatus in accordance with a second embodiment.

As seen in FIG. 33, the bicycle transmission apparatus 212 has substantially the same structure and/or configuration as that of the bicycle transmission apparatus 12 of the first embodiment. Unlike the bicycle transmission apparatus 12, however, the bicycle transmission apparatus 212 further comprises a transmission controller 202 and a rotational position sensor 218. The rotational position sensor 218 is configured to sense one of a rotational position of the first transmission member 20 relative to the base member 18, a rotational position of the second transmission member 22 relative to the base member 18, and a rotational position of the bicycle crank B7 relative to the base member 18. The rotational position sensor 218 includes a rotary encoder or a magnetic sensor.

The transmission controller 202 has substantially the same configuration as that of the transmission controller 102 of the first embodiment. Unlike the transmission controller 102, however, the transmission controller 202 is configured to calculate the stop time T1 or T2 based on the rotational position sensed by the rotational position sensor 218. In this embodiment, the rotational position sensor 218 is configured to sense the rotational position of the first transmission member 20 relative to the base member 18. While the rotational position sensor 218 is a potentiometer configured to sense the rotational position of the first transmission member 20 in this embodiment, the rotational position sensor 218 can be other sensors such as a rotary encoder, a magnetic sensor, and an optical sensor if needed and/or desired.

The transmission controller 202 is configured to calculate the stop time T1 or T2 based on the rotational position sensed by the rotational position sensor 218. The transmission controller 202 calculates an amount of change in the rotational position of the first transmission member 20 per unit time to obtain a rotational speed of the first transmission member 20. For example, the transmission controller 202 is configured to calculate the stop time T1 or T2 based on the calculated rotational speed and an arithmetic equation. The arithmetic equation indicates a relationship between the stop time T1 or T2 and the rotational speed of the first transmission member 20. The lower rotational speed needs the longer stop time T1 or T2 to change the second engagement state. The higher rotational speed can shorten the stop time T1 or T2 to change the second engagement state. The transmission controller 202 calculates the stop time T1 or T2 in accordance with the calculated rotational speed using the arithmetic equation.

With the bicycle transmission apparatus 212, it is possible to obtain substantially the same effects as those of the bicycle transmission apparatus 12 of the first embodiment.

Furthermore, since the transmission controller 202 is configured to calculate the stop time T1 or T2 based on the rotational position sensed by the rotational position sensor 218. Accordingly, it is possible to set the stop time T1 or T2 in accordance with the rotational position sensed by the rotational position sensor 218. Thus, it is possible to more certainly change of the second engagement state of the first coupling member 24 without changing the first engagement state of the first coupling member 24.

Third Embodiment

A bicycle transmission apparatus (a bicycle drive unit) 312 in accordance with a third embodiment will be described below referring to FIG. 34. The bicycle transmission apparatus 312 has the same configuration as the bicycle transmission apparatus 12 except for the transmission controller 202 and the rotational position sensor 218. Thus, elements having substantially the same function as those in the above embodiments will be numbered the same here, and will not be described and/or illustrated again in detail here for the sake of brevity.

Figure 34:
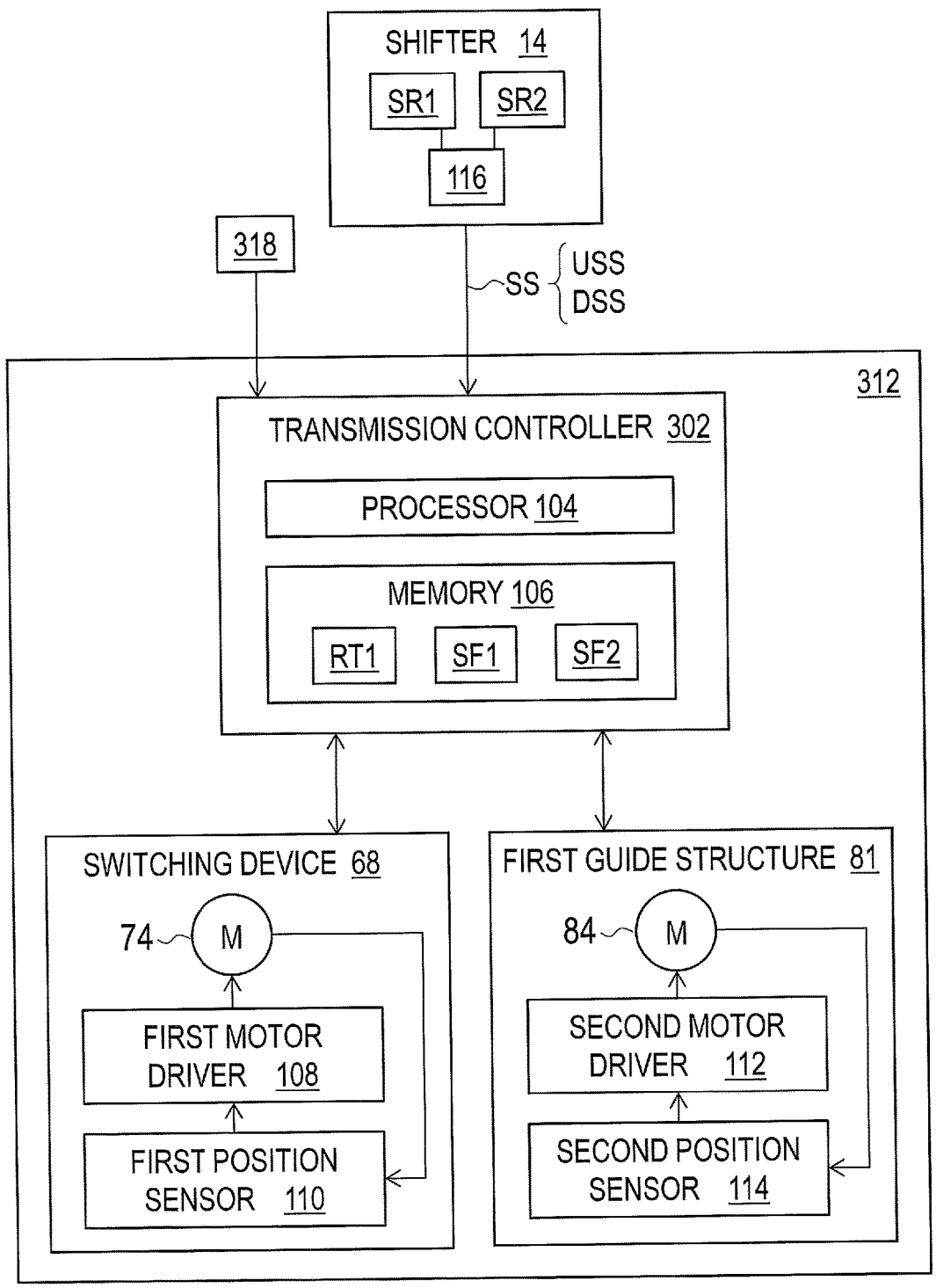
FIG. 34 is a block diagram of a bicycle transmission apparatus in accordance with a third embodiment.

As seen in FIG. 34, the bicycle transmission apparatus 312 has substantially the same structure and/or configuration as that of the bicycle transmission apparatus 212 of the second embodiment. Unlike the bicycle transmission apparatus 212, however, the bicycle transmission apparatus 312 further comprises a transmission controller 302 and a rotational speed sensor 318. The rotational speed sensor 318 is configured to sense one of a rotational speed of the first transmission member 20 relative to the base member 18, and a rotational speed of the second transmission member 22 relative to the base member 18, and a rotational speed of a bicycle crank relative to the base member 18. The rotational speed sensor 318 includes a rotary encoder or a magnetic sensor.

The transmission controller 302 has substantially the same configuration as that of the transmission controller 202 of the second embodiment. Unlike the transmission controller 202, however, the transmission controller 302 is configured to calculate the stop time T1 or T2 based on the rotational speed sensed by the rotational speed sensor 318. In this embodiment, the rotational speed sensor 318 is configured to sense the rotational speed of the first transmission member 20 relative to the base member 18. While the rotational speed sensor 318 is a potentiometer configured to sense the rotational speed of the first transmission member 20 in this embodiment, the rotational speed sensor 318 can be other sensors such as a rotary encoder, a magnetic sensor, and an optical sensor if needed and/or desired.

The transmission controller 302 is configured to calculate the stop time T1 or T2 based on the rotational speed sensed by the rotational speed sensor 318. For example, the transmission controller 302 is configured to calculate the stop time T1 or T2 based on the sensed rotational speed and an arithmetic equation as well as the transmission controller 202 of the second embodiment. The arithmetic equation indicates a relationship between the stop time T1 or T2 and the rotational speed of the first transmission member 20.

With the bicycle transmission apparatus 312, it is possible to obtain substantially the same effects as those of the bicycle transmission apparatuses 12 and 212 of the first and second embodiments.

Furthermore, the transmission controller 302 is configured to calculate the stop time T1 or T2 based on the rotational speed sensed by the rotational speed sensor 318. Accordingly, it is possible to set the stop time in accordance with the rotational speed sensed by the rotational speed sensor 318. Thus, it is possible to more certainly change of the second engagement state of the first coupling member 24 without changing the first engagement state of the first coupling member 24.

Fourth Embodiment

A bicycle transmission apparatus (a bicycle drive unit) 412 in accordance with a fourth embodiment will be described below referring to FIG. 35. The bicycle transmission apparatus 412 has the same configuration as the bicycle transmission apparatus 12 except for the transmission controller 102. Thus, elements having substantially the same function as those in the first embodiment will be numbered the same here, and will not be described and/or illustrated again in detail here for the sake of brevity.

Figure 35:
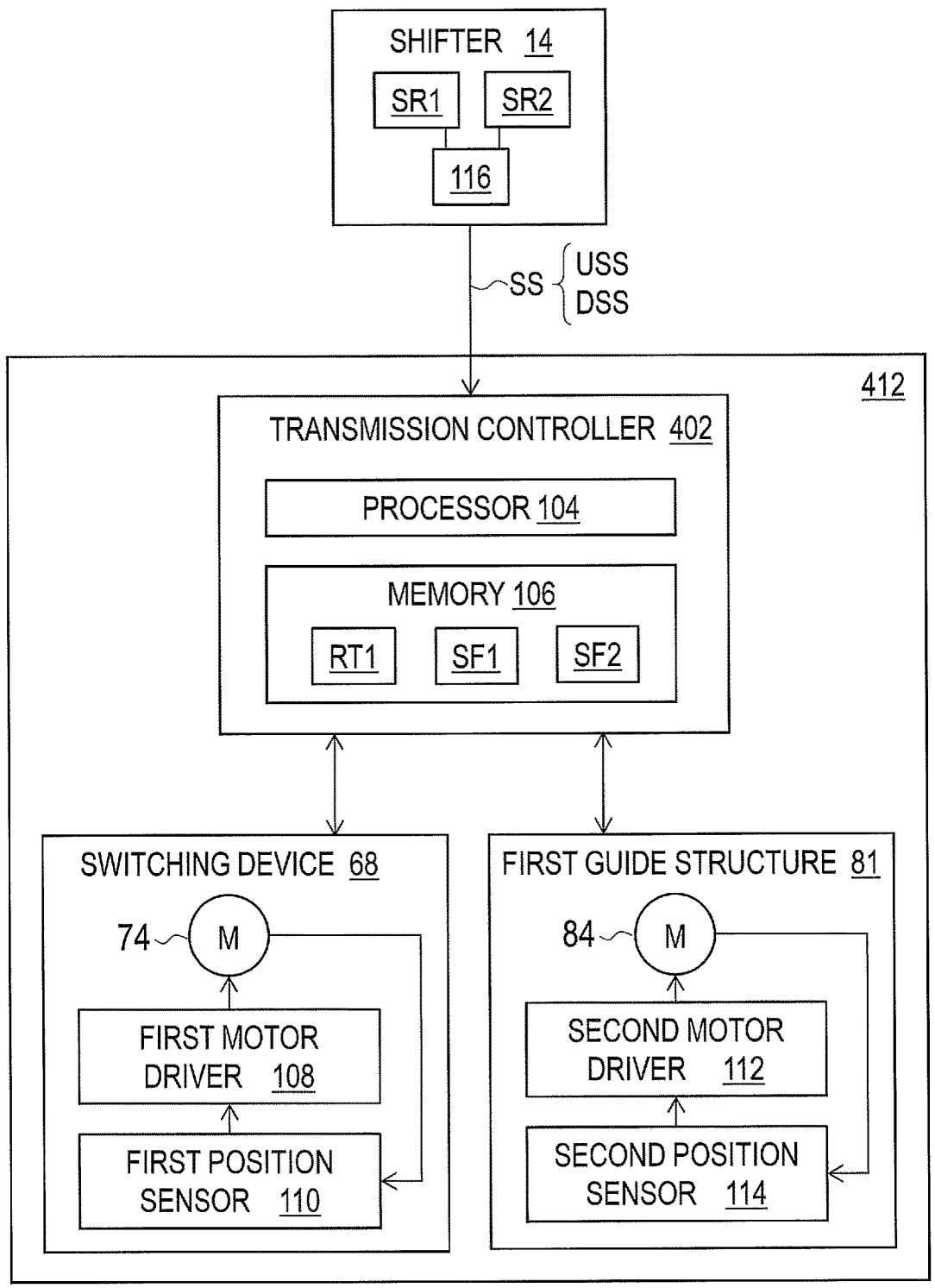
FIG. 35 is a block diagram of a bicycle transmission apparatus in accordance with a fourth embodiment.

As seen in FIG. 35, the bicycle transmission apparatus 412 has substantially the same structure and/or configuration as that of the bicycle transmission apparatus 212 of the second embodiment. Unlike the bicycle transmission apparatus 212, however, the bicycle transmission apparatus 412 comprises a transmission controller 402. The transmission controller 402 has substantially the same configuration as that of the transmission controller 102 of the first embodiment.

Figure 36:
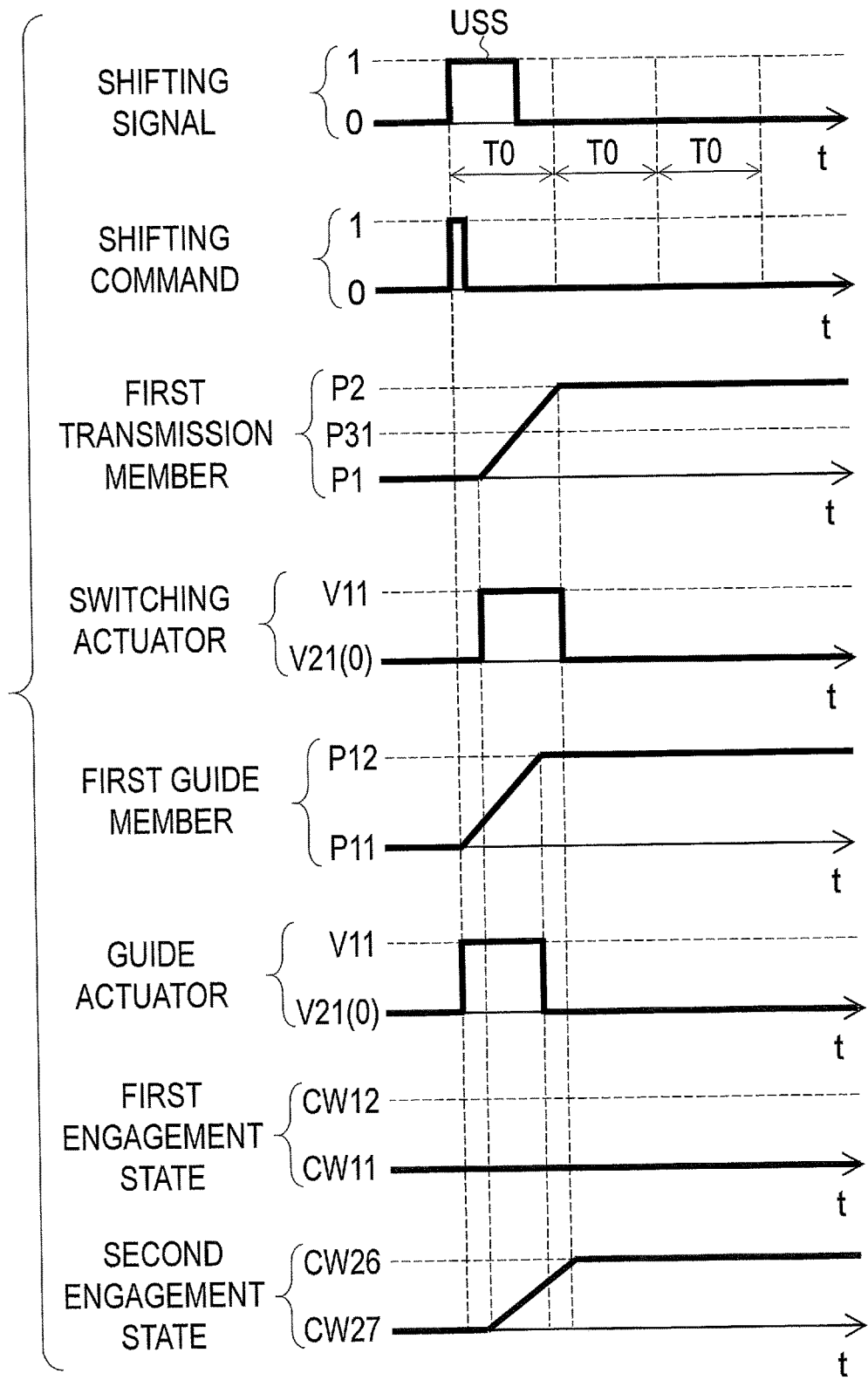
FIG. 36 is a timing chart showing an example of an up shifting operation of the bicycle transmission apparatus illustrated in FIG. 35.

As seen in FIG. 36, however, the transmission controller 402 is configured to move the first transmission member 20 at a first timing and to move the first guide structure 81 at a second timing which is different from the first timing when the switching device 68 switches the position of the first transmission member 20 between the first axial position P1 and the second axial position P2. In this embodiment, the transmission controller 402 controls the guide actuator 84 to move the first guide member 86 before the switching actuator 74 moves the first transmission member 20. However, the transmission controller 402 can be configured to control the guide actuator 84 to move the first guide member 86 after the switching actuator 74 moves the first transmission member 20.

With the bicycle transmission apparatus 412, it is possible to obtain substantially the same effects as those of the bicycle transmission apparatuses 12 of the first embodiment.

Furthermore, the transmission controller 402 is configured to move the first transmission member 20 at the first timing and to move the first guide structure 81 at the second timing which is different from the first timing when the switching device 68 switches the position of the first transmission member 20 between the first axial position P1 and the second axial position P2. Thus, it is possible to change the second engagement state of the first coupling member 24 prior to changing the first engagement state of the first coupling member 24 by differing the timings of moving the first transmission member 20 and the first guide structure 81.

Accordingly, it is possible to change the second engagement state without changing the first engagement state.

Fifth Embodiment

A bicycle transmission apparatus (a bicycle drive unit) 512 in accordance with a fifth embodiment will be described below referring to FIGS. 37 and 38. The bicycle drive unit 512 has the same configuration as the bicycle drive unit 12 except for the first cogwheel element 31 and the third cogwheel element 33. Thus, elements having substantially the same function as those in the above embodiments will be numbered the same here, and will not be described and/or illustrated again in detail here for the sake of brevity.

Figure 37:
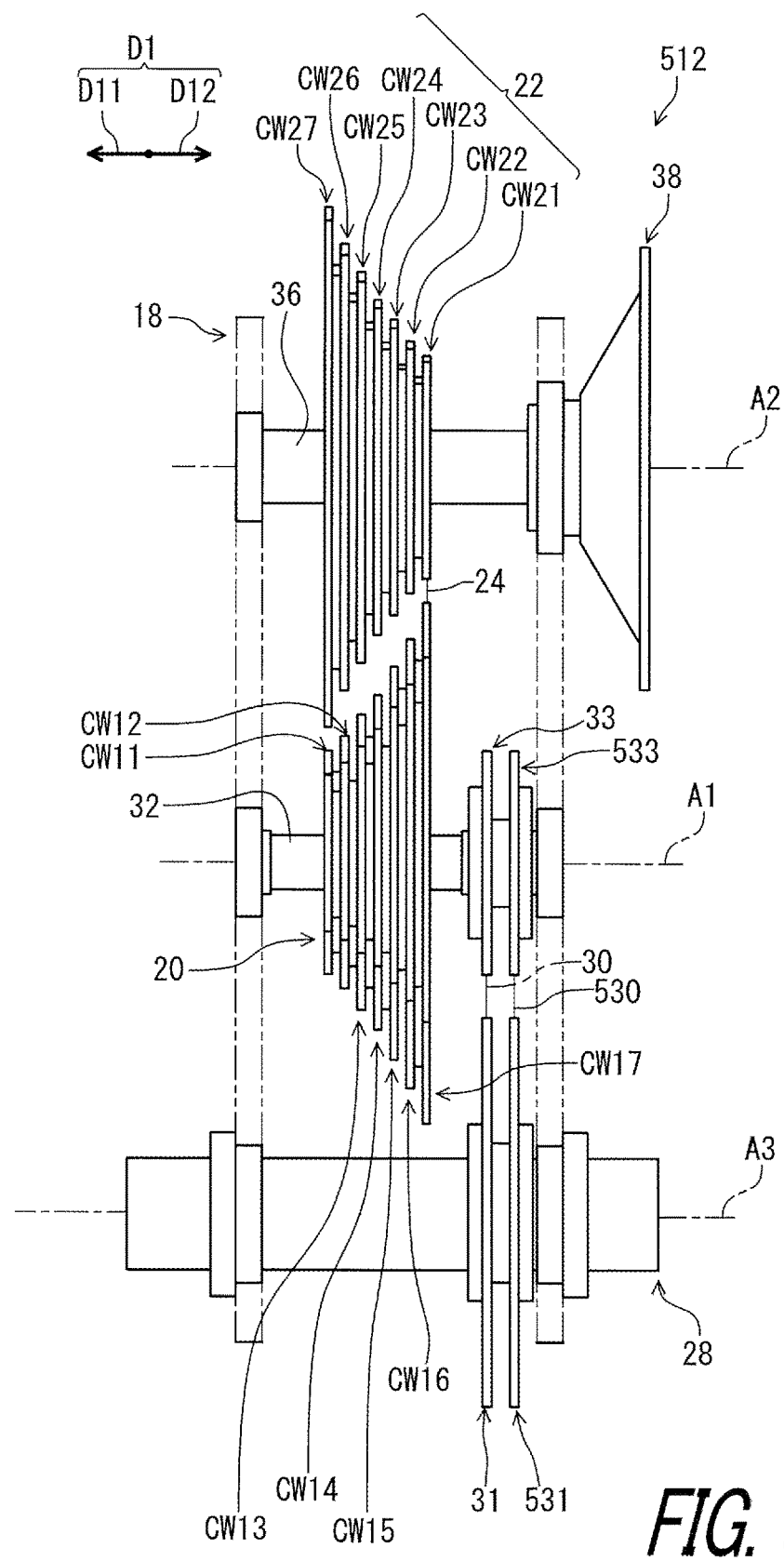
FIG. 37 is a plan view of a bicycle drive unit in accordance with a fifth embodiment.

As seen in FIG. 37, the bicycle transmission apparatus 512 further comprises a second coupling element 530, an second cogwheel element 531, and an fourth cogwheel element 533. The second coupling element 530 has the same structure as that of the first coupling element 30. The second cogwheel element 531 has the same structure as that of the first cogwheel element 31. The fourth cogwheel element 533 has the same structure as that of the third cogwheel element 33. In this embodiment, the second coupling element 530 comprises a bicycle chain configured to couple the input shaft 28 to the first transmission member 20. Furthermore, the second cogwheel element 531 comprises a sprocket including cogs, and the fourth cogwheel element 533 comprises a sprocket including cogs. The second coupling element 530 is engaged with the second cogwheel element 531 and the fourth cogwheel element 533.

The first coupling element 30 is engaged with the first cogwheel element 31 and the third cogwheel element 33 to transmit rotation of the first shaft element 28 to the second shaft element 32. The second coupling element 530 is engaged with the second cogwheel element 531 and the fourth cogwheel element 533 to transmit rotation of the first shaft element 28 to the second shaft element 32.

The second cogwheel element 531 is spaced apart from the first cogwheel element 31 in the axial direction D1. The fourth cogwheel element 533 is spaced apart from the second cogwheel element 33 in the axial direction D1.

Figure 38:
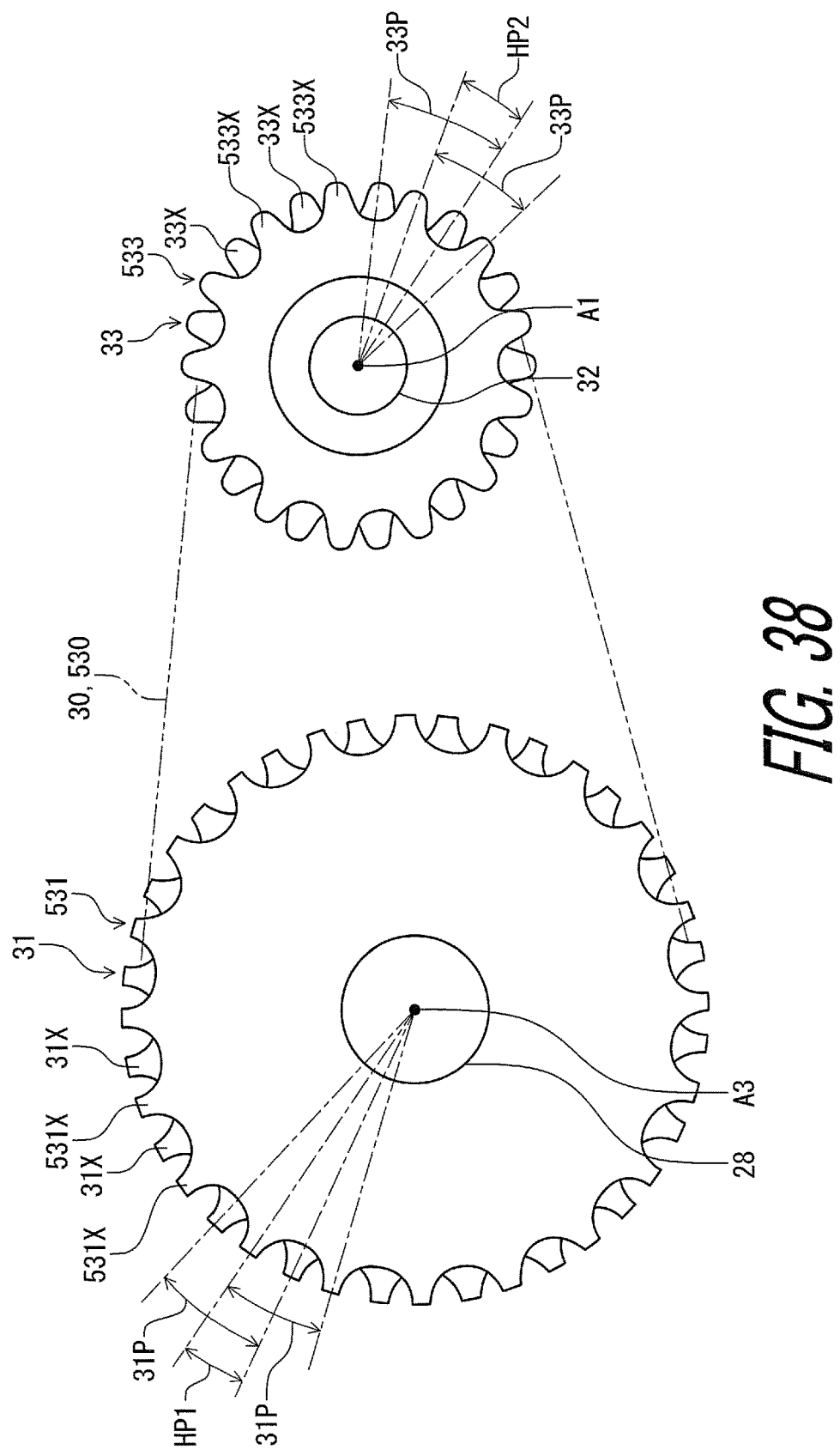
FIG. 38 is a side elevational view of elements of the bicycle drive unit illustrated in FIG. 37.

As seen in FIG. 38, the first cogwheel element 31 includes first cogs 31X circumferentially arranged at a first pitch 31P. The second cogwheel element 531 includes second cogs 531X circumferentially arranged at the first pitch 31P. A total number of the second cogs 531X is equal to a total number of the first cogs 31X. A circumferential phase of the second cogs 531X of the second cogwheel element 531 is offset from a circumferential phase of the first cogs 31X of the first cogwheel element 31 by a half of the first pitch 31P (a first half pitch HP1). The first pitch 31P is equal to a chain pitch of the first coupling element 30.

The third cogwheel element 33 includes third cogs 33X circumferentially arranged at a second pitch 33P. The fourth cogwheel element 533 includes fourth cogs 533X circumferentially arranged at the second pitch 33P. A total number of the fourth cogs 533X is equal to a total number of the third cogs 33X, a circumferential phase of the fourth cogs 533X of the fourth cogwheel element 533 being offset from a circumferential phase of the third cogs 33X of the third cogwheel element 33 by a half of the second pitch 33P (a second half pitch HP2). The second pitch 33P is equal to the chain pitch of the first coupling element 30. Namely, the second pitch 33P is equal to the first pitch 31P.

In this embodiment, the total number of the first cogs 31X is larger than the total number of the third cogs 33X. The total number of the second cogs 531X is larger than the total number of the fourth cogs 533X. However, the total number of the first cogs 31X can be equal to or smaller than the total number of the third cogs 33X. The total number of the second cogs 531X can be equal to or smaller than the total number of the fourth cogs 533X.

The total number of each of the first cogs 31X and the second cogs 531X is 20. The total number of each of the third cogs 33X and the fourth cogs 533X is 13. Thus, in this embodiment, a gear ratio defined by the first cogwheel element 31 and the third cogwheel element 33 is 13:20. However, it is preferable that the gear ratio defined by the first cogwheel element 31 and the third cogwheel element 33 is 1:2 or 1:4.

Each of the first cogwheel element 31 and the second cogwheel element 33 comprises a sprocket. However, each of the first cogwheel element 31 and the second cogwheel element 33 can comprise other cogwheels engageable with a belt. Each of the second cogwheel element 531 and the fourth cogwheel element 533 comprises a sprocket. However, each of the second cogwheel element 531 and the fourth cogwheel element 533 can comprise other cogwheels engageable with a belt. The second cogwheel element 531 can comprises a cogwheel different from the first cogwheel element 31. The fourth cogwheel element 533 can comprises a cogwheel different from the second cogwheel element 33.

Each of the first coupling element 30 and the second coupling element 530 comprises a bicycle chain. However, each of the first coupling element 30 and the second coupling element 530 can comprises other coupling members such as a belt.

With the bicycle transmission apparatus 412, it is possible to obtain substantially the same effects as those of the bicycle transmission apparatuses 12 of the first embodiment.

Furthermore, it is possible to reduce rotational fluctuation transmitted from the first shaft element 28 to the second shaft element 32.

It will be apparent to those skilled in the bicycle field from the present disclosure that the constructions of the above embodiments can be at least partially combined with each other. Furthermore, it will be apparent to those skilled in the bicycle field from the present disclosure that the modifications of the first embodiment can be applied to each of the other embodiments.

The term "configured" as used herein to describe a component, section or part of a device includes hardware and/or software that is constructed and/or programmed to carry out the desired function. The desired function can be carried out by hardware, software, or a combination of hardware and software.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle transmission apparatus comprising:
    a base member;
    a first transmission member rotatable relative to the base member about a first rotational axis and movable relative to the base member in an axial direction parallel to the first rotational axis, the first transmission member including first cogwheels arranged in the axial direction, the first cogwheels having different outer diameters;
    a second transmission member rotatable relative to the base member about a second rotational axis and stationary relative to the base member in the axial direction, the second transmission member including second cogwheels arranged in the axial direction, the second cogwheels having different outer diameters;
    a first coupling member configured to couple the first transmission member to the second transmission member to transmit rotation of one of the first transmission member and the second transmission member to the other of the first transmission member and the second transmission member at a variable speed stage, the variable speed stage being variable in accordance with at least one positional relationship among the first transmission member, the second transmission member, and the first coupling member in the axial direction, the first coupling member having
        a first engagement state where the first coupling member is engaged with one of the first cogwheels, and
        a second engagement state where the first coupling member is engaged with one of the second cogwheels;
    a first guide structure configured to guide the first coupling member relative to the base member in a guide direction intersecting with a plane perpendicular to the axial direction;
    a switching device configured to switch a position of the first transmission member relative to the base member in the axial direction between a first axial position and a second axial position; and
    a transmission controller configured to control the switching device and the first guide structure so as not to change the first engagement state of the first coupling member from one cogwheel to another adjacent cogwheel among the first cogwheels when the first transmission member moves relative to the base member in association with a movement of the first guide structure relative to the base member to change the second engagement state of the first coupling member from one cogwheel to another adjacent cogwheel among the second cogwheels.

2. The bicycle transmission apparatus according to claim 1, wherein
    the transmission controller is configured to control the switching device to change a moving speed of the first transmission member when the switching device switches the position of the first transmission member between the first axial position and the second axial position.

3. The bicycle transmission apparatus according to claim 2, wherein
    the transmission controller is configured to control the switching device to move the first transmission member from one of the first axial position and the second axial position relative to the base member at a first speed when the switching device switches the position of the first transmission member between the first axial position and the second axial position.

4. The bicycle transmission apparatus according to claim 3, wherein
    the transmission controller is configured to control the switching device to temporarily change the moving speed of the first transmission member from the first speed to a second speed when the switching device switches the position of the first transmission member between the first axial position and the second axial position, and
    the second speed is lower than the first speed.

5. The bicycle transmission apparatus according to claim 4, wherein
    the second speed is zero.

6. The bicycle transmission apparatus according to claim 5, wherein
    the switching device changes the moving speed from the first speed to zero to temporarily stop the first transmission member at a third axial position defined between the first axial position and the second axial position for a stop time when the switching device switches the position of the first transmission member between the first axial position and the second axial position.

7. The bicycle transmission apparatus according to claim 6, further comprising:
    a rotational position sensor configured to sense one of
        a rotational position of the first transmission member relative to the base member,
        a rotational position of the second transmission member relative to the base member, and
        a rotational position of a bicycle crank relative to the base member, wherein
    the transmission controller is configured to calculate the stop time based on the rotational position sensed by the rotational position sensor.

8. The bicycle transmission apparatus according to claim 6, further comprising:
    a rotational speed sensor configured to sense one of
        a rotational speed of the first transmission member relative to the base member,
        a rotational speed of the second transmission member relative to the base member, and
        a rotational speed of a bicycle crank relative to the base member, wherein
    the transmission controller is configured to calculate the stop time based on the rotational speed sensed by the rotational speed sensor.

9. The bicycle transmission apparatus according to claim 4, wherein
    the transmission controller is configured to control the switching device to change the moving speed of the first transmission member from the second speed to a third speed when the switching device switches the position of the first transmission member between the first axial position and the second axial position, and the third speed is higher than the second speed.

10. The bicycle transmission apparatus according to claim 9, wherein
the third speed is equal to the first speed.

11. The bicycle transmission apparatus according to claim 1, wherein
the transmission controller is configured to move the first transmission member at a first timing and to move the first guide structure at a second timing which is different from the first timing when the switching device switches the position of the first transmission member between the first axial position and the second axial position.

12. The bicycle transmission apparatus according to claim 1, wherein
the first transmission member moves relative to the second transmission member in the axial direction by a travel distance defined between the first axial position and the second axial position to change the first engagement state of the first coupling member from one cogwheel to another adjacent cogwheel among the first cogwheels.

13. The bicycle transmission apparatus according to claim 1, wherein
the first guide structure is provided in a releasing area defined between the first transmission member and the second transmission member, and
the first coupling member is released in the releasing area from the first transmission member to the second transmission member.

14. The bicycle transmission apparatus according to claim 1, further comprising:
a second guide structure to guide the first coupling member between the first transmission member and the second transmission member, wherein
the second guide structure is provided in a pulling area defined between the first transmission member and the second transmission member, and
the first coupling member is pulled in the pulling area by the first transmission member to transmit a pedaling force from the first transmission member to the second transmission member.

15. The bicycle transmission apparatus according to claim 14, wherein
the second guide structure includes
a second guide member contactable with the first coupling member, and
a guide support to slidably support the second guide member to apply a sliding resistance to the second guide member, and
the second guide member moves relative to the guide support in response to a pushing force applied from the first coupling member to the second guide member beyond the sliding resistance.

16. A bicycle transmission apparatus comprising:
a base member including an attachment guide;
a first transmission member rotatable relative to the base member about a first rotational axis, the first transmission member being detachably attached to the base member, the attachment guide being configured to guide the first transmission member in a mounting direction perpendicular to the first rotation axis to a predetermined position when the first transmission member is mounted on the base member;
a second transmission member rotatable relative to the base member about a second rotational axis; and
a first coupling member configured to couple the first transmission member to the second transmission member to transmit rotation of one of the first transmission member and the second transmission member to the other of the first transmission member and the second transmission member at a variable speed stage, the variable speed stage being variable in accordance with at least one positional relationship among the first transmission member, the second transmission member, and the first coupling member in an axial direction parallel to the first rotational axis.

17. The bicycle transmission apparatus according to claim 16, wherein
the first transmission member is detachable from the base member in the mounting direction perpendicular to the first rotational axis, and
the first transmission member is attachable to the base member in the mounting direction.

18. The bicycle transmission apparatus according to claim 17, wherein
the attachment guide includes one of an attachment opening and a protruding part,
the first transmission member includes the other of the attachment opening and the protruding part, and
the protruding part is detachably provided in the attachment opening.

19. The bicycle transmission apparatus according to claim 18, wherein
the attachment opening includes an attachment groove extending in the mounting direction.

20. The bicycle transmission apparatus according to claim 19, further comprising:
a securing member to secure the first transmission member to the base member.

21. The bicycle transmission apparatus according to claim 20, wherein
the attachment opening includes an attachment through-hole provided in the attachment groove, and
the securing member extends through the attachment through-hole to secure the first transmission member to the base member.

22. The bicycle transmission apparatus according to claim 19, wherein
the attachment groove includes a closed end and an open end opposite to the closed end in the mounting direction,
the first transmission member receives a holding force from the first coupling member to maintain the first transmission member at the closed end in the attachment groove,
the open end is provided within a circumferential area defined about the first rotational axis when viewed from the axial direction, and
the second rotational axis is not provided in the circumferential area when viewed from the axial direction.

23. The bicycle transmission apparatus according to claim 16, wherein
the first transmission member is movable relative to the base member in the axial direction.

24. A bicycle transmission apparatus comprising:
a base member;
a first transmission member rotatable relative to the base member about a first rotational axis and movable relative to the base member in an axial direction parallel to the first rotational axis;

a second transmission member rotatable relative to the base member about a second rotational axis and stationary relative to the base member in the axial direction;

a first coupling member configured to couple the first transmission member to the second transmission member to transmit rotation of one of the first transmission member and the second transmission member to the other of the first transmission member and the second transmission member at a variable speed stage, the variable speed stage being variable in accordance with at least one positional relationship among the first transmission member, the second transmission member, and the first coupling member in the axial direction; and a switching device configured to switch a position of the first transmission member relative to the base member in the axial direction between a first axial position and a second axial position, the switching device including a rotor and an axially-movable member, the rotor being rotatable about a rotational center axis which is non-parallel to the axial direction, the axially-movable member being coupled to the rotor to convert a rotation of the rotor to an axial movement of the first transmission member in the axial direction.

25. The bicycle transmission apparatus according to claim 24, wherein the rotor includes an offset part offset from the rotational center axis to move around the rotational center axis, the axially-movable member includes a coupling groove, and the offset part is provided in the coupling groove to convert the rotation of the rotor into the axial movement of the first transmission member in the axial direction.

26. The bicycle transmission apparatus according to claim 25, wherein the coupling groove extends in an extending direction which is non-parallel to the axial direction.

27. The bicycle transmission apparatus according to claim 26, wherein the coupling groove includes a closed end and an open end opposite to the closed end in the extending direction, and the rotor is detachable from the open end of the coupling groove in the extending direction.

28. The bicycle transmission apparatus according to claim 25, wherein the rotor is detachably provided in the coupling groove.

29. The bicycle transmission apparatus according to claim 25, wherein the axially-movable member includes a coupling part coupled to the offset part, and the coupling part has a substantially U-shape when viewed from a direction parallel to the rotational center axis.

* * * * *